(12) United States Patent
Iddings et al.

(10) Patent No.: US 9,221,004 B2
(45) Date of Patent: *Dec. 29, 2015

(54) AIR CLEANER ARRANGEMENTS; COMPONENTS; AND, METHODS

(71) Applicant: Donaldson Company, Inc., Bloomington, MN (US)

(72) Inventors: Douglas Iddings, Bloomington, MN (US); Daniel Adamek, Bloomington, MN (US); Thomas Miller, Eagan, MN (US); Johan DeWit, Hamme-Mille (BE)

(73) Assignee: Donaldson Company, Inc., Minneapolis, MN (US)

( * ) Notice: Subject to any disclaimer, the term of this patent is extended or adjusted under 35 U.S.C. 154(b) by 24 days.

This patent is subject to a terminal disclaimer.

(21) Appl. No.: 14/040,966

(22) Filed: Sep. 30, 2013

(65) Prior Publication Data
US 2014/0096495 A1  Apr. 10, 2014

Related U.S. Application Data

(63) Continuation of application No. 13/274,474, filed on Oct. 17, 2011, now Pat. No. 8,545,588, which is a continuation of application No. 12/218,783, filed on Jul. 17, 2008, now Pat. No. 8,038,756.

(60) Provisional application No. 61/126,222, filed on Apr. 30, 2008, provisional application No. 60/961,521, filed on Jul. 20, 2007.

(51) Int. Cl.
*B01D 46/24* (2006.01)
*B01D 46/00* (2006.01)

(52) U.S. Cl.
CPC ........ *B01D 46/2414* (2013.01); *B01D 46/0002* (2013.01); *B01D 46/009* (2013.01);
(Continued)

(58) Field of Classification Search
CPC ........... B01D 46/2411; B01D 46/2414; B01D 2271/027; B01D 46/0002; B01D 2265/021; B01D 2265/026
See application file for complete search history.

(56) References Cited

U.S. PATENT DOCUMENTS 2,771,156 A    11/1956   Kasten et al.
3,002,870 A    10/1961   Belgarde et al.
(Continued)

FOREIGN PATENT DOCUMENTS

BE    1011567 A3    11/1989
DE    195 19 438    11/1996
(Continued)

OTHER PUBLICATIONS

Pending claims corresponding to U.S. Appl. No. 14/506,864 dated Mar. 24, 2015.
(Continued)

*Primary Examiner* — Robert Clemente
(74) *Attorney, Agent, or Firm* — Merchant & Gould, P.C.

(57) ABSTRACT

An air cleaner assembly and components therefor are described. The components include features of an air cleaner housing; advantageous main filter cartridges; and, advantageous safety filter cartridge features. Features of the main filter cartridge are provided to engage an access cover of the assembly, and a cartridge support within the housing, in a preferred manner. Methods of assembly and use are also described.

19 Claims, 37 Drawing Sheets

(52) U.S. Cl.
CPC ...... *B01D46/2411* (2013.01); *B01D 2265/021* (2013.01); *B01D 2265/026* (2013.01); *B01D 2271/027* (2013.01)

(56) References Cited

U.S. PATENT DOCUMENTS

| | | |
|---|---|---|
| 3,048,959 A | 8/1962 | Lowther |
| 3,078,650 A | 2/1963 | Anderson et al. |
| 3,160,488 A | 12/1964 | Wilber |
| 3,169,844 A | 2/1965 | Young |
| 3,290,870 A | 12/1966 | Jensen |
| 3,342,021 A | 9/1967 | Yelinek et al. |
| 3,342,335 A | 9/1967 | Gamundi et al. |
| 3,354,012 A | 11/1967 | Forman et al. |
| 3,357,163 A | 12/1967 | Burger et al. |
| 3,413,780 A | 12/1968 | Amlott et al. |
| 3,423,909 A | 1/1969 | Bennett et al. |
| 3,452,519 A | 7/1969 | Bianchetta |
| 3,488,928 A | 1/1970 | Tarala |
| 3,584,439 A | 6/1971 | Gronholz |
| 3,616,618 A | 11/1971 | Gronholz et al. |
| 3,672,130 A | 6/1972 | Sullivan et al. |
| 3,710,560 A | 1/1973 | Maddocks |
| 3,716,436 A | 2/1973 | Pall et al. |
| 4,006,000 A | 2/1977 | Tortorici et al. |
| 4,036,616 A | 7/1977 | Bryns |
| 4,062,781 A | 12/1977 | Strauss et al. |
| 4,128,251 A | 12/1978 | Gaither et al. |
| 4,135,899 A | 1/1979 | Gauer |
| 4,159,197 A | 6/1979 | Schuler et al. |
| 4,211,543 A | 7/1980 | Tokar et al. |
| 4,222,755 A | 9/1980 | Grotto |
| 4,227,898 A | 10/1980 | Kamekawa et al. |
| 4,235,611 A | 11/1980 | Brownell |
| 4,303,426 A | 12/1981 | Battis |
| 4,312,651 A | 1/1982 | Esaki et al. |
| 4,349,363 A | 9/1982 | Patel et al. |
| 4,350,509 A | 9/1982 | Alseth et al. |
| 4,402,830 A | 9/1983 | Pall |
| 4,488,889 A | 12/1984 | McCarroll |
| 4,491,460 A | 1/1985 | Tokar |
| 4,498,915 A | 2/1985 | Witchell |
| 4,588,426 A | 5/1986 | Virgille et al. |
| 4,609,465 A | 9/1986 | Miller |
| 4,720,292 A | 1/1988 | Engel et al. |
| 4,728,423 A | 3/1988 | Kuwajima |
| 4,764,191 A | 8/1988 | Morelli |
| 4,801,383 A | 1/1989 | Hoffmann et al. |
| 4,818,261 A | 4/1989 | Beckon |
| 4,838,901 A | 6/1989 | Schmidt et al. |
| 4,950,317 A | 8/1990 | Dottermans |
| 5,045,192 A | 9/1991 | Terhune |
| 5,064,458 A | 11/1991 | Machado |
| 5,071,456 A | 12/1991 | Binder et al. |
| 5,082,476 A | 1/1992 | Kahlbaugh et al. |
| 5,112,417 A | 5/1992 | Sayles |
| 5,116,499 A | 5/1992 | Deibel |
| 5,118,417 A | 6/1992 | Deibel |
| 5,120,337 A | 6/1992 | Benzler et al. |
| 5,137,557 A | 8/1992 | Behrendt et al. |
| 5,160,519 A | 11/1992 | Svensson et al. |
| 5,167,683 A | 12/1992 | Behrendt et al. |
| 5,211,846 A | 5/1993 | Kott et al. |
| 5,238,476 A | 8/1993 | Svensson et al. |
| 5,250,179 A | 10/1993 | Spearman |
| 5,277,157 A | 1/1994 | Teich |
| 5,290,445 A | 3/1994 | Buttery |
| 5,431,168 A | 7/1995 | Webster, Jr. |
| 5,442,721 A | 8/1995 | Kalada et al. |
| 5,484,466 A | 1/1996 | Brown et al. |
| 5,545,241 A | 8/1996 | Vanderauwera et al. |
| 5,547,480 A | 8/1996 | Coulonvaux |
| 5,556,440 A | 9/1996 | Mullins et al. |
| 5,601,717 A | 2/1997 | Villette et al. |
| 5,605,555 A | 2/1997 | Patel et al. |
| 5,605,625 A | 2/1997 | Mills |
| 5,613,992 A | 3/1997 | Engel |
| 5,632,791 A | 5/1997 | Oussoren et al. |
| 5,685,985 A | 11/1997 | Brown et al. |
| 5,690,712 A | 11/1997 | Engel |
| 5,700,304 A | 12/1997 | Foo |
| 5,720,788 A | 2/1998 | Puckett et al. |
| 5,720,790 A | 2/1998 | Kometani et al. |
| 5,730,769 A | 3/1998 | Dungs et al. |
| 5,736,040 A | 4/1998 | Duerrstein et al. |
| 5,741,421 A | 4/1998 | Erdmannsdoerfer et al. |
| 5,753,117 A | 5/1998 | Jiang |
| 5,755,842 A | 5/1998 | Patel et al. |
| 5,755,844 A | 5/1998 | Arai et al. |
| 5,800,581 A | 9/1998 | Gielink et al. |
| D401,306 S | 11/1998 | Ward |
| 5,865,863 A | 2/1999 | DeSousa et al. |
| 5,882,367 A | 3/1999 | Morgan et al. |
| 5,893,937 A | 4/1999 | Moessinger |
| 5,897,676 A | 4/1999 | Engel et al. |
| 5,916,435 A | 6/1999 | Spearman et al. |
| 5,919,279 A | 7/1999 | Merritt et al. |
| 5,921,982 A | 7/1999 | Lesh et al. |
| 5,938,804 A | 8/1999 | Engel et al. |
| D414,544 S | 9/1999 | Ward et al. |
| 5,951,729 A | 9/1999 | Ernst et al. |
| 5,972,063 A | 10/1999 | Dudrey et al. |
| D416,308 S | 11/1999 | Ward et al. |
| 5,984,109 A | 11/1999 | Kanwar et al. |
| 6,004,366 A | 12/1999 | Engel et al. |
| 6,039,778 A | 3/2000 | Coulonvaux |
| 6,051,042 A | 4/2000 | Coulonvaux |
| 6,090,177 A | 7/2000 | Moessinger et al. |
| 6,099,606 A | 8/2000 | Miller et al. |
| 6,149,700 A | 11/2000 | Morgan et al. |
| 6,152,979 A | 11/2000 | Cappuyns |
| 6,171,275 B1 | 1/2001 | Webster, Jr. |
| 6,258,145 B1 | 7/2001 | Engel et al. |
| 6,261,334 B1 | 7/2001 | Morgan et al. |
| 6,290,739 B1 | 9/2001 | Gieseke et al. |
| 6,322,602 B2 | 11/2001 | Engel et al. |
| 6,383,244 B1 | 5/2002 | Wake et al. |
| 6,398,832 B2 | 6/2002 | Morgan et al. |
| 6,402,798 B1 | 6/2002 | Kallsen et al. |
| 6,413,289 B2 | 7/2002 | Engel et al. |
| 6,416,561 B1 | 7/2002 | Kallsen et al. |
| 6,419,718 B1 | 7/2002 | Klug et al. |
| 6,436,162 B1 | 8/2002 | Wake et al. |
| 6,447,567 B1 | 9/2002 | Ehrenberg |
| 6,485,535 B1 | 11/2002 | Linnersten et al. |
| D467,654 S | 12/2002 | Klug et al. |
| 6,521,009 B2 | 2/2003 | Engel et al. |
| D471,623 S | 3/2003 | Gieseke et al. |
| D475,129 S | 5/2003 | Ward et al. |
| 6,558,453 B2 | 5/2003 | Sepke et al. |
| 6,572,667 B1 | 6/2003 | Greif et al. |
| D477,659 S | 7/2003 | Gieseke et al. |
| 6,585,838 B1 | 7/2003 | Mullins et al. |
| 6,599,342 B2 | 7/2003 | Andress et al. |
| D481,101 S | 10/2003 | Boehrs |
| 6,652,614 B2 | 11/2003 | Gieseke et al. |
| D485,339 S | 1/2004 | Klug et al. |
| 6,736,874 B2 | 5/2004 | Rieger et al. |
| 6,752,924 B2 | 6/2004 | Gustafson |
| 6,837,920 B2 | 1/2005 | Gieseke et al. |
| D513,314 S | 12/2005 | Iddings et al. |
| 6,986,805 B2 | 1/2006 | Gieseke et al. |
| 7,070,642 B2 | 7/2006 | Scott et al. |
| 7,291,198 B2 | 11/2007 | Gieseke et al. |
| 7,311,748 B2 | 12/2007 | Holmes et al. |
| 7,413,588 B2 | 8/2008 | Holzmann et al. |
| 7,524,349 B2 | 4/2009 | Schrage et al. |
| 7,537,631 B2 | 5/2009 | Scott et al. |
| 7,572,310 B2 | 8/2009 | Gieseke |
| 7,662,203 B2 | 2/2010 | Scott et al. |
| 7,981,186 B2 | 7/2011 | Schrage et al. |
| 7,988,757 B2 | 8/2011 | Scott et al. |
| 8,038,756 B2 | 10/2011 | Iddings et al. |
| 8,066,791 B2 | 11/2011 | Baseotto et al. |

(56) References Cited

U.S. PATENT DOCUMENTS

| | | |
|---|---|---|
| 8,216,335 B2 | 7/2012 | Scott et al. |
| 8,273,143 B2 | 9/2012 | Coulonvaux et al. |
| 8,292,984 B2 | 10/2012 | Baseotto et al. |
| 8,394,166 B2 | 3/2013 | Scott et al. |
| 8,414,675 B2 | 4/2013 | Iddings et al. |
| 8,460,425 B2 | 6/2013 | Scott et al. |
| 8,480,778 B2 | 7/2013 | Baseotto et al. |
| 8,545,588 B2 | 10/2013 | Iddings et al. |
| 8,702,831 B2 | 4/2014 | Scott et al. |
| 8,784,523 B2 | 7/2014 | Coulonvaux et al. |
| 8,814,973 B2 | 8/2014 | Baseotto et al. |
| 8,852,309 B2 | 10/2014 | Scott et al. |
| 8,864,866 B2 | 10/2014 | Osendorf et al. |
| 2002/0014058 A1 | 2/2002 | Engel et al. |
| 2003/0051455 A1 | 3/2003 | Gieseke et al. |
| 2004/0134171 A1 | 7/2004 | Scott et al. |
| 2004/0261383 A1 | 12/2004 | Schaerlund et al. |
| 2006/0086075 A1 | 4/2006 | Scott et al. |
| 2008/0190082 A1 | 8/2008 | Scott et al. |
| 2009/0049814 A1 | 2/2009 | Baseotto et al. |
| 2009/0094951 A1 | 4/2009 | Baseotto et al. |
| 2009/0100813 A1 | 4/2009 | Iddings et al. |
| 2009/0145095 A1 | 6/2009 | Juliar et al. |
| 2009/0217632 A1 | 9/2009 | Coulonvaux et al. |
| 2010/0146917 A1 | 6/2010 | Coulonvaux et al. |
| 2010/0146920 A1 | 6/2010 | Iddings et al. |
| 2011/0308212 A1 | 12/2011 | Ruhland et al. |

FOREIGN PATENT DOCUMENTS

| | | |
|---|---|---|
| DE | 198 49 089 A1 | 4/2000 |
| EP | 0 230 991 A2 | 8/1987 |
| EP | 0 329 659 B1 | 8/1989 |
| EP | 0 480 991 B1 | 4/1992 |
| EP | 0 562 502 | 9/1993 |
| EP | 1 070 841 | 7/2000 |
| EP | 1 123 460 B1 | 8/2003 |
| EP | 1 174 171 B1 | 8/2004 |
| EP | 1 357 997 B1 | 9/2006 |
| EP | 1 754 525 A1 | 2/2007 |
| FR | 2 665 217 | 1/1992 |
| GB | 1 125 335 | 4/1919 |
| GB | 1 124 735 | 8/1968 |
| GB | 1 245 419 | 9/1971 |
| GB | 1 499 922 | 2/1978 |
| GB | 1 511 904 | 5/1978 |
| GB | 2 110 110 | 6/1983 |
| GB | 2 119 674 | 11/1983 |
| GB | 2 163 368 | 2/1986 |
| SU | 868082 | 9/1981 |
| WO | WO 89/01818 | 3/1989 |
| WO | WO 91/00425 | 1/1991 |
| WO | WO 98/11977 | 3/1998 |
| WO | WO 99/42719 | 8/1999 |
| WO | WO 00/23166 | 4/2000 |
| WO | WO 01/91884 | 12/2001 |
| WO | WO 02/45819 | 6/2002 |
| WO | WO 02/078816 A1 | 10/2002 |
| WO | WO 2004/039476 | 5/2004 |
| WO | WO 2005/092475 | 10/2005 |
| WO | WO 2006/026241 | 3/2006 |
| WO | WO 2006/119414 A1 | 11/2006 |
| WO | WO 2007/009040 A1 | 1/2007 |
| WO | 2008/045326 | 10/2007 |
| WO | WO 2009/014982 | 1/2009 |
| WO | WO 2009/014986 | 1/2009 |
| WO | WO 2008/124437 | 2/2009 |
| WO | WO 2010/091917 | 8/2010 |

OTHER PUBLICATIONS

Pending claims corresponding to U.S. Appl. No. 14/257,539 dated Mar. 24, 2015.
Pending claims corresponding to U.S. Appl. No. 13/936,525 dated Mar. 24, 2015.
Pending claims corresponding to U.S. Appl. No. 14/336,268 dated Mar. 24, 2015.
Pending claims corresponding to U.S. Appl. No. 14/518,102 dated Mar. 24, 2015.
International Search Report and Written Opinion mailed Nov. 21, 2008.
Pending claims corresponding to U.S. Appl. No. 13/914,042 dated Sep. 30, 2013.
Pending claims corresponding to U.S. Appl. No. 13/793,006 dated Sep. 30, 2013.
Pending claims corresponding to U.S. Appl. No. 13/656,936 dated Sep. 30, 2013.
Pending claims corresponding to U.S. Appl. No. 13/936,525 dated Sep. 30, 2013.
Pending claims corresponding to U.S. Appl. No. 13/274,474 dated Sep. 30, 2013.
EP Search Report and Written Opinion Corresponding to Application No. 12179545.4 dated Jun. 13, 2013.

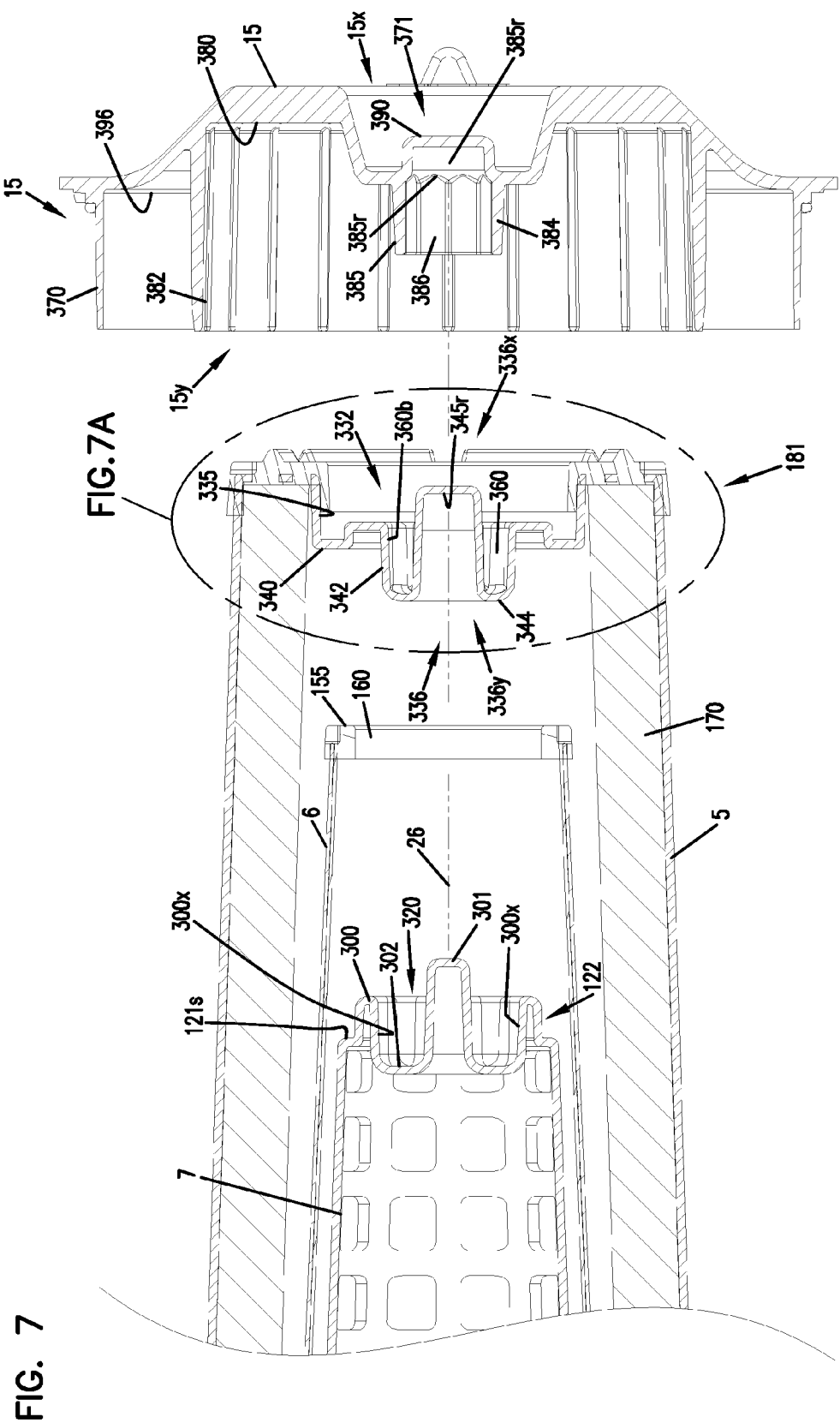

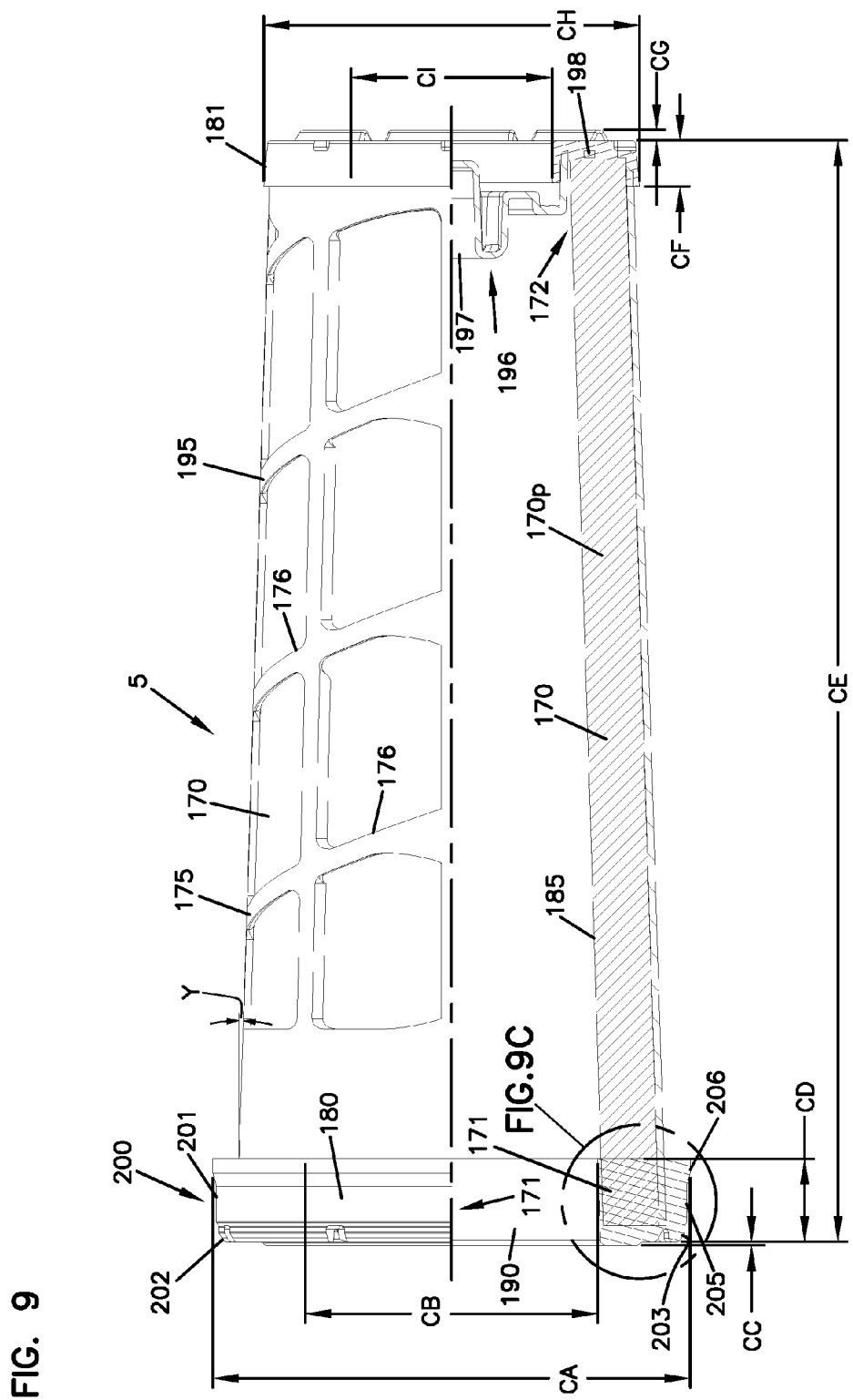

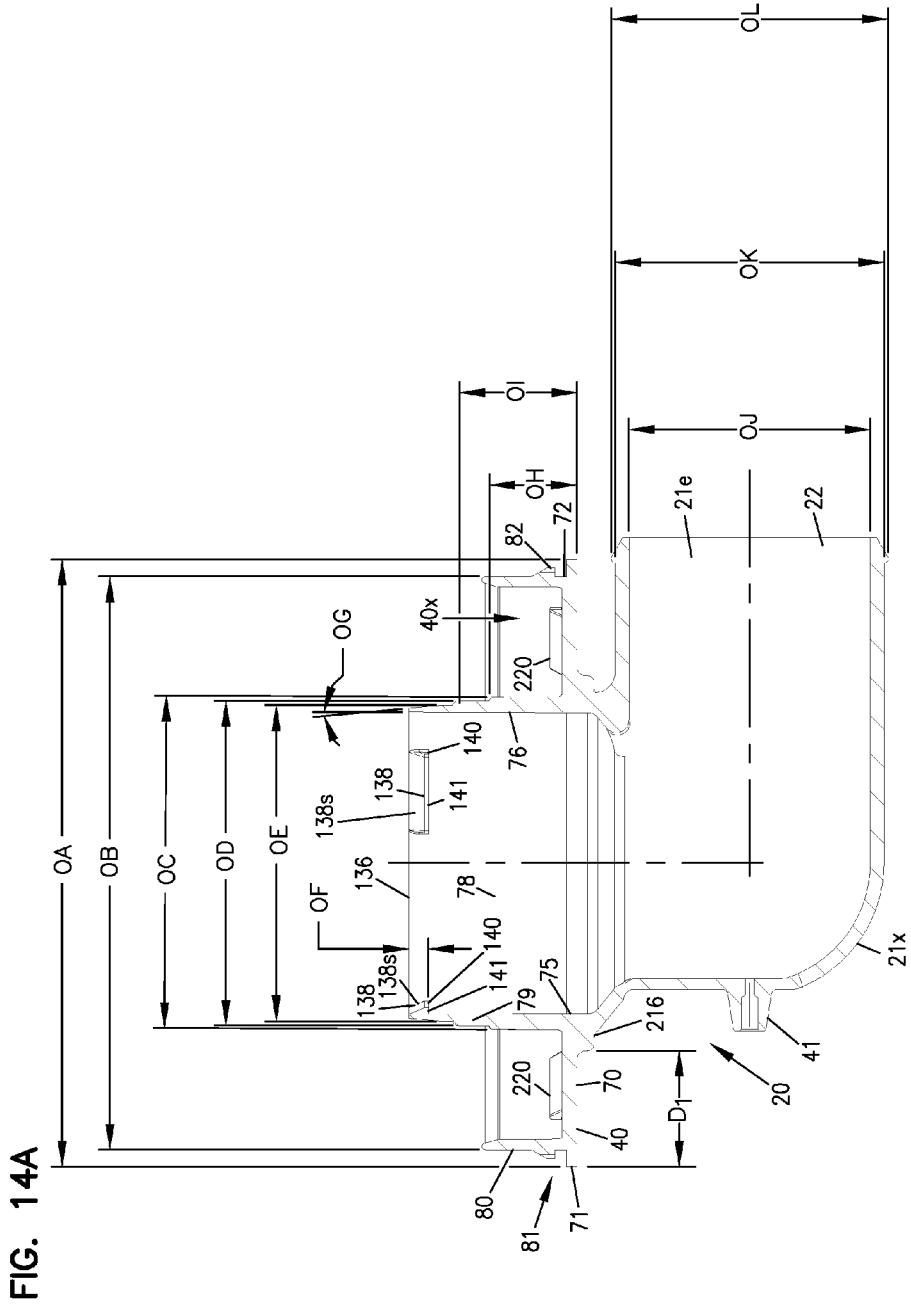

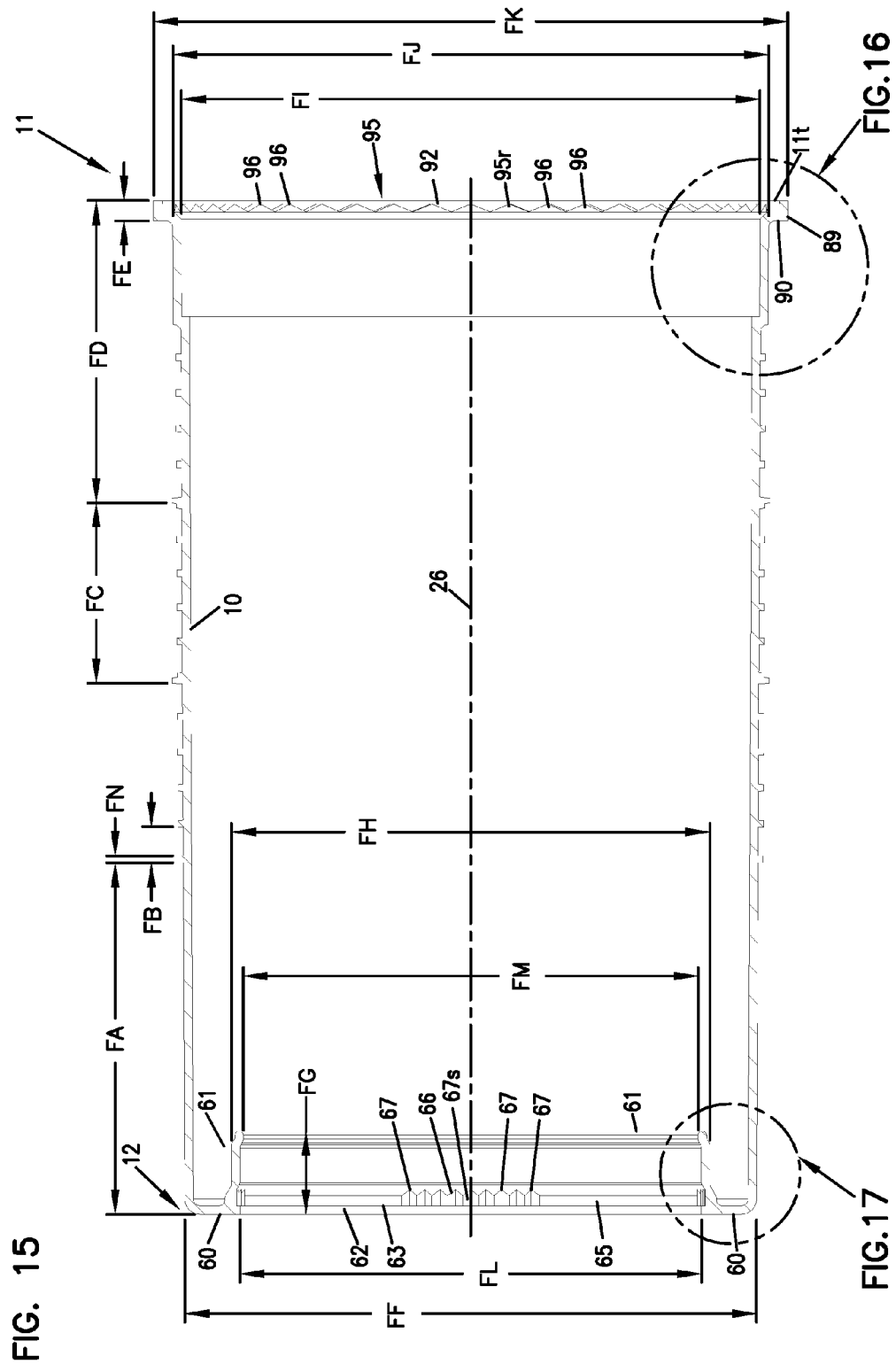

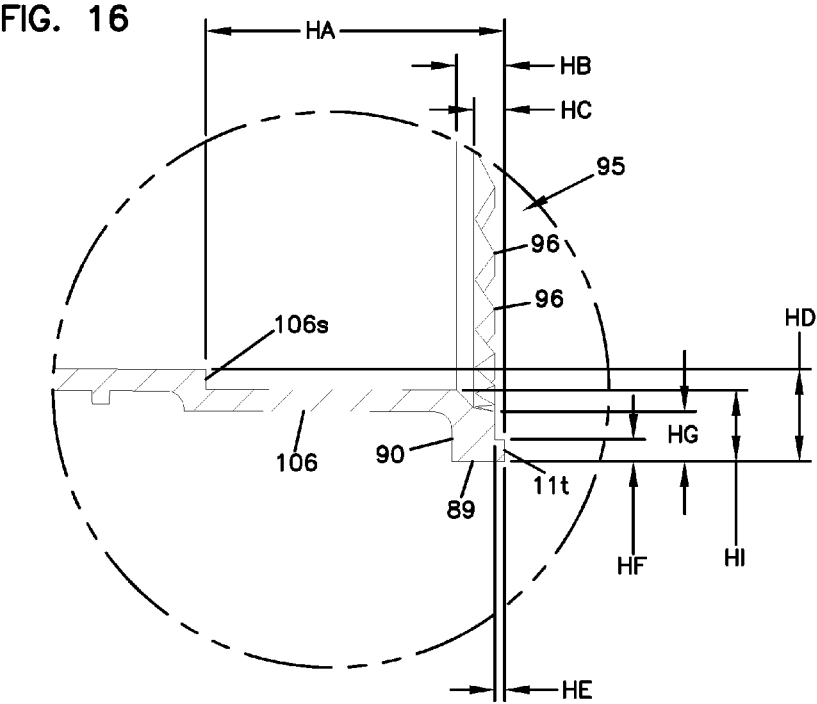
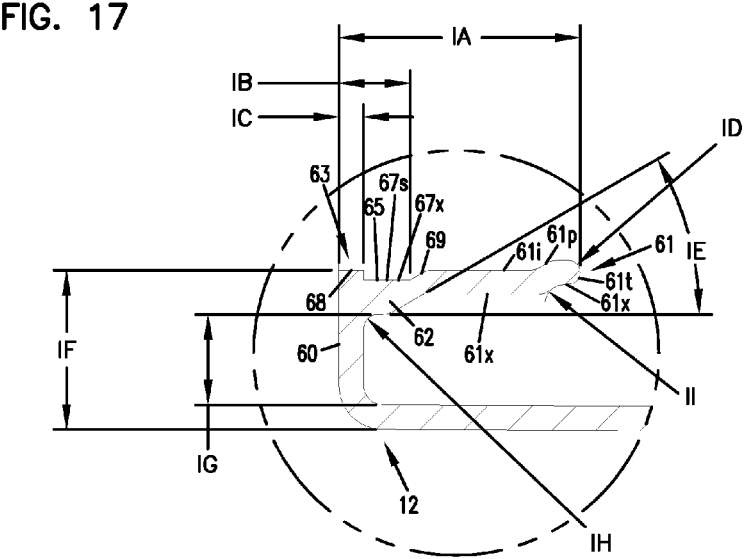

AIR CLEANER ARRANGEMENTS; COMPONENTS; AND, METHODS

CROSS-REFERENCE TO RELATED APPLICATION

This application is a continuing application of U.S. Ser. No. 13/274,474 filed Oct. 17, 2011, which has now issued as U.S. Pat. No. 8,545,588. U.S. Ser. No. 13/274,474 is a continuing application of U.S. Ser. No. 12/218,783, which issued as U.S. Pat. No. 8,038,756 and filed Jul. 17, 2008. U.S. Ser. No. 12/218,783 includes the disclosure of U.S. Ser. No. 61/126,222, filed Apr. 30, 2008. The complete disclosures of U.S. Ser. No. 13/274,474; U.S. Ser. No. 12/218,783 and U.S. Ser. No. 61/126,222 are incorporated herein by reference.

Also, the present application includes features of U.S. Ser. No. 60/961,521, filed Jul. 20, 2007. The complete disclosure of 60/961,521 is incorporated herein by reference. A claim of priority to each of U.S. Ser. No. 13/274,474; U.S. Ser. No. 12/218,783; U.S. Ser. No. 60/961,521; and, 61/126,222, is made to the extent appropriate.

FIELD OF THE DISCLOSURE

The present disclosure relates to air cleaners. It particularly concerns air cleaners including a main filter cartridge having an open with a radial seal. The features described include a main filter cartridge in preferred engagement with an access cover of a housing and an internal filter support, when installed. The features also relate to a main element seal also operating as a water seal; an improved safety filter assembly; and other features for convenient assembly and use. Also, some alternative arrangements are described.

BACKGROUND

Air cleaners are used to filter combustion intake air for internal combustion engines of a variety of vehicles and other equipment, such as: trucks; buses; off-road construction equipment; agriculture equipment; generator sets; etc. Such air cleaners typically include a housing with a removable and replaceable main filter cartridge positioned therein. The housing includes a service access cover, for selected access to an internally received filter cartridge, for servicing. The filter cartridge is typically serviced by being removed and either: by being replaced with a factory new cartridge; by being refurbished and being reinstalled; or, by being replaced with a previously used, but refurbished, cartridge.

Issues relating to air cleaner arrangements with a serviceable filter cartridge include: ensuring proper installation and sealing; obtaining appropriate support for the filter cartridge within the air cleaner; ensuring that the air cleaner housing is protected against improper installation of filter cartridge; providing for convenient installation and removal; providing for convenient installation and configuration of safety cartridges; providing a convenient water seal within the housing, between selected housing parts; and, providing for convenient assembly.

Improvements in air cleaner assemblies and filter cartridges therefor, which are directed to these issues, are described herein.

SUMMARY

According to the present disclosure, air cleaner assemblies and components and features thereof are described. Among the components described are main filter cartridges and safety filter cartridges. In addition, specific features of air cleaner housings are characterized.

There is no specific requirement that an assembly include all of the features characterized herein, to obtain some benefit according to the present disclosure.

In an examples described, the main filter cartridge includes an end cap adjacent the access cover, configured for preferred engagement with the access cover and a filter cartridge support positioned within the housing. In addition, a safety or secondary cartridge is configured for preferred engagement between the main element and the cartridge support. The interactions among the access cover, main filter cartridge, safety cartridge and cartridge support, are configured to provide advantageous support to the various cartridges and/or to ensure that an appropriate main cartridge is appropriately positioned in the housing, before the air cleaner is used.

A variety of advantageous housing features are described for the air cleaner assembly. Also methods and techniques for assembly and use are described.

BRIEF DESCRIPTION OF THE DRAWINGS

FIG. 7 is a fragmentary, schematic, exploded cross-sectional view depicting componentry of FIG. 6.

FIG. 9 is a schematic side elevational view of the main filter cartridge of FIG. 8, with portions shown in cross section.

FIG. 14A is a schematic, cross-sectional view of the end cover component of FIG. 14.

FIG. 15 is a schematic, enlarged, cross-sectional view of a housing main body component of the assembly of FIG. 1.

FIG. 16 is a schematic, enlarged, fragmentary view of designated portion of FIG. 15.

FIG. 17 is a schematic, enlarged, fragmentary view of a designated portion of FIG. 15.

DETAILED DESCRIPTION

I. First Example Embodiment

FIGS. 1-28

A. Selected General Air Cleaner Features.

Figure 1:
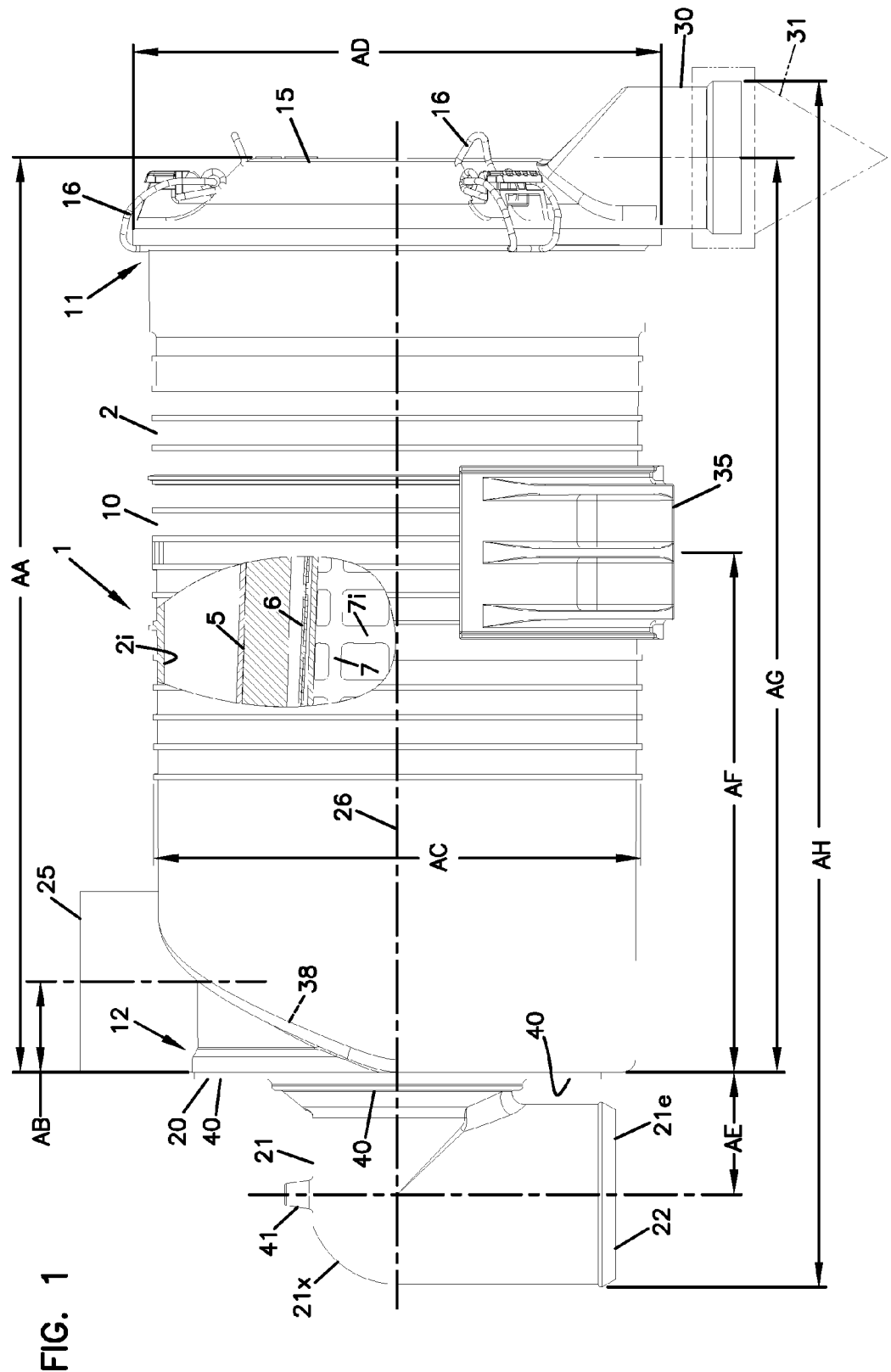
FIG. 1 is a schematic side elevational view of an air cleaner assembly according to the present disclosure with portions broken away to depict internal features in cross section.

The reference numeral 1, FIG. 1, generally indicates an air cleaner or air cleaner assembly according to the present disclosure. The air cleaner assembly 1 includes a housing 2 defining an interior 2i in which is positioned, in the example depicted, a main filter cartridge 5, a secondary or safety cartridge 6 and a cartridge support 7. (The cartridge support 7 can be considered as part of the housing 2, since, in normal use, support 7, is not seperable from housing 2).

Housing 2 includes cartridge receiving body section 10 having a first end 11 and a second, opposite, end 12. First end 11 defines a service opening, through which cartridge 5 (and safety cartridge 6, if desired) can pass during servicing. First end 11 is generally closed by access cover 15, removably secured in placed by latches 16. Service access to interior 2i, then, is obtained by unlatching latches 16, and removing access cover 15 from end 11.

Second end 12, of body section 10, is enclosed by outlet end cover 20 having air flow outlet tube 21 therethrough, with conduit open end 22.

The housing 2 further includes an air flow inlet 25. The particular inlet 25 depicted is a tangential inlet, meaning that air flow into inlet 25 is generally not directed toward central axis 26 of housing 2, but rather is in a direction generally tangential to a circular shape of housing central cartridge receiving section 10. Alternate types of inlets 25 can be used with arrangements according to the present disclosure, however.

Housing 2 further includes a dust ejector outlet tube or drop tube 30. The drop tube 30 provides for evacuation of a certain collected dust and/or water, within interior 2i during operation. In a typical application, the drop tube 30 has mounted thereon a evacuator valve arrangement, depicted schematically in phantom lines, at 31. Such evacuation valves are wall known.

Still referring to FIG. 1, the cleaner housing 2 includes an optional mounting pad arrangement 35 thereon; the mounting pad arrangement 35 being configured so that the housing 2 can be mounted on an assembly for use, such as a vehicle or construction equipment. It is noted that a variety of mounting arrangements for vehicles and other equipment can be used, including mounting pads and/or mounting bands. The mounting pad arrangement 35 depicted, typically includes threaded bosses 35x, FIG. 2, embedded therein, so that housing 2 can be mounted by bolts inserted through a portion of a frame of equipment on which the air cleaner 1 is mounted, and into mounting pad 35.

Referring to FIG. 1, it is noted that for the assembly 1 depicted: the inlet tube 25 is positioned in, and is part of, the central cartridge receiving section 10; outlet tube 21 is positioned in, and is part of, the outlet end cover 20; and, the dust drop tube is positioned in, and as part of, the access cover 15. Alternate configurations and locations of these tube components are possible. However, the particular arrangement is advantageous, for use with features according to present disclosure. It is further noted that the inlet tube 25 is located adjacent end 12, an opposite end of housing 2 from the location of drop tube 30. This will be typical of assemblies according to present disclosure, although alternatives are possible.

In normal operation, air will enter air cleaner assembly 1 through inlet 25. A tangential definition of inlet 25, along with an interior air cyclone ramp 38, causes the air, within interior 2i to initially be directed in a coiled or cyclonic fashion. This will tend to separate larger particles of dust and water out of the airflow. The larger particles of water and dust will migrate to tube 30, and be ejected through the dust drop tube 30. Air still carrying some particulate material therein, will be directed through main cartridge 5; through safety cartridge 6, and to interior 7i of support 7. From here, the now filtered air is generally directed to outlet end 40, of housing 2, and into air flow outlet tube 21, where it can be directed into duct work and then to appropriate engine componentry; typically eventually to be directed into an engine air intake of an internal combustion engine.

Still referring to FIG. 1, at 41 is located at tap usable in association with the restriction indicator equipment. An adapter for mounting mass air flow sensor can also be included in tube 21, if desired.

It is noted that the particular outlet tube 21 depicted, has bend 21x therein, providing a 90° turn in tube 21. Alternatives are possible.

Still referring to FIG. 1, example dimensions are provided, to facilitate an understanding of an example application of techniques according to the present disclosure. It is noted that the techniques can be applied in wide variety of size and shaped units. The example dimensions provided in this disclosure, then, merely indicate an example useable assembly. Referring to FIG. 1, the identified dimensions are as follows: AA=323.6 mm; AB—32 mm; AC=172.1 mm; AD=186.5 mm; AE=43.3 mm; AF=183.8 mm; AG=323.4 mm; and AH=426.5 mm.

Figure 2:
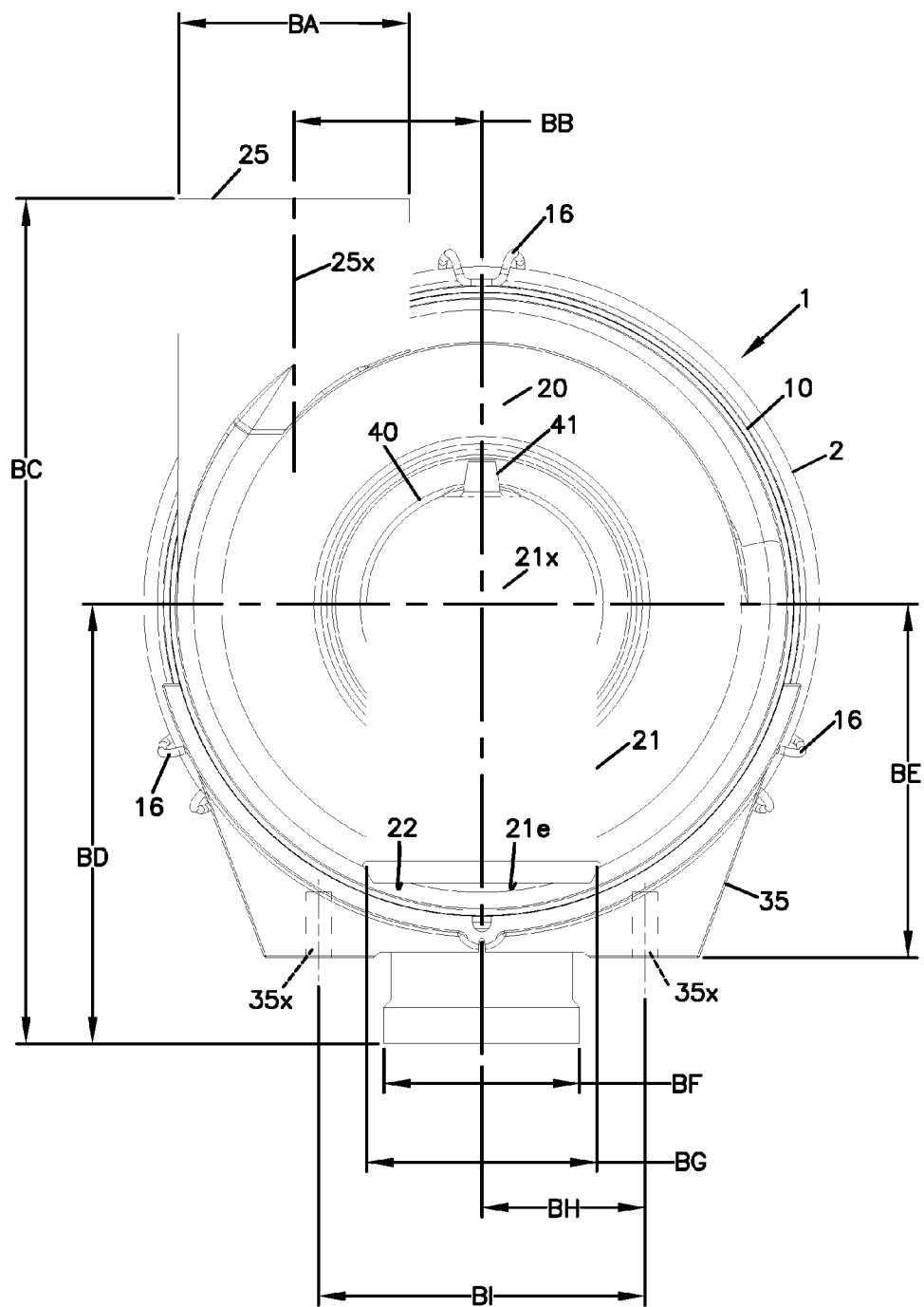
FIG. 2 is a schematic, outlet end, elevational view of the air cleaner assembly of FIG. 1.

Attention is now directed to FIG. 2, an end elevational view generally taken toward end 20. Here, a circular cross-sectional shaped housing section 10 is viewable, along with a tangential inlet nature of inlet 25. In particular, central axis 25x of inlet 25 is directed generally tangentially, with respect to the circular shape of housing body 2 (i.e., housing section 10).

Referring to FIG. 2, it can be seen that particular assembly 1 depicted, includes three (3) latches 16 in access cover 15. An alternate number of latches is possible, but three evenly, radially, spaced latches 16 is convenient.

Referring to FIG. 2, example dimensions are indicated as follows: BA=63.5 mm; BB=51.8 mm; BC=233.4 mm; BD=121.4 mm; BE=97.6 mm; BF=54 mm; BG=63.5 mm; BH=45 mm; and BI=90 mm.

Figure 3:
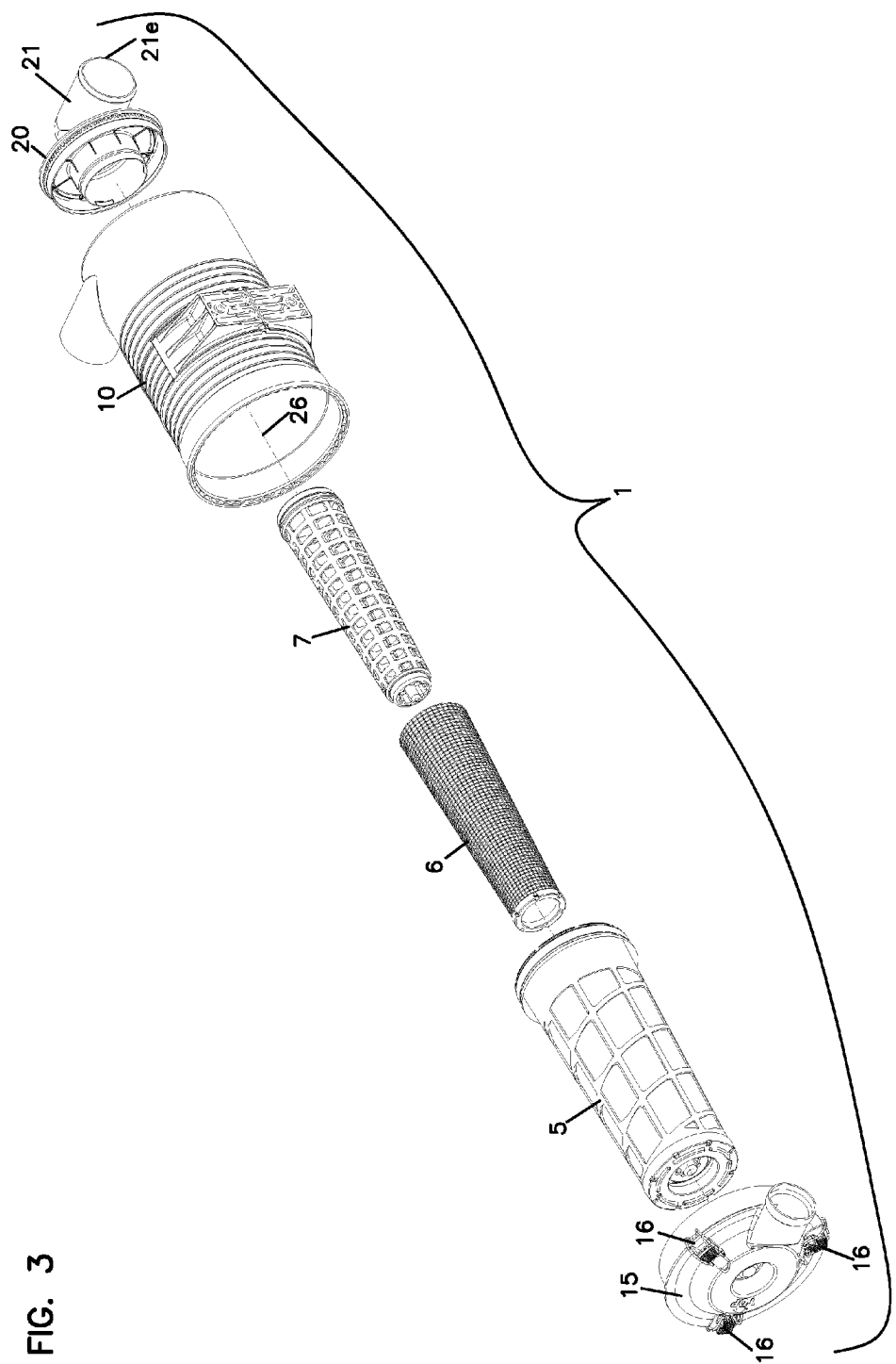
FIG. 3 is a schematic, exploded, perspective view of the air cleaner assembly of FIGS. 1 and 2.

Attention is now directed to FIG. 3, an exploded perspective view of assembly 1. In FIG. 3, the exploded depiction shows separate components usable to form assembly 1. It is noted that with respect to access cover 15, latches 16 would generally be pre-formed and then be positioned in place on cover 15.

Figure 4:
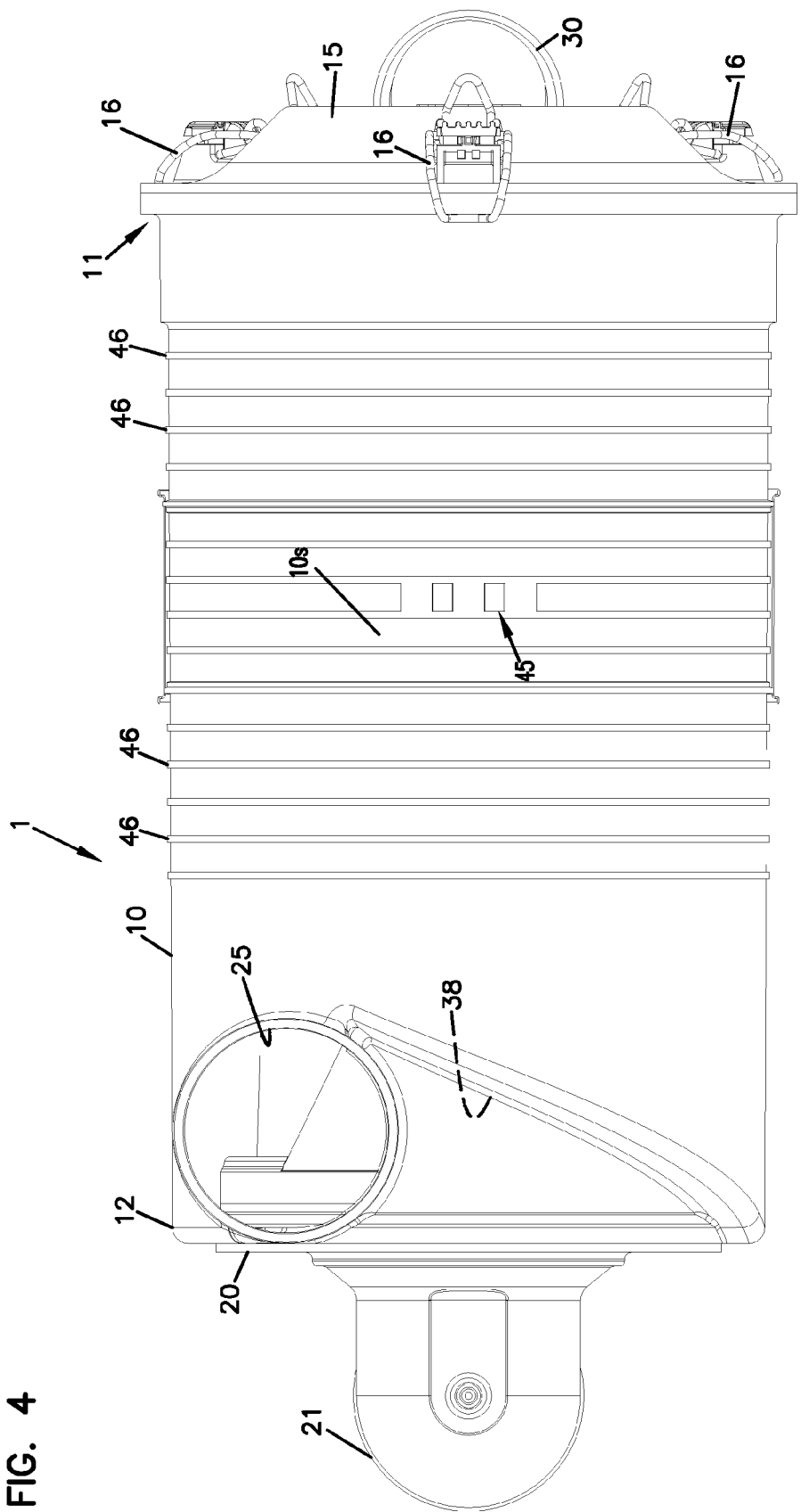
FIG. 4 is a schematic top plan view of the air cleaner assembly of FIG. 1.

In FIG. 4, a top plan view of the assembly 1, when as oriented in FIG. 1, is depicted. At 45 an interlock arrangement is depicted, for engagement with a mounting band arrangement, if used. At 46, strengthening ribs are provided, in sidewall 10s of central cartridge receiving section 10.

Figure 5:
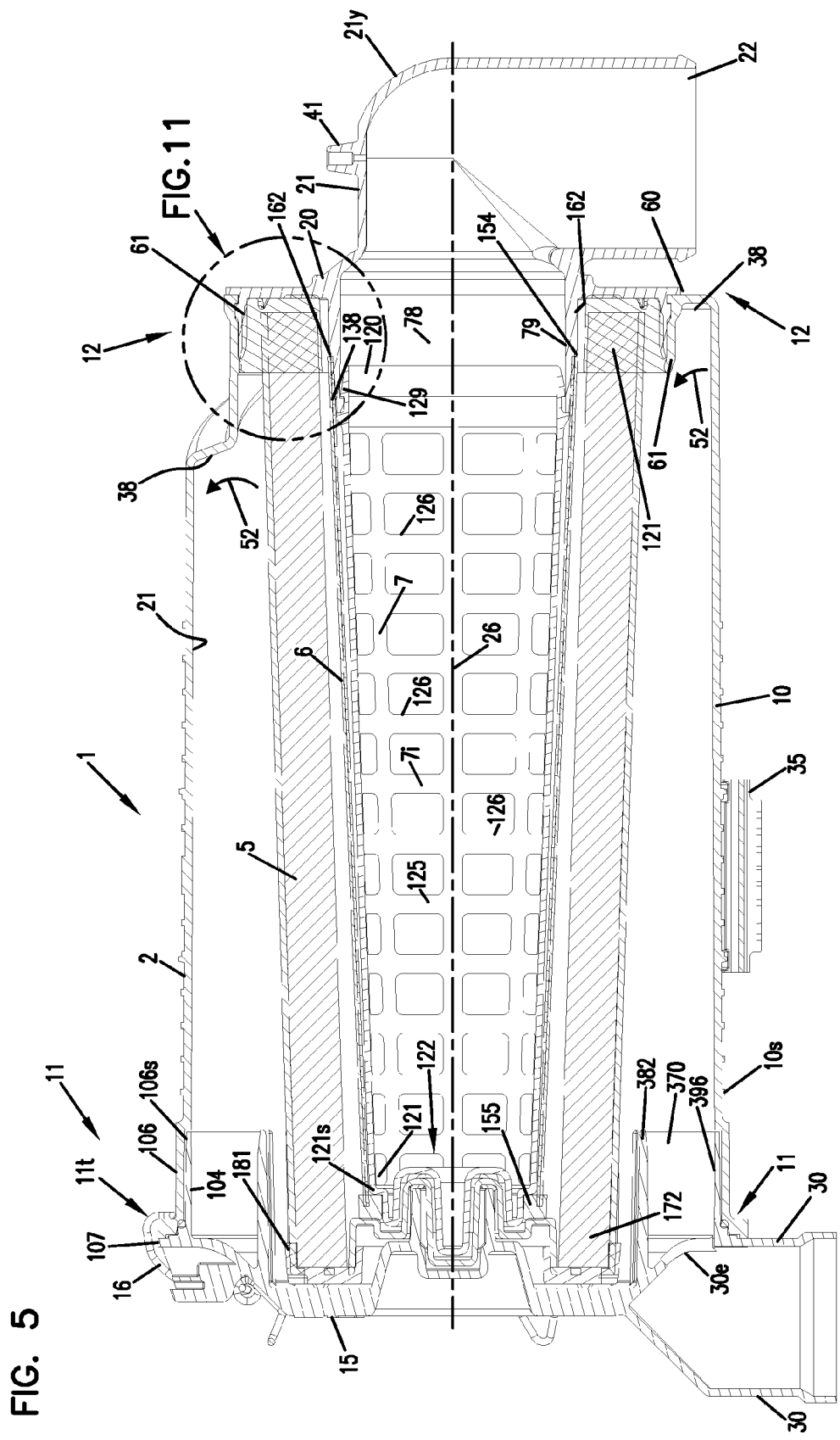
FIG. 5 is a schematic cross sectional view showing the air cleaner of FIG. 1; it being noted that in FIG. 5 the air cleaner is rotated relative to FIG. 1.

In FIG. 5, side cross-sectional view through air cleaner assembly 1 is taken. It is noted that in FIG. 5, the orientation is reversed from FIG. 1, with the outlet tube 21 on the right and the dust drop tube 30 on the left.

In FIG. 5, attention is directed to end ramp 38. End ramp 38 is coiled in a helical pattern. As air is directed through inlet 25, FIG. 1, it will be initially directed by ramp 38 in a generally helical pattern direction indicated by arrows 52, FIG. 5. Still referring to FIG. 5, it can be seen that, for the example assembly 1 depicted, the outlet end cover 20 is separately formed piece, attached (in the example snap-fit) to housing central section 10, to form end wall 40. This feature is discussed in the next section.

B. Selected Features Relating to the Outlet End Cover 20.

Attention is now directed to FIG. 15, a side cross-sectional view of housing central cartridge receiving section 10. End 12, which in the assembly 1 is an outlet end of the housing 2, opposite access cover 15, FIG. 1, is shown defining an end peripheral ring 60, supporting a central internally directed flange 61; flange 61 generally projecting toward end 11 (and access cover 15) from end 12. (Referring to FIG. 5, it is noted that ring 60 and flange 61 are not continuously symmetric around axis 26. Rather, ring 60 varies in size, supporting flange 61 to form the ramp 38).

Referring to FIG. 15, flange 61 includes a base region 62 with an inwardly directed ring 63, surrounding and defining aperture 65. Ring 63 is configured define a rotation indexing arrangement 66 comprising a plurality of adjacent teeth 67. The teeth 67 define a jagged, (radially inwardly directed) surface 67s, which can be used to rotationally index cover 20, in assembly 1, FIG. 1. This is discussed further below.

In FIG. 17, an enlarged fragmentary cross-sectional view of a selected portion of flange 61 is depicted, for clarity. Referring to FIG. 17, axially, outwardly from toothed surface 67s is provided an axial end rim or boss 68. Axially inwardly from surface 67s is provided a second boss 69. It is noted that boss 68 engages recess 67x, in which surface 67s in positioned at a sharp angle, whereas boss 69 engages region 67s at a diagonal.

Referring to FIG. 17, flange 61 includes extension 61x and tip 61t. Along an inner surface 61i, flange 61 includes an inner projection transition 61p, between regions 61x and ribs 61t. Thus, adjacent tip 61t is provided recess regions 61r, in an outer surface of extension 61x.

In FIGS. 15 and 17, example dimensions indicated as follows: FA=103.5 mm; FB=10.5 mm; FC=53.1 mm; FD=89 mm; FE=6 mm; FF=168.1 mm; FG=24.5 mm; FH=140.7 mm; FI=170.2 mm; FJ=175.2 mm; FK=186.5 mm; FL=135.8 mm; FM=133.8 mm; and FN=2 mm. In FIG. 17, IA=24.5 mm; IB=7.2 mm; IC=2.5 mm; ID=1.2 mm radius; IE=30°; IF=16.2 mm; IG=9.2 mm; IH=1.5 mm radius; and II=2 mm radius.

Figure 14:
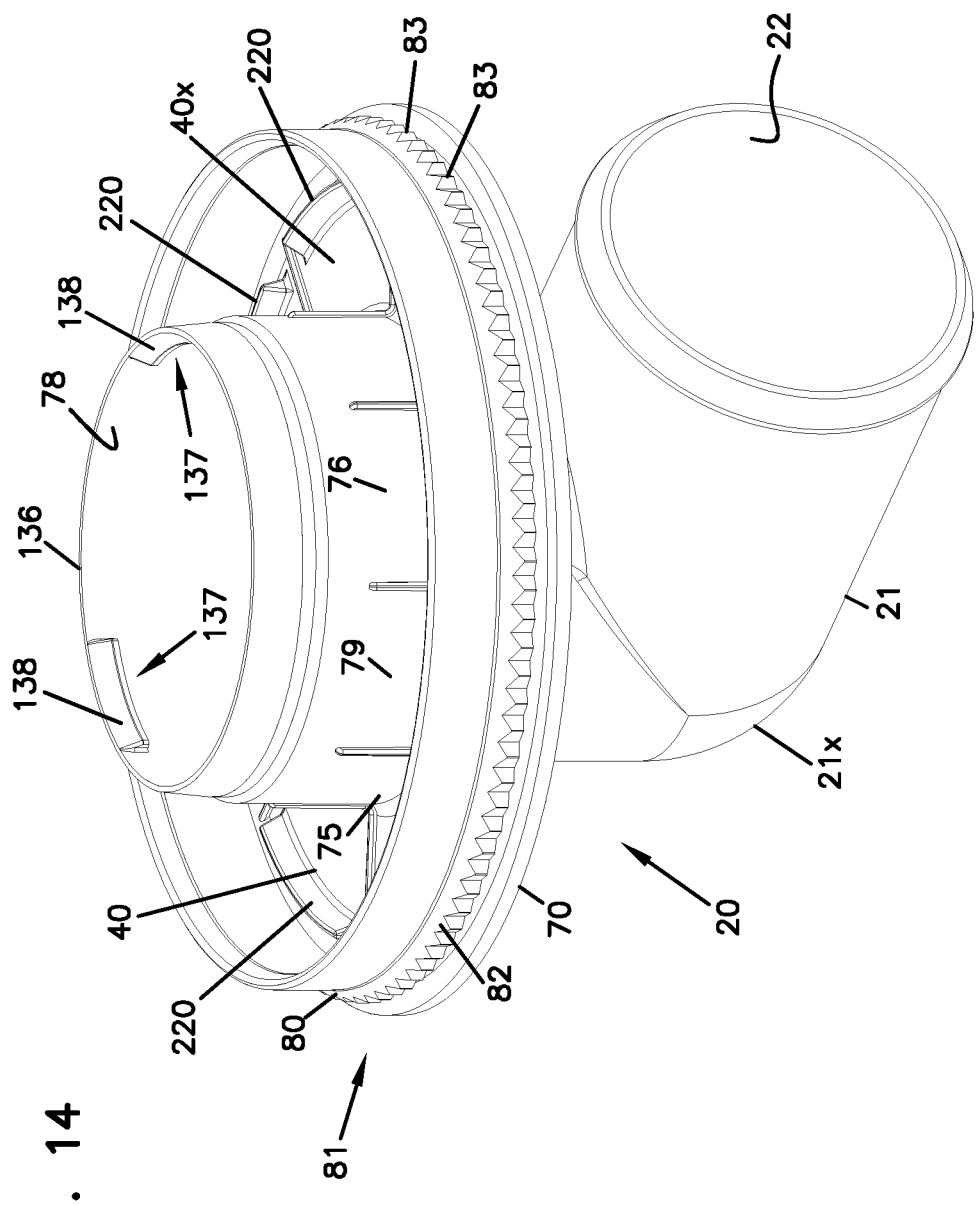
FIG. 14 is a schematic, enlarged, perspective view of an end cover component of the air cleaner assembly of FIG. 1.

Attention is directed to FIG. 14, in which end piece or cover 20 is depicted, with outlet tube 21 thereon. Referring to FIG. 14, for the particular example assembly 1 depicted, the end cover 20 is formed integral with the outlet tube 21. The end cover 20 includes an end surface 70 having outer peripheral rim 71. The outlet tube 20 includes an interior tube section 75 which provides an airflow tube 76 extending through end 70. Tube section 75 is defined by projection 79 having interior surface 78.

Still referring to FIG. 14, end cover 20 includes a peripheral ring 80 projecting away from end cover 70, around projection 79, and into interior 2i of housing 2, when installed. Thus, ring 80 generally extends inwardly of central cartridge receiving section 10, when end cover 20 is in positioned housing 2. Ring 80 includes an outer base section 81, with rotational indexing arrangement 82, comprising plurality of radially outwardly directed teeth 83. The rotational indexing arrangement 82 is configured to engage rotational indexing arrangement 66, FIG. 15, and to retain outer tube 20 in a selected rotational orientation, relative to central cartridge receiving section 10. This engagement occurs by an interaction between teeth 83 and teeth 67, that inhibits undesired rotation of central cartridge receiving section 10 relative to cover 20. It is noted that typically the amount, and shape of interference between teeth 83 and teeth 67, is selected so that it a person exerting appropriate pressure on tube 21, can rotate piece 20 relative to the housing central cartridge receiving section 11. Thus, the tube 21 can be rotated for selected mounting engagement with tube 21 selected and in a desired direction. However, the amount of interference, and shape of interference, between teeth 83 and teeth 67 is typically selected so that outlet end 20 will retain a selected rotational orientation with respect to housing section 10, once mounted, with respect to an ordinary vibration effects and similar effects expected to encountered, during air cleaner operation.

Referring now to FIGS. 1-3, generally outer tube 21, which has been elbow 21 therein, should be oriented to direct end 21e in whatever direction is desired, for engagement with duct work, when air cleaner assembly 1 is mounted on the equipment. An equipment manufacturer may provide specific direction to the air cleaner manufacturing company, for particular location of direction for outer tube 12. With the assembly characterized, cover 20 can be mounted in the appropriate radial orientation, relative to the housing central section 10, to accommodate this, during assembly. The outer tube 21 will be retained in the selected rotational orientation, due to the rotational indexing and interlock provided by rotational indexing arrangement 66 engaged in rotational indexing arrangement 82. On the other hand, a modification can be made by grabbing tube 21 and rotating it sufficiently to overcome the interference between the teeth 83, 67, as previously described, to obtain an orientation of tube 21 at a desired direction.

End cover 20 is positioned on the housing central cartridge receiving section 10, in the selected rotational orientation. The end cover 20 is secured to the housing central cartridge receiving section 10 by a snap fit, involving radially inward projection 68 on end 12, FIG. 17, projecting into radial recess 72, FIG. 14A on end cover 20, between flange 71 and tooth arrangement 81. It is noted that there would typically not be a seal provided at a joint 74, FIG. 11, between end cover 20 and housing section 10 in housing 2. A water (weather) seal preventing leakage through joint 74 will, however, be desirable. One is provided in advantageous manner by an internally received main filter cartridge 5, once installed as discussed below.

C. Access Cover 15.

Referring again to FIG. 1, it is noted that generally the dust drop tube 30 should be directed downwardly, when the air cleaner assembly 1 is mounted in a vehicle or other equipment for use. Since the drop tube 30 is mounted on the access cover 15, this means that the access cover 15 should be positionable in a variety of rotational orientations, relative to housing section 10, for the air cleaner assembly 1 to be widely useable by mounting in a variety of orientations. Access cover 15, and, in general housing 2, includes features that account for alternate rotation alignment between cover 15 and housing center section 10.

With respect to this, attention is again directed to FIG. 15, a cross-sectional view of central cartridge receiving section 10. Here end 11 is viewable, with radial outwardly directed flange 89. The flange 89 includes a flange surface 90, which generally faces opposite end 12 of housing section 10. The example flange surface 90 is continuous, in extension around body 10. Flange 89 is configured so that flange surface 90 can be engaged by latches 16, when access cover 15 is mounted in place. It is preferred to provide an indexing arrangement between access cover 15 and housing section 10, so that access cover 15 will not rotate when mounted on housing 10. Further, this indexing arrangement can be used to ensure that drop tube 30 is directed downwardly, no matter what the rotational orientation of central cartridge receiving section 10.

With respect to rotational indexing of access cover 15, attention is directed again to FIG. 15, and in particular to interior region 92, of flange 89. Region 92 includes a rotational indexing arrangement 95, in the form of a ratchet arrangement 95r comprising spaced teeth 96, each tooth 96 being directed axially away from end 12. As will be understood, the rotational indexing arrangement 95 is configured to provide rotational indexing to access cover 15, when access cover 15 is mounted, inhibiting rotation of access cover 15 independently of central cover receiving section 10. This will be understood by reference to FIGS. 12 and 13.

Figure 12:
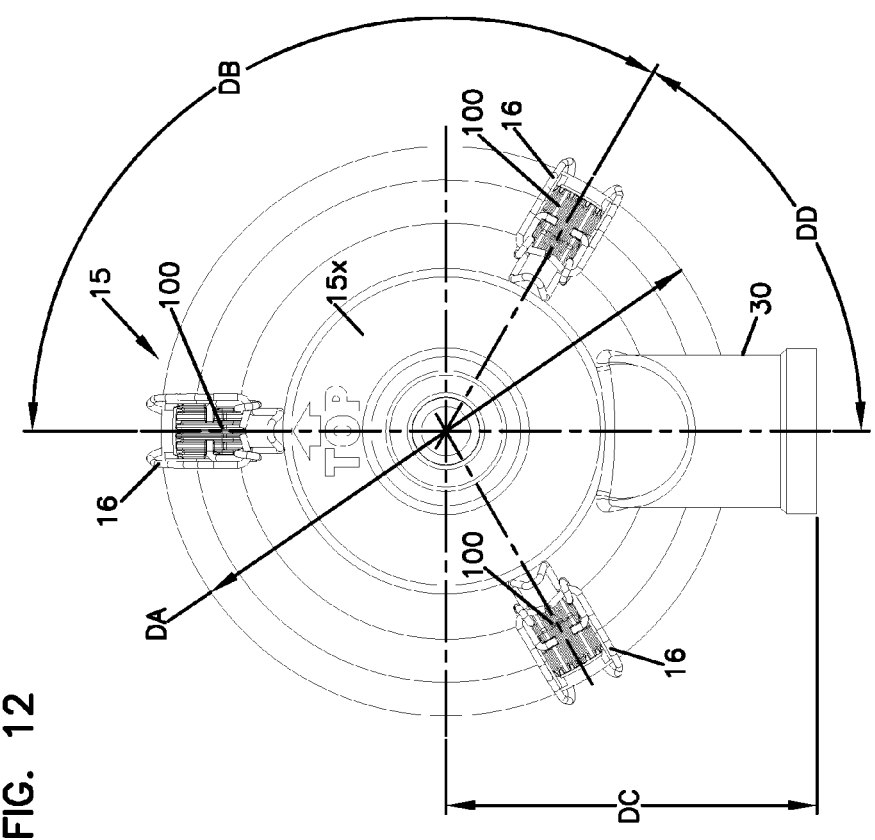
FIG. 12 is a schematic, outside end, elevational view of an access cover component of the assembly of FIG. 1.

Referring first to FIG. 12, access cover 15 is viewable, the a view being taken generally toward outside surface 15x of access cover 15. Latches 16 can be seen mounted on bosses 100. Typically, the bosses 100 are positioned so that the latches 16 cannot reach past an outer periphery of flange 89, to engage flange surface 90, FIG. 15, unless the access cover 15 is fully and properly installed on housing central section 10. This is typically not possible, when cartridge 5 is housing 2, unless the cartridge 5 is properly installed.

Figure 13:
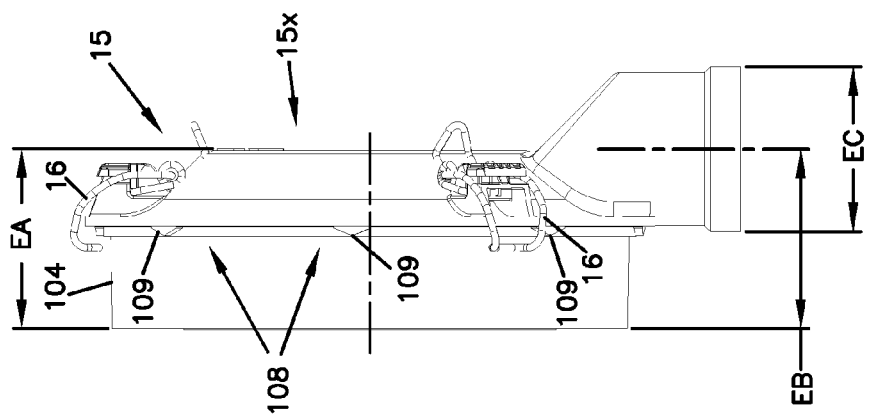
FIG. 13 is a schematic, side elevational view of the component of FIG. 12.

Attention is now directed to FIG. 13, a side elevational view of access cover 15. Here, access cover 15 can be seen to have a projecting flange 104 surrounded by a ring 104. Flange 104 is sized to be inserted within end 11 center section 10, when access cover 15 is mounted. As shown in FIG. 5, flange 105 is generally sized to either have a surface-to-surface fit with rim 106 of section 10, for it be only spaced therefrom a small amount. Flange 104 may be configured to bottom out against shelf 106s in housing 10, as outer flange 107 is sized to bottom out against tip 11t.

Surrounding flange 104, FIG. 13, is provided a rotational indexing arrangement 108, comprising spaced teeth 109; the teeth 109 being directed toward end 20 of housing 2 when access cover 15 is installed; and, the teeth 109 being sized for interlock with, and in rotational interference with, selected ones of teeth 96. Thus, when access cover 15 is positioned in place an housing section 10, and latches 16 are secured by engagement of with flange 89, FIG. 15, the access cover 15 will be retained securely in place and will not rotate. Thus, drop tube 30 is positioned and maintained in a selected downward rotation.

Referring to FIGS. 12 and 13, some example dimensions are provided as follows: DA=186.5 mm; DB=120°; DC=121.4 mm; DD=60°; EA=58.8 mm; EB=58.7 mm; EC=54 mm.

In FIG. 14A a cross-sectional view of end piece or cover 20 is depicted. Example dimensions provided in FIG. 14A are as follows: OA=143.6 mm; OB=135.6 mm; OC=78.6 mm; OD=76.8 mm; OE=74.8 mm; OF=4.6 mm; OG=5.2°; OH=20.7 mm; OI=27.8 mm; OJ=57 mm; OK=63.5 mm; and, OL=65.5 mm.

Typically, end surface 40, FIG. 14A, is configured to project radially inwardly from outer flange 71 toward base 21b of tube 21, a distance indicated generally at D1, of at least 10 mm, typically at least 12 mm, usually at least 18 mm, and typically an amount within the range of 18-32 mm.

In FIG. 16, an enlarged, fragmentary view of a portion of FIG. 15 is proved. Referring to FIG. 16, dimensions indicated are as follows: HA=34.1 mm; HB=5.5 mm; HC=3.5 mm; HD=10.5 mm; HE=1.1 mm; HF=2.5 mm; HG=5.7 mm; and, HI=8.1 mm.

D. Central Support 7

Referring again to FIG. 5, assembly 1 includes, mounted within housing interior 2i, a central tower or cartridge support 7. The cartridge support 7 includes a first, open, end 120 and a second, opposite, end 121, in the example depicted closed by end cover 122. Sidewall 125 extends between ends 120, 121. The sidewall 125 is perforate, i.e. includes a plurality of apertures 126 therethrough. As will be understood from detailed discussion features described below, although alternatives are possible, cartridge support 7 is not molded integral to a remaining portion of housing 2. Rather support 7 is a pre-formed piece, snap-fit into housing 2, when housing 2 is assembled. In particular cartridge support 7 is snap-fit in place by attachment to a portion of end cover 20.

Figure 18:
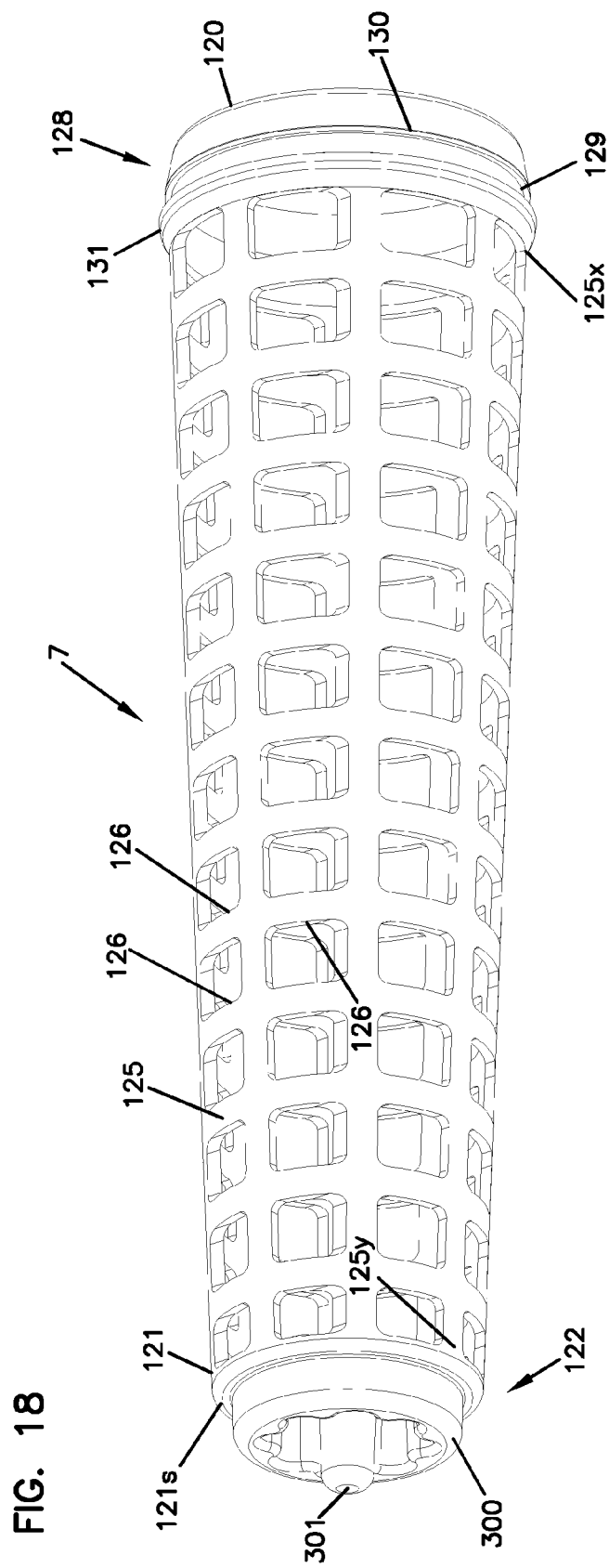
FIG. 18 is an enlarged, schematic, side perspective view of a center support component of the air cleaner assembly of FIG. 1.

Attention is now directed to FIG. 18, in which cartridge support 7 is depicted in a perspective view. The perspective view is generally a side view, also taken partially toward end cover 122. End cover 122 for the example depicted is closed, i.e. it includes no apertures therethrough. End cover 122 includes features therein, for engagement with the filter cartridge 5, described in greater detail below. Referring to FIG. 18, it is noted that the example cartridge support 7 depicted, is configured with sidewall 125 having a generally conical shape, tapering downwardly in cross-sectional size, from end 125x, adjacent end 120, to end 125y, adjacent end 121. A variety of specific shapes of cartridge support 7 are possible, the example configuration depicted being preferred.

Referring to FIG. 18, at 128, a connector arrangement is depicted, for securely mounting cartridge support 7 within housing 2. The particular connector arrangement 128 depicted, includes a recess or trough 129 positioned between a first ring 130 and a second 131.

Figure 19:
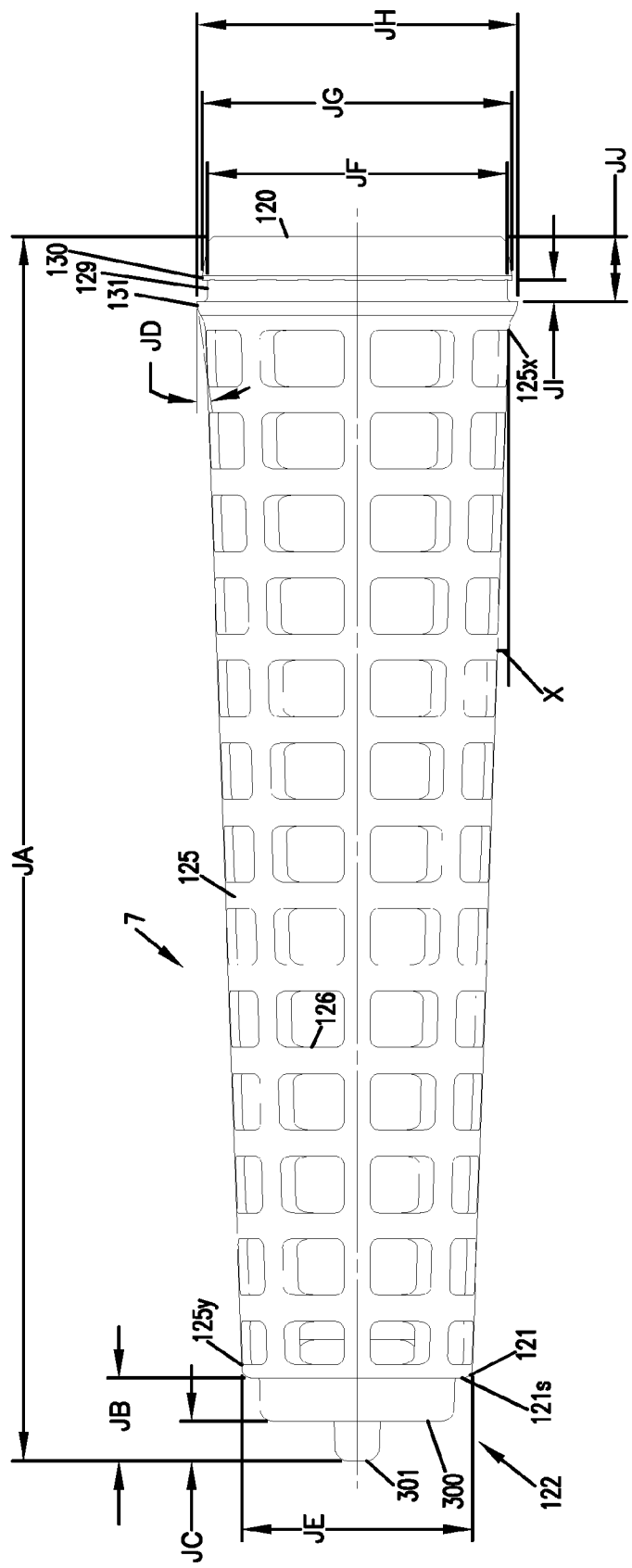
FIG. 19 is a schematic, side elevational view of the center support component of FIG. 18.

Referring to FIG. 19, a side elevational view of cartridge support 7 is depicted. Recess or trough 129 is again viewable, between rings 130, 131. In FIG. 19, the example dimensions are provided as follows: JA=281.5 mm; JB=19.1 mm; JC=9.1 mm; JD=8°; JE=52.9 mm; JF=68.8 mm; JG=71.2 mm; JH=73.5 mm; JI=5 mm; and, JJ=15 mm.

It is noted that the sidewall 125 generally includes a conical angle of taper, indicated at X, downwardly from end 125x to end 125y of at least 1°, typically not more than 5°.

Figure 20:
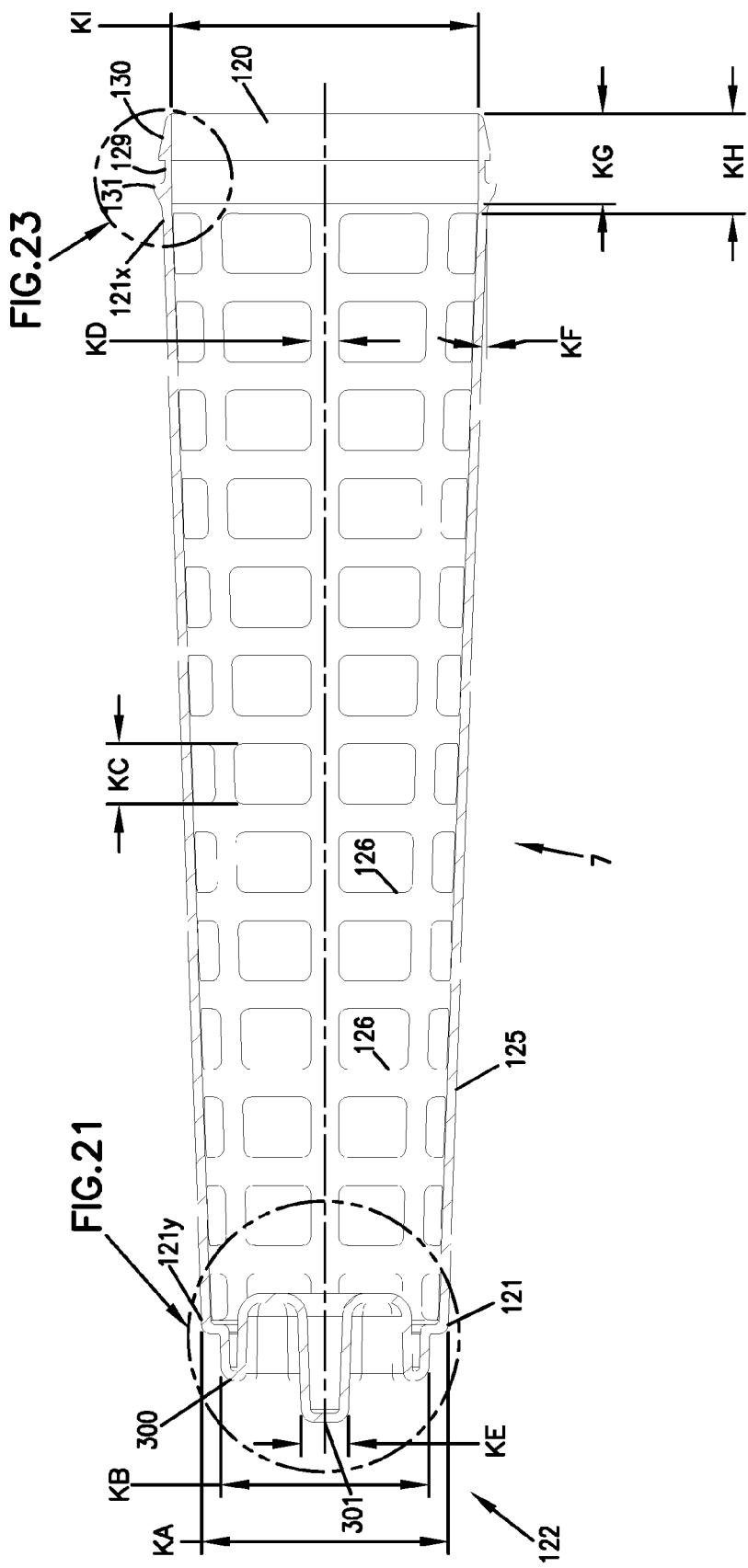
FIG. 20 is a schematic, cross-sectional view of the center support of FIG. 19.

Attention is now directed to FIG. 20, a cross-sectional view of cartridge support 7. The example dimensions provided in FIG. 20 are as follows: KA=52.9 mm; KB=44.6 mm; KC=13 mm; KD=6 mm; KE=10.2 mm; KF=2°; KG=19.4 mm; KH=21.5 mm; and, KI=65.93 mm.

In FIG. 20, a cross-sectional view of support 7, the example cross-sectional profile of ring 130, trough 129 and ring 131 are provided to facilitate an understanding of the mounting cartridge support 7 within the housing 2. A portion of cartridge 7, in cross-section, depicting a cross-sectional profile of these features is shown in an enlarged view, in FIG. 23.

Figure 23:
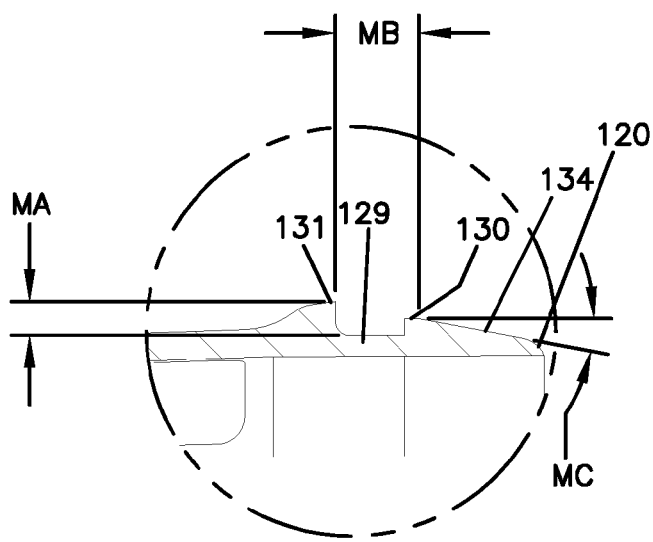
FIG. 23 is a schematic, enlarged, fragmentary view of a selected and identified portion of FIG. 20.

Referring to FIG. 23, ring 131 can be seen to from a large, abrupt, end stop to trough region 129 along a side of trough 129 opposite open end 120. Ring 130, on the other hand, which is on an opposite side of trough 129 from ring 131, is a lower ring in projection away from trough 129, and generally provides a slanted, ramped, surface 134 extending from open end 120 to trough 129. In general, as cartridge support 7 is installed, an engagement arrangement extends over ring 130 and into trough 129, to secure cartridge 7 in position by a snap fit connection.

Referring to FIG. 23, example dimensions indicated herein are as follows: MA=2.4 mm; MB=6 mm; and, MC=11°.

Attention is now redirected to FIG. 14, a perspective view of end cover 20. As previously described, end cover 20 includes a centrally positioned ring 76 therein, configured to be directed axially into housing interior 2i from end cover 20, when the end cover is installed in housing central cartridge receiving section 10. Ring 76 includes an inner surface 78. Adjacent inner rim 136, of ring 76, along inner surface 78 is provided tab arrangement 137 comprising an engagement arrangement, in the example depicted comprising spaced tabs 138. For the particular tab arrangement 137 depicted, there will be three spaced tabs 138, radially evenly spaced, only two being viewable in FIG. 14.

A cross-sectional view of tabs 138 is generally depicted in FIG. 14A. Referring to FIG. 14A, a tab 138 is viewable having a slanted outer surface 138s slanting inwardly from rim 136 to end 140, at which point edge 141 is provided.

Attention is now directed to FIG. 5, as support 7 is pushed into ring 76, end 120 will be positioned in ring interior 78. Ring 130, FIG. 11, will pass across tabs 138, with tabs 138 then becoming locked within recess 129 between rings 130, 131. This is shown in an enlarge schematic view, in FIG. 11.

For a typical air cleaner assembly 1, the cartridge support 7 is not removed or disconnected from the housing 2, once installed. That is, the cartridge support 7 is permanently secured to ring 76 of end cover 120 once installed. Also, there is typically no seal provided between support 7 and ring 76.

E. Safety Cartridge 6

Figure 25:
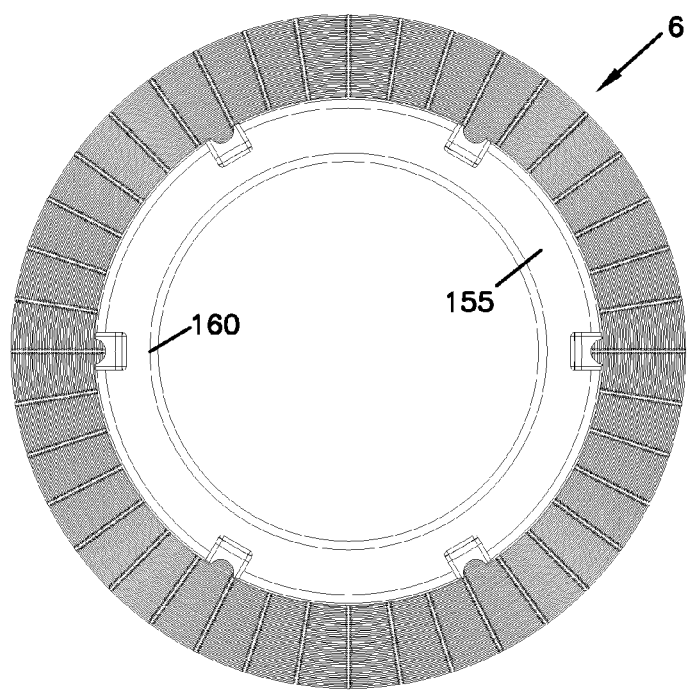
FIG. 25 is an enlarged, end elevational view of the safety cartridge of FIG. 24; taken toward an end having an end cap thereon.
Figure 26:
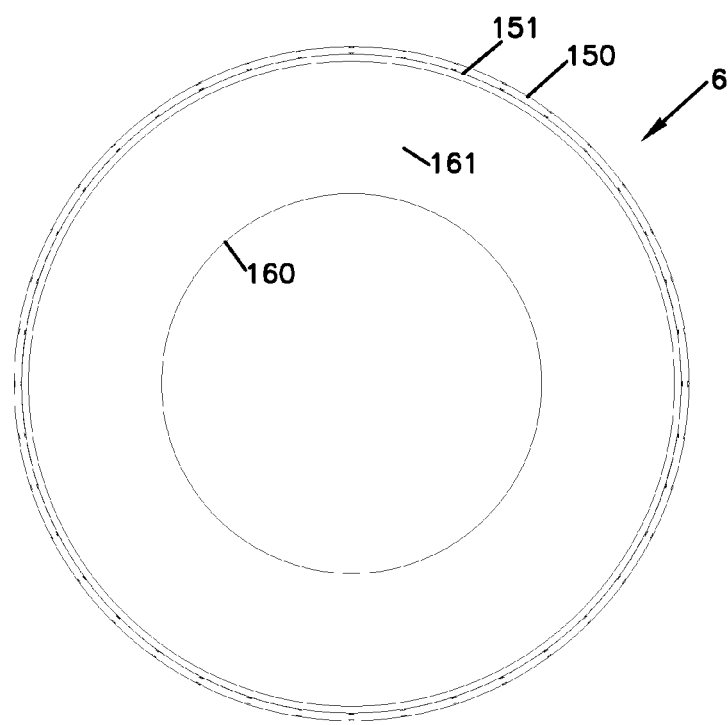
FIG. 26 is a schematic, end elevational view of the safety cartridge component of FIG. 24; taken toward an end having no end cap.

Referring to FIG. 5, assembly 1 includes an optional secondary or safety cartridge 6 which, in installation, is positioned over cartridge support 7, and is received with an interior of main filter cartridge 5, when installed. The safety cartridge 6 is depicted in FIGS. 24-26.

Figure 24:
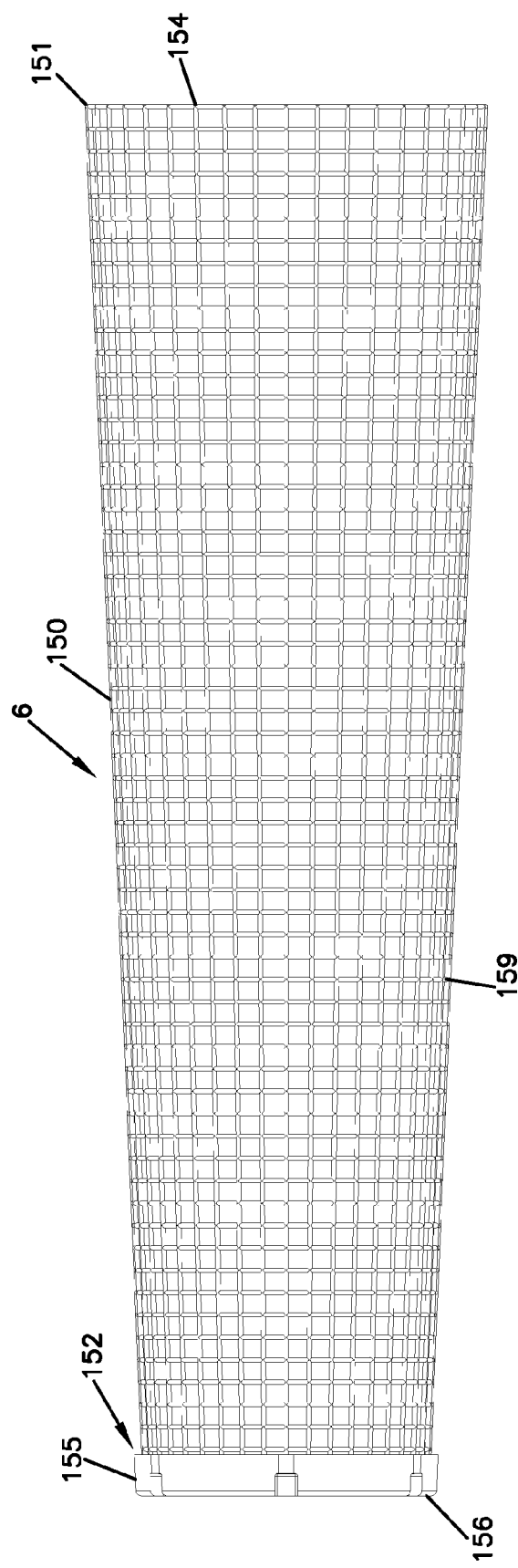
FIG. 24 is an enlarged, schematic, side elevational view of a safety cartridge component of the assembly of FIG. 1.

Referring first to FIG. 24, the safety cartridge 6 comprises sidewall 150 extending between a first end 151 and second end 152. The first end 151 is typically an open end 154, in the example shown having no end cap threat. End 152 is typically provided with end cap 155 thereon, typically molded-in-place. The end cap 155, as will be see from further descriptions below, is typically provided as an open ring 156. Open ring 156 is provided with an appropriate gasket characteristic, to form a seal in use. Examples of a manner in which this can be provided include: molding the end cap 155 from a soft, compressible, seal forming material, such as a foamed polyurethane described below; forming a portion of end cap 155 from a rigid material, and then applying soft, compressible, gasket like material thereto, for example by a co-molding process or using an adhesive; or, forming end cap 155 from a material defining a flex seal, such as a Santoprene material. In the example depicted, the former is used, i.e. end cap 155 is molded from a material capable of forming a seal, such as foamed polyurethane. Foamed polyurethane usable for this described is generally herein below.

The sidewall 150 is porous (i.e. permeable to gas flow therethrough). The sidewall 150 can be formed as a mesh or grid such as mesh 159, FIG. 24. A polypropylene mesh, for example, can be used.

For the particular example assembly depicted, the cartridge 6 is intended to operate as a safety cartridge, and thus air filter media, typically not pleated, is provided adjacent the sidewall 150. For the particular depicted, a conical media segment is positioned on an interior of wall 150, against wall 150. A variety of arrangements can be used to secure the media in place. It is anticipated that a media cone may be sealed at a seam by sonic welding, while at the same time being tacked to sidewall 150, when the media comprises a synthetic-containing fiber material.

It is noted that in some applications, cartridge 6 can be provided without media thereon, when a secondary filter is not desired.

Referring to FIG. 24, the particular sidewall 150 depicted generally has a conical shape, tapering downwardly in extension from end 151 to end 152. The conical shape to sidewall 150 will generally be made to match the conical to shape to sidewall 125 of support 7.

Attention is now directed to FIG. 25, an end elevational view of cartridge 6 taken generally toward end piece or end cap 155. Here aperture 160, defined through open end cap 156, is viewable. Aperture 160 will generally communicate with an interior of cartridge 6, inside of support 150.

In FIG. 26, an end elevational view or cartridge 6 taken generally toward end 151 is viewable, schematically. Here, media cone 161 is viewable.

Attention is now directed to FIG. 5. It can be seen that when access cover 15 is removed from the remainder of housing 2, and cartridge 5 is not installed, end 154 of safety cartridge 6 can be pushed over sidewall 125 of support 7, until: the sidewall 150 rests against sidewall 125. end 154 engages ring 162 on end piece 20, of FIG. 11; and, end cap 155 engages shoulder 121s at end 121 of support 7.

Figure 11:
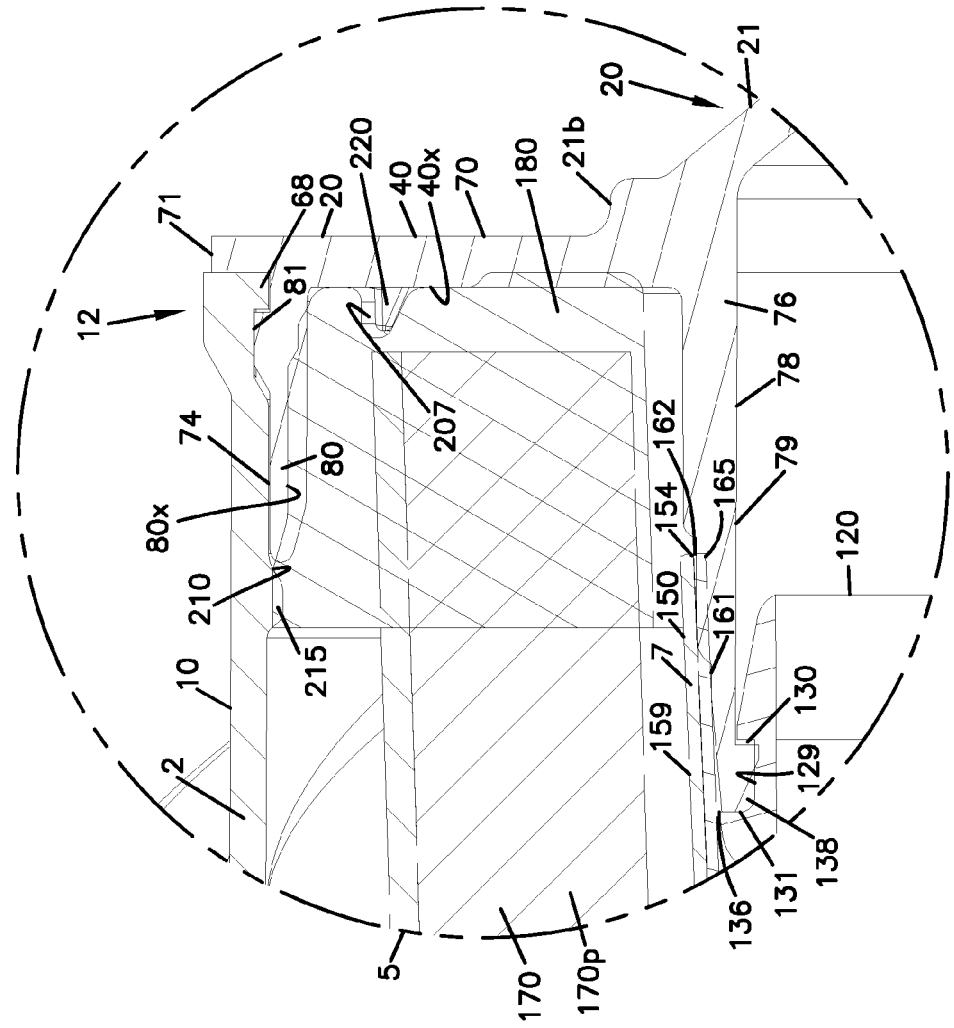
FIG. 11 is an enlarged, schematic, fragmentary view of a selected, designated, portion of FIG. 5.

Referring to FIG. 11, a portion of media 161 in safety cartridge 6 is viewable, surrounded by mesh 159. End 154 of mesh 159 is seen pushed over ring 76 toward stop 162, with mesh 159 generally being secured around surface 165, surface 165 being provided with a tapered downward shape from stop 162 toward tip 136.

Engagement between end 154 of cartridge 6 and projection 79, along surface 165 can be sufficient and adequate for safety filter operation, in some instances. Thus, safety filter or safety cartridge configuration described for cartridge 6, avoids a manufacturing step of providing an end cap to end 154. That is, end 154 includes no end cap thereon, in the example depicted. Of course in some applications and the techniques described herein, an end cap can be provided at end 154.

F. The Main Filter Cartridge 5

Attention is again directed to FIG. 5. In FIG. 5, main filter cartridge 5 is depicted installed within air cleaner housing 2, surrounding support 7 and safety cartridge 6. With respect to general features of the main filter cartridge 5, attention is first directed to FIG. 8.

Figure 8:
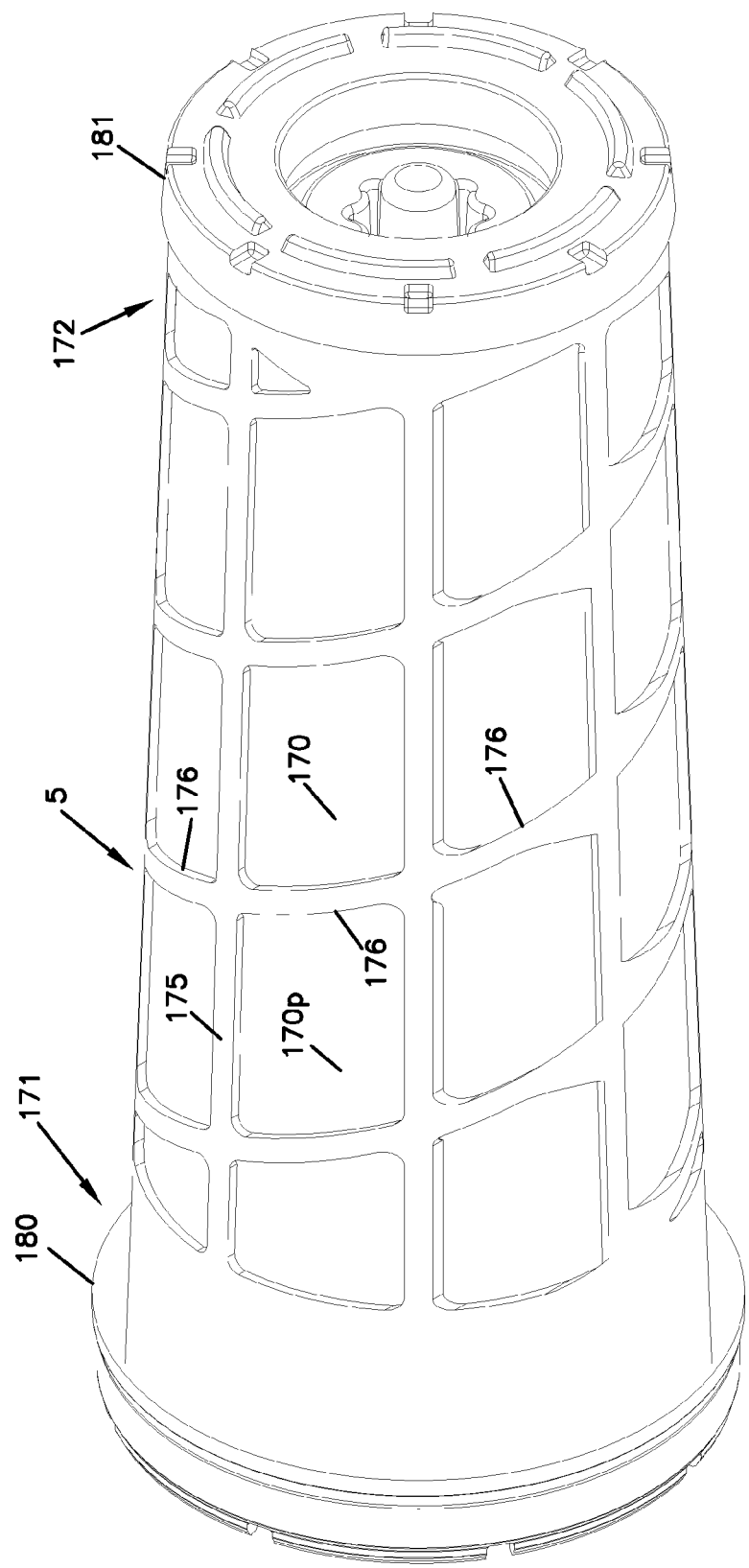
FIG. 8 is a enlarged schematic closed-end elevational view of a main filter cartridge component of the assembly of FIGS. 1-3.

Referring to FIG. 8, the main filter cartridge 5 includes a media pack 170, comprising media, 170p, extending between a first end 171 and a second end 172. For the cartridge 5 depicted, the media 170p is surrounded by outer support framework 175 having apertures 176 therein.

At end 171, (first) end cap 180 is provided. At end 172, (second) end cap 181 is provided.

The particular view of FIG. 8, is a perspective view taken toward a side and also end 172. From the view of FIG. 8, it can be seen that the particular example end cap 181 depicted, on end 172, is a closed end cap, having no aperture therethrough; although alternatives are possible. The example end cap 181 depicted includes various features, described below, for preferred engagement with a portions of the housing 2, when the cartridge 5 is installed.

Attention is now directed to FIG. 9, a side elevational view of cartridge 5, with portions shown in cross-sectional view to facilitate an understanding of detail. Here, media 170p can be viewed as extending between ends 171, 172. The particular media 170p depicted, comprises a pleated media, although alternatives can be used.

Referring to FIG. 9, media 170 can be seen surrounding and defining an open filter interior 185. The interior 185 is sized and shaped to be positioned over safety cartridge 6 and cartridge support 7, when cartridge 5 is installed in the housing 2.

Attention is now directed to end cap 180 in FIG. 9. End cap 180 is generally an open cap, having a central open aperture 190 therethrough, in communication with cartridge interior 185. End cap 180 is typically molded-in-place and typically includes thereon (or therein) a material capable of forming a seal to a portion of the housing 2, when installed. Typically end cap 180 will be molded from a material such as a foamed polyurethane as described herein below.

Still referring to FIG. 9, the example cartridge 5 depicted, can be viewed as having a conical shape, tapering downwardly in cross-sectional size from end 171 to end 172. The angle of taper, indicated at generally at Y, will typically be less than the angle of taper X for the support 7, and safety cartridge 6. Typically the angle of taper Y will be less than 1.5°, and usually at least 0.5°.

Also referring to FIG. 9, cartridge 5 can be seen as including a pre-form 195 having perforate sidewall section 175 and end section 196 including: a (closed) central region 197; and, a perforate end region 198 in overlap with an end 172 of media pack 170. During assembly, media 170p can be positioned in pre-formed support 195 and be positioned against perforate end 198, surrounding a portion of end section 196. The pre-formed support 195 then can support the media pack 170 in a conical form. End cap 181 can then be molded or potted in place, for example by being formed of a molded-in-place end cap material such as foamed polyurethane as described herein below. When end 172 is secured, the combination of the outer support 195 and media 170p can then be positioned with end 171 in a mold, to mold-in-place in cap 180.

Still referring to FIG. 9, cartridge 5 includes an outer peripheral seal region 200 configured to define an outwardly directed housing radial seal surface 201. The particular outwardly directed radial seal surface 201 depicted includes: tip region 202 defined by taper or steps 203; (non-stepped or flat) intermediate region 205; and, end shoulder projection region 206. Generally region 206 comprises a larger diameter region of end cap 180, than any other region.

Referring to FIG. 9, the example dimensions are indicated as follows: CA=135.2 mm; CB=82.7 mm; CC=1 mm; CD=23.5 mm; CE=312 mm; CF=13 mm; CG=3 mm; CH=106.4 mm; and, CI=57 mm.

Figure 9A:
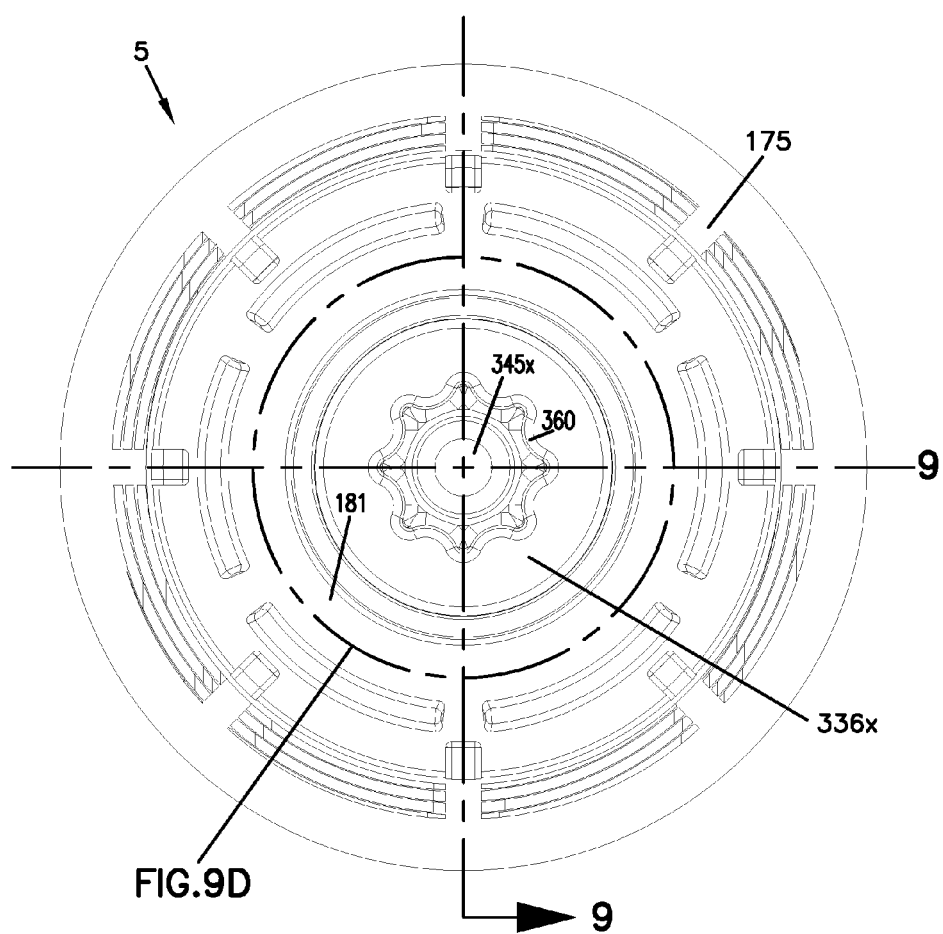
FIG. 9A is a schematic closed end elevational view of the cartridge of FIG. 9.

In FIG. 9A, an end elevational view of cartridge 5, taken toward end cap 181 is viewable. In FIG. 9A, cross-section indication is provided, for the portion in cross-section depicted in FIG. 9.

Figures 9B, 9D:
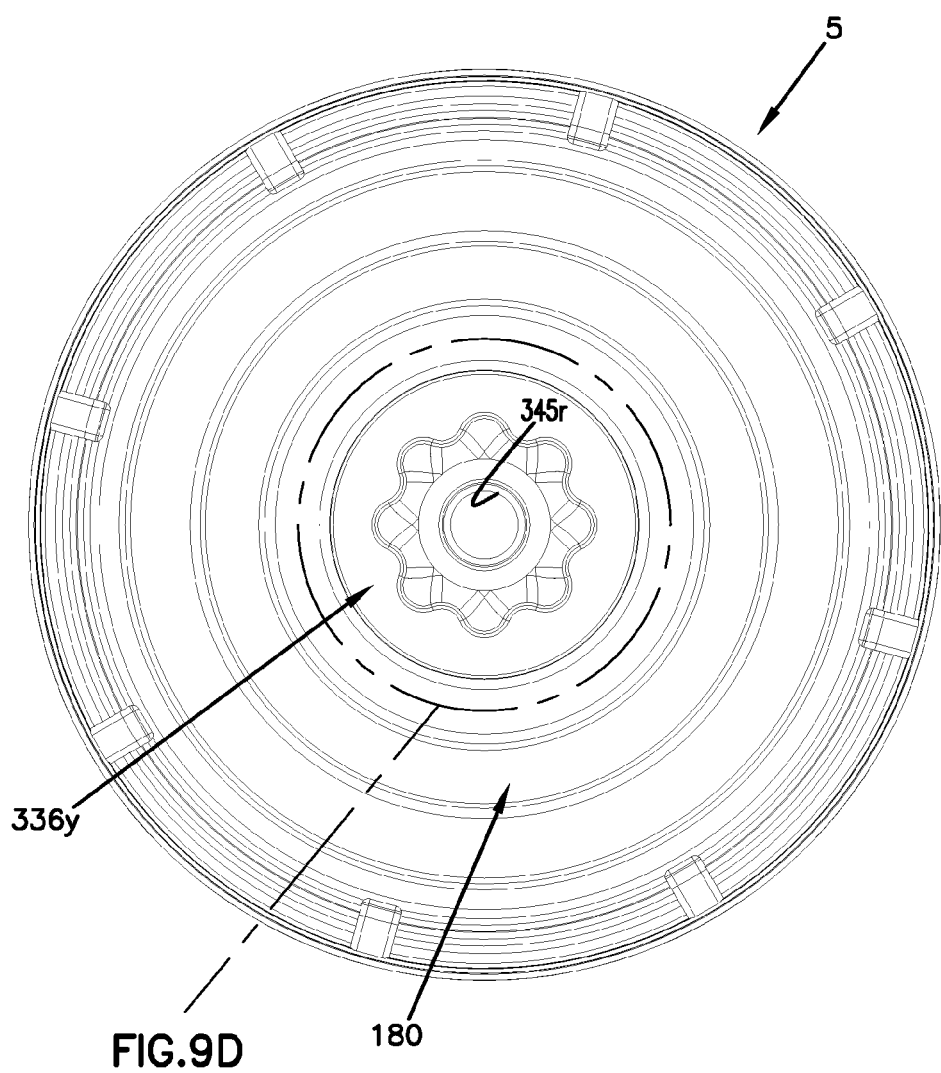
FIG. 9B is a schematic open end elevational view of the cartridge of FIG. 9.
FIG. 9D is a schematic, enlarged, fragmentary view of a portion of FIG. 9A.

In FIG. 9B, an end elevational view of cartridge 5 taken toward end cap 180 is provided.

Figure 9C:
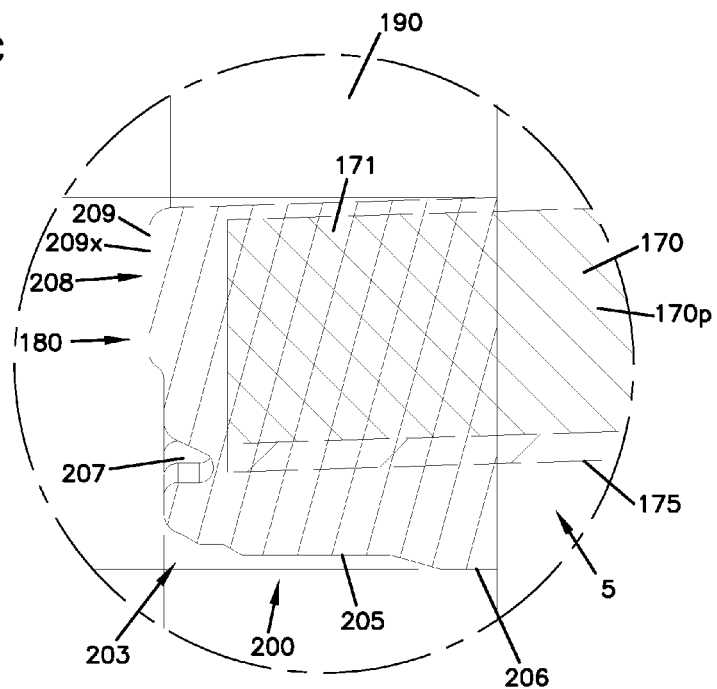
FIG. 9C is a schematic, enlarged, fragmentary view of a designated portion of FIG. 9.
Figure 9D:
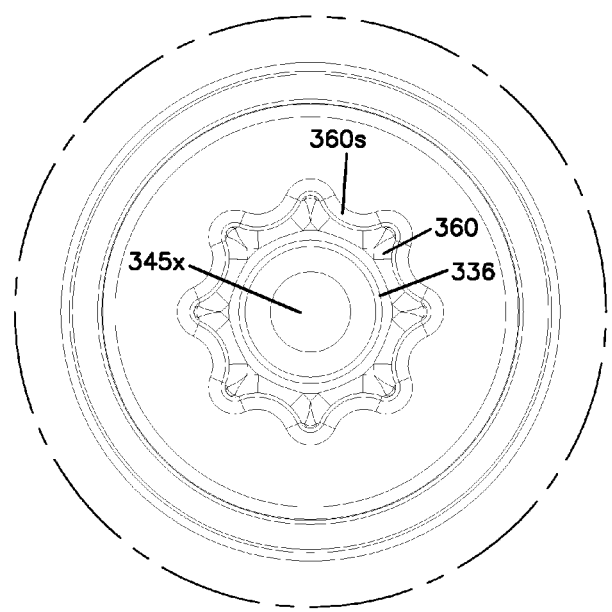

In FIG. 9C, an enlarged fragmentary view of a portion of cartridge 5, indicated generally in FIG. 9, is provided. Here, a portion seal arrangement 200 on end cap 180 are viewable. Referring to FIG. 9C, seal arrangement 200 is a outer peripheral seal arrangement, surrounding a portion of end cap 180, and also end 171 of media pack 170. In general terms, seal arrangement 200 is a peripherally directed radial seal arrangement, end cap 180.

Still referring to FIG. 9C, the particular end cap 180 depicted, is molded-in-place end cap, with seal arrangement 200 molded integrally therewith.

In FIG. 9C, attention is directed to groove 207 and end cap 180. The groove 207 is positioned in overlap with a portion of media pack 170, in the example shown in overlap with outer support structure 175, the overlap being axial. The groove 207 would typically extend continuously around aperture 190, spaced from both aperture 190 and seal member 200. Groove 207 can comprise, for example, an artifact from a molding process in seal region 200, the seal region 200 is made. Further, groove 207 can comprise a receiving groove for a projection arrangement on the housing 2, as discussed below.

Still referring to FIG. 9C, surrounding aperture 190, and positioned radially inwardly from groove 207, end cap 180 includes, on end surface 208, inner ring 209. The inner ring 209 will define an outer axial surface 209x, to be positioned against end wall 20, when cartridge 5 is installed in a housing 2.

In FIG. 9D, an enlarged, fragmentary portion of FIG. 9A is viewable.

Figure 9E:
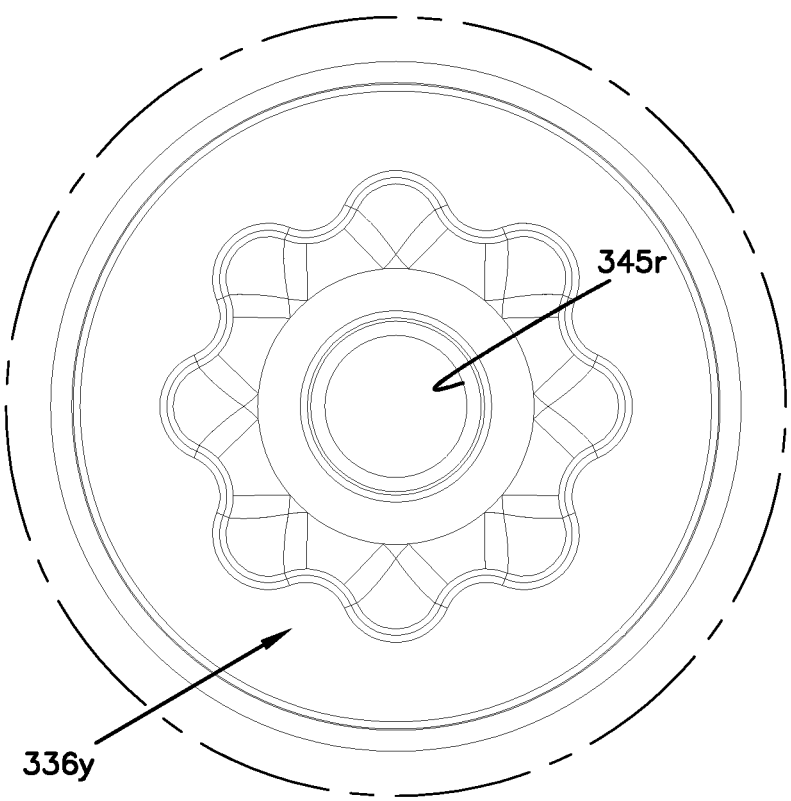
FIG. 9E is a schematic, enlarged, fragmentary view of a portion of FIG. 9B.

In FIG. 9E, an enlarged fragmentary view of a portion of FIG. 9B is viewable.

Figure 9F:
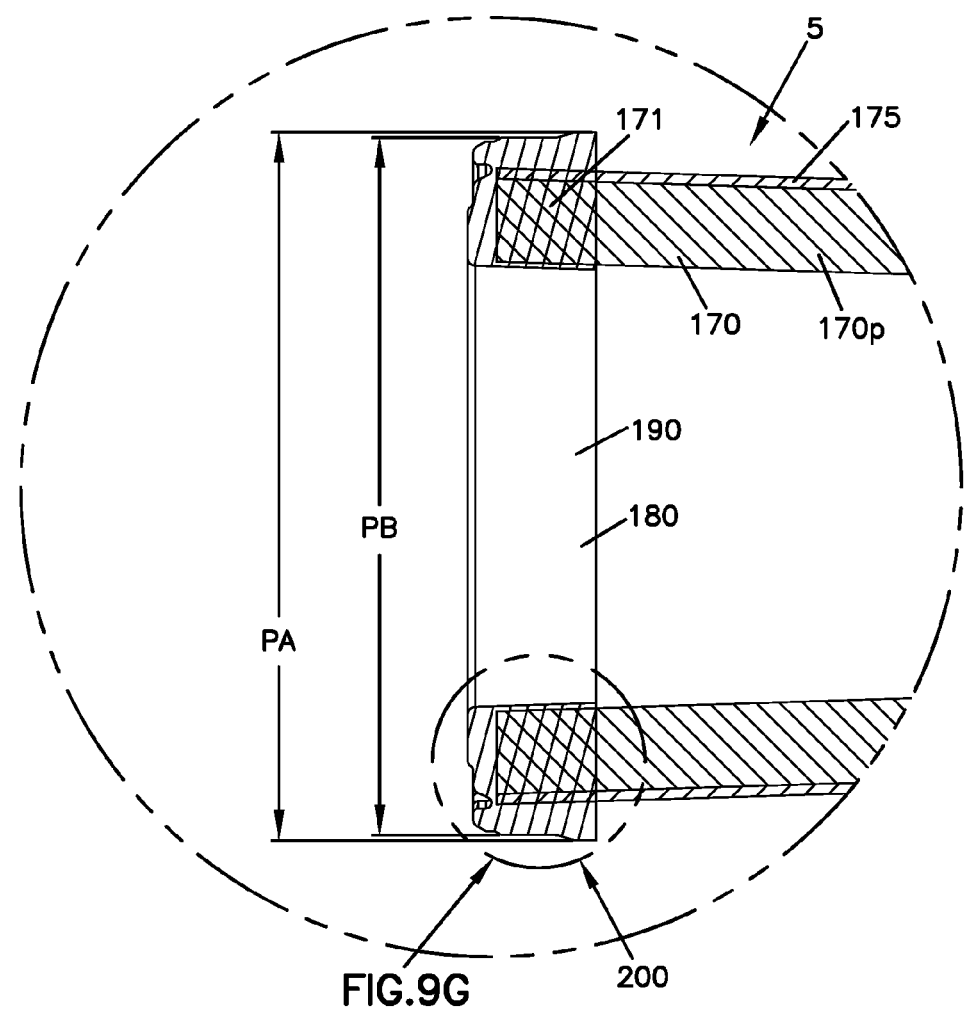
FIG. 9F is a schematic, cross-sectional view of an open end cap portion of the filter cartridge of FIG. 9.

In FIG. 9F, a schematic, cross-sectional depiction, fragmentary, is provided of an end cartridge 5 including end cap 180 thereon. Again, end cap 180 with an outer peripheral seal member 200 thereon is depicted.

Figure 9G:
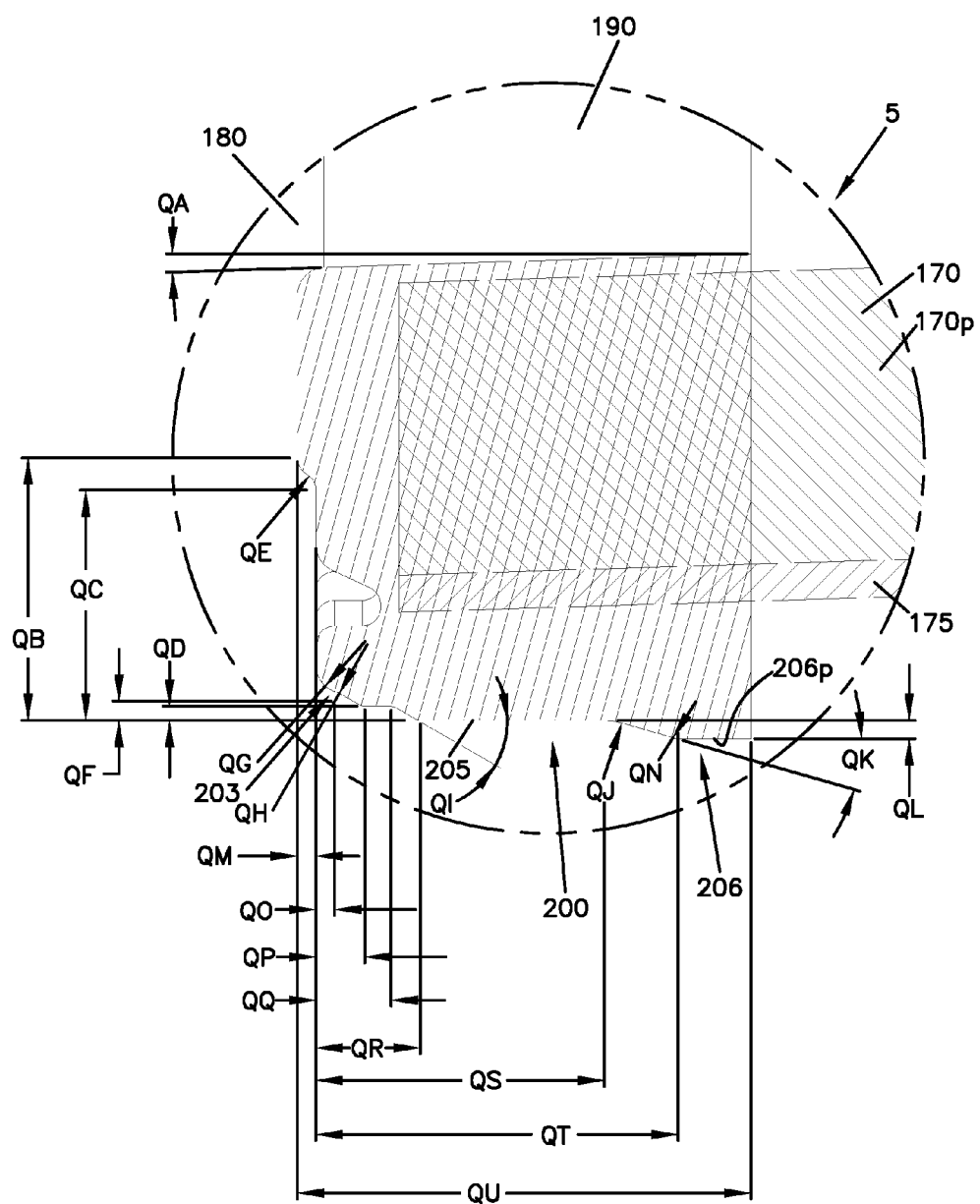
FIG. 9G is a schematic, enlarged, fragmentary view of a portion of FIG. 9F.

In FIG. 9G, an identified portion of FIG. 9F is shown in an enlarged view. Here, seal arrangement 200 is depicted. Regions 203, 205 and 206 can be viewed. Referring to FIG. 9G, dimensions are as follows: QA=1.8°; QB=14.2 mm; QC=12.4 mm; QD=0.8 mm; QE=1.0 mm radius; QF=1 mm; QG=1.4 mm radius; QH=0.5 mm radius; QI=30°; QJ=3 mm radius; QK=16°; QL=1.5 mm; QM=1 mm; QO=1 mm; QP=2.6 mm; QQ=4.1 mm; QR=5.6 mm; QS=15.6 mm; QT=19.6 mm; and, QU=24.5 mm.

In general terms, a shoulder or projection 206 is typically at least 0.5 mm projection, away from adjacent portions of region 205, typically 0.5-1.5 mm in projection; and, it includes a total length of the most outwardly projecting portion 206p, of at least 1.5 mm, usually at least 2 mm, and typically 2.5-5 mm length. Also typically region 206p is flat over its length of extent. Region 206p is sized to receive, abutting thereagainst, a bead in the housing, discussed below.

In FIG. 9F, indicated dimensions are as follows: PA=135.2 mm; and, PB=133.2 mm.

Referring to FIG. 9G, surface 205 generally comprises an intermediate surface between tip region 203 and rib 206. Surface 205 typically is flat and uninterrupted between regions 203 and 206, over a length of at least 5 mm; usually at least 7 mm; and, typically 7-12 mm. Within the region of central portion 205, of seal arrangement 200, typically region 205 does not include any projections, beads, bumps, or grooves therein, but rather is a flat, featureless surface. Surface 205 may have a very small draft angle, in extension from region 203 to projection 206, however any such angle will typically be relatively small, usually than 0.75° and typically less than 0.4°.

G. Sealing of Cartridge 5 within Housing 2

Referring to FIG. 5, cartridge 5 is shown positioned within interior 2i with end cap 180 inserted toward end cover 20. Outer peripheral seal region 200 of end cap 180 is shown forming a radial seal against: interior surface 80x of flange 80, FIG. 11; and, region 210 of housing central cartridge receiving section 10, FIG. 11; region 210 being adjacent end 12.

As a result, outer peripheral region 200, i.e. seal surface 201, of end cap 180 forms a water (weather) seal over joint 74 between end piece 20 and center section 10. Further seal surface 201 provides a seal between cartridge 5 and housing 2, at least at surfaces 80x, 210, inhibiting air flow from reaching outlet 22 without passage through media 5.

Referring to FIG. 11, it is noted that region 210 of housing section 10 includes a radially inwardly projecting bead 215 thereat. This bead is overlapped by a portion of seal 200 in particular shoulder or projection 206, especially region 206p, FIG. 9G to facilitate the seal. Thus, housing seal arrangement 200 forms both: a water seal over joint 74 between end piece 20 and housing section 10; and, a housing radial seal between cartridge 5 and housing 2, in particular end piece 20, inhibiting air flow from reaching outlet tube 21 without passage through media 170p, of cartridge 5.

Referring to FIG. 14, inner surface 40x of region 40 includes a plurality of spaced, arcuate, projections 220. Referring to FIG. 11, the projections 220 are configured to project into end cap 180 at a selected region, in particular along groove 207. Projections 220 can provide for strength and rigidity in section 40. In addition, engagement between the projections 220 and groove 207 can facilitate installation of a proper cartridge 5 within housing 2.

H. Engagement of Cartridge 5 within Housing 2 with: Cartridge Support 7; and, Access Cover 15.

Referring to FIG. 5, at end 172, of media 170p, i.e. at an end of cartridge 5 adjacent end cap 181, cartridge 5 is engaged by access cover 15 and support 7.

Referring to FIG. 18, attention is directed to the end member 122 on support 7. End member 122 is, again, opposite end 120. End 122 projects in a direction away from end 12 of housing central section 7 toward end 11, FIG. 1, when support 7 is installed.

For the example depicted, FIG. 18, end member 122 includes two projection sections: first (perimeter ring) projection 300; and, second (central) projection member 301. Each of projection sections 300 and 301 project axially away from shoulder 121s in a direction away from support end 120. By "axially" in this context, it is meant that the projections 300, 301 are in the same general direction as longitudinal axis 26, FIG. 20, a cross-sectional view.

Figure 21:
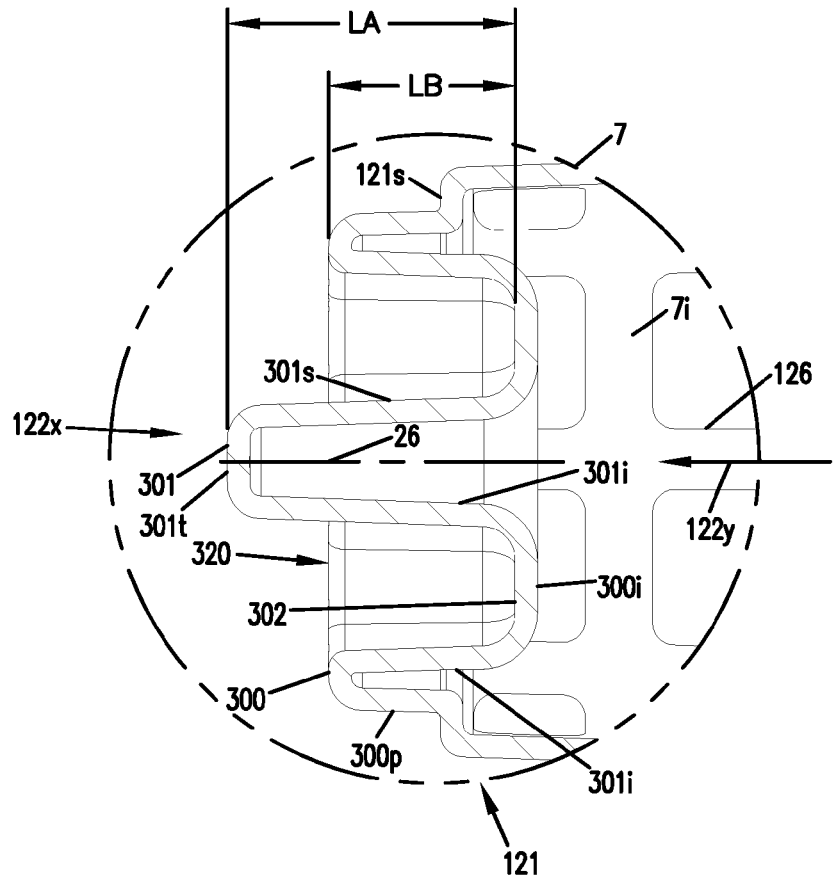
FIG. 21 is a schematic, enlarged, fragmentary view of a selected and designated portion of FIG. 20.

Referring to the enlarged, fragmentary cross-sectional view of FIG. 21, for the example shown, first (ring) projection 300 is separated from second (center) projection 301 by outer surface recess region 302 which extends around projection 301. Also, in the example shown, ring projection 300 is continuous and circumscribes (surrounds) center projection 301, spaced therefrom by recess 302.

Still referring to FIG. 21, end member 122 includes an outer surface 122x and an inner surface 122y. Recess 302, again, is in outer surface 122x.

Herein, when it is said that the projection is "axial" or extends "axially", it is not meant that the projection is necessarily perfectly co-linear with central longitudinal axis 26, but rather it is in the same general longitudinal direction.

In the particular example depicted, central projection 301 is conical in shape and would have a circular cross section in a plane perpendicular to axis 26. More specifically, projection 301 has a conical side wall 301s, FIG. 18, which tapers inwardly from recess 302 to tip 301t. Tip 301t, however, is somewhat truncated, and does not necessarily come to either a sharp point or a completely flat end.

In more general terms, cartridge support end 122, of support 7, has outer surface 122x and inner surface 122y. The example cartridge support end 122 is contoured on both surfaces 122x, 122y. The example shape (depicted) is such that there is a central (in the example shown conical) projection 301 spaced from a ring projection 300 by a recess 302, in the outer surface 122x. The inner surface 122y is defined with a central (for the example shown conical) outer projection recess 301i spaced from recessed ring 300i by surface 302i, leaving the observation that surface 302i generally projects toward end wall 20 and recesses 300i, 301i project away from end wall 20, FIG. 5.

Projection 300 includes an outer perimeter surface 300p, FIG. 21. For the example shown, perimeter surface 300p is a smooth, non-contoured surface defining a circular perimeter, and thus has a generally cylindrical shape. The cylinder surface 300p may taper outwardly slightly in extension away from end 300t toward shoulder 121s in some applications. End member 122 includes a peripheral shoulder 121s projecting radially outwardly from a base end of surface 300p. Surface 300p is defined to project through aperture 160 of end cap 155 (of a safety or secondary cartridge 6), FIGS. 24-26, when used. Shoulder 310 is sized and positioned to receive end cap 155 abutting thereagainst, when the safety cartridge 6 is installed.

It is noted that is end cap 155, or a portion thereof, is made of an appropriate material, at selected locations where end cap 155 abuts end 122, under pressure from cartridge 5, a seal between safety cartridge 6 and support 7 can be formed. For example axial pressure from cartridge 5 against end cap 155, FIG. 5, can cause a seal to be formed between end cap 155 and shoulder 121s. In addition, or alternately, a radial seal or a similar seal can be formed between aperture 160 and surface 300p, if desired.

Figure 22:
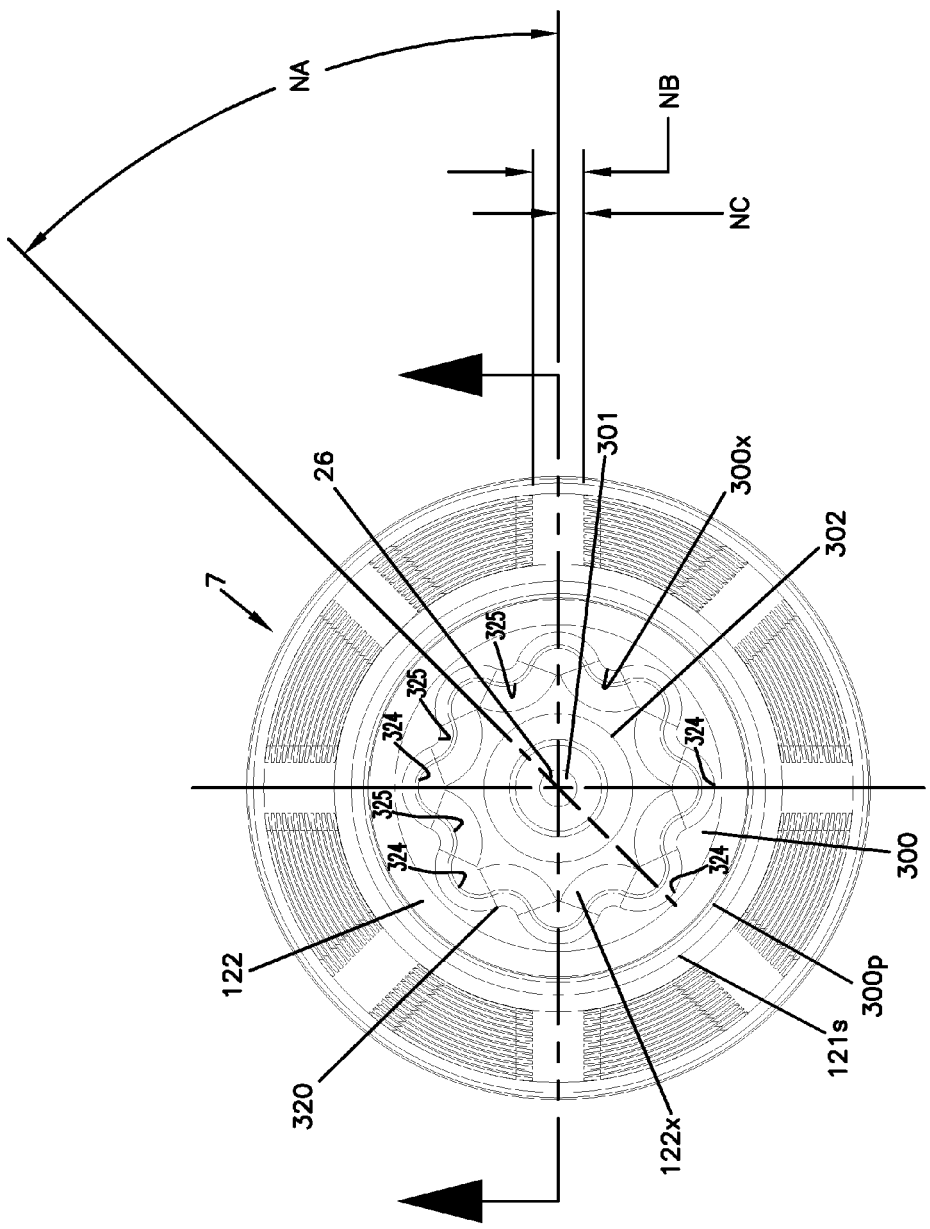
FIG. 22 is a schematic, closed-end elevational view of the support of FIG. 20.
Figure 22A:
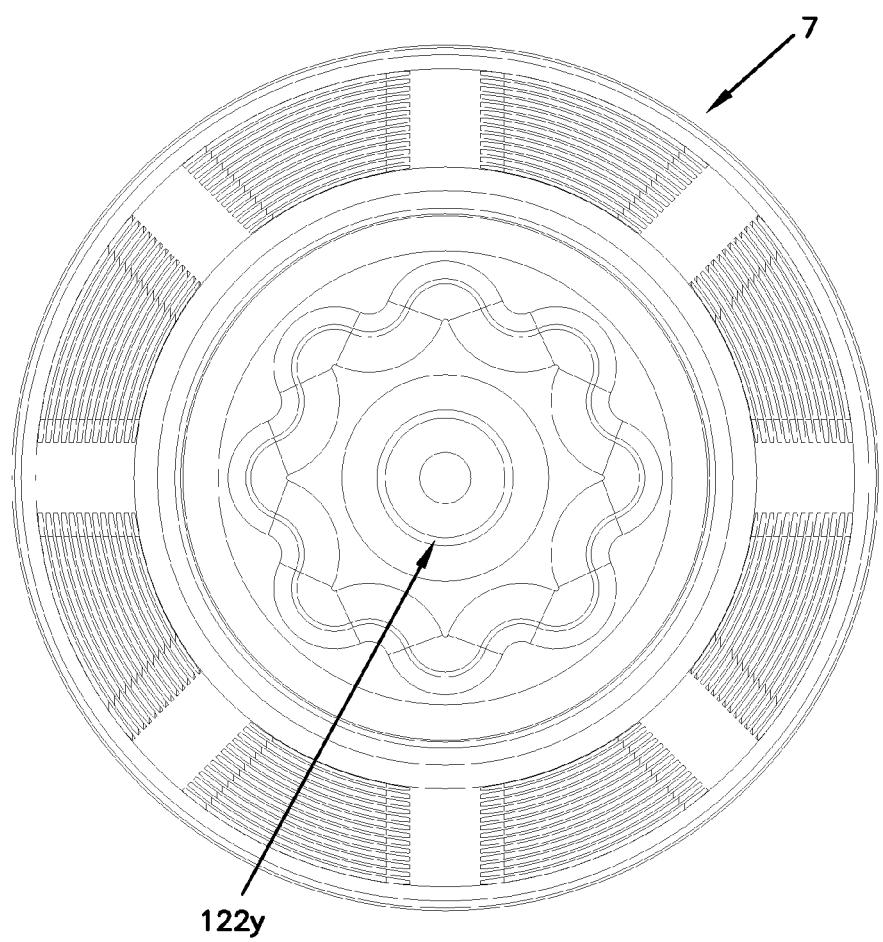
FIG. 22A is an open end elevational view of the component depicted in FIG. 19.

Attention is now directed to FIG. 22. In FIG. 22 an end view of support 7 is provided; FIG. 22 being taken toward end member 122. In FIG. 22, central projection 301 is viewable, surrounded by recess surface 302. Outer projection 300 is also viewable, including outer circular wall 300p and an opposite inner wall 300x.

Central projection 301, recessed surface 302 and ring projection 300 collectively define receiver recess 320, FIG. 21, in outer surface 122x of end 122. Receiver recess 320 is positioned to receive, projecting therein, a corresponding projection member on a primary filter cartridge 5 during installation, as discussed below.

In general terms, outer surface 122x, of end member 122, defines a first member of a projection/receiver arrangement providing for engagement between the cartridge 5 and the central cartridge support 7. As will be understood from following descriptions, projections 300, 301, project into receiver sections of a corresponding primary filter cartridge 5; and, a portion of a primary filter cartridge 5 projects into receiver 320 on support 122.

For the example assembly depicted, the inner wall 300x of ring projection 300, FIG. 21, can be seen in FIG. 22 to have a serpentine surface shape with alternating outwardly curved, concave, sections 324 and inwardly projecting convex portions 325.

Herein the term "serpentine" when used to refer to the definition of a surface or wall, it is meant to refer to a surface that does not define a circular definition, but rather includes alternating convex and concave sections therein.

For the particular, example, serpentine wall surface 300x, has eight (8) concave sections 324 separated by eight (8) convex portions 325, in extension of wall 300x around center projection 301. For the example depicted, each concave section 324 is the same shape and size as the other concave sections; and, each convex portion 325 is the same shape and size as the other convex portions. Thus, an eight (8) petal arrangement is defined by wall 300x. For the particular example, serpentine wall surface 300x depicted, the petal arrangement has 8-fold rotational symmetry, i.e., each petal is the same size and shape as each other petal, and the petals are evenly, radially, spaced. In this context, the term "8-fold rotational symmetry" is used to refer to a shape definition which can be rotated around a central axis 26 (or center) with eight, evenly radially spaced positions, in which it can align with itself. Thus, an octagon has 8-fold rotational symmetry, whereas (in contrast) a square has 4-fold rotational symmetry.

In more general terms, serpentine surface 300x comprises alternating convex and concave sections, usually at least three (3) concave sections, typically at least five (5) concave sections and usually 6-10 concave sections.

In FIG. 21, example dimensions are provided as follows: LA=25.8 mm; and, LB=16.7 mm.

In FIG. 22, example dimensions are provided as follows: NA=45°; NB=6 mm; and, NC=3 mm.

Attention is now directed to FIG. 7, an enlarged, fragmentary view, depicting in part, a cross sectional view of end cap 181 of cartridge 5. Also in FIG. 7, portion of support 7, safety cartridge 6, and access cover 15 are depicted, in exploded view.

Figure 7A:
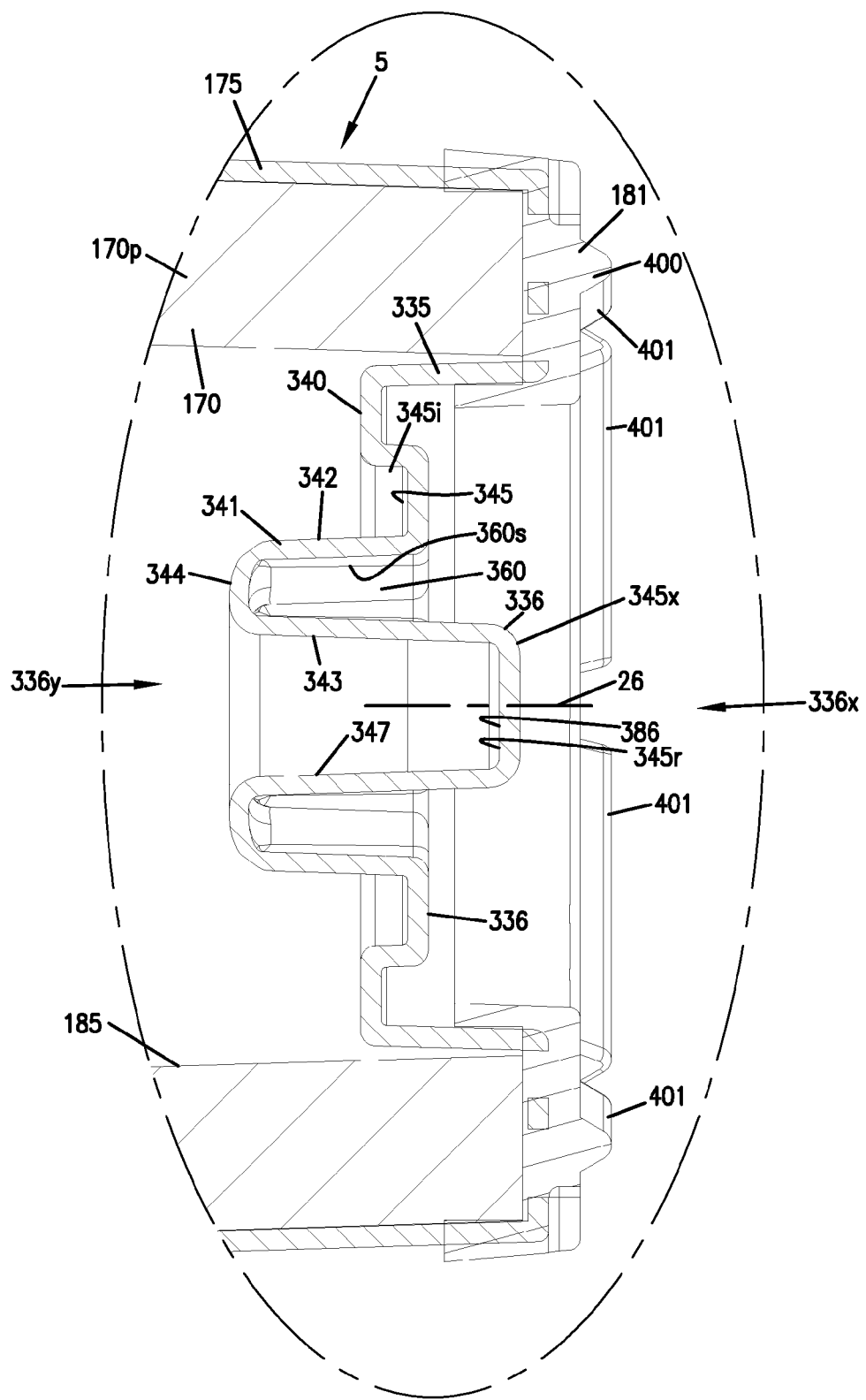
FIG. 7A is a schematic, enlarged fragmentary cross-sectional view of a portion of FIG. 7.

Referring to FIG. 7, end cap 181 includes central recess portion 332 comprising a central closure portion of end cap 181 having the following features: outer peripheral wall 335 directed toward end cap 180; and contoured end wall 336. The outer wall 335, FIG. 7A, generally projects into interior 185 of the media pack 170. Adjacent or slightly spaced from media pack interior 185, FIG. 7, inner wall or closure portion 336 generally extends across the interior 185; to close interior 185 at end cap 181.

End wall or closure portion 336, FIG. 7A includes inner surface 336y and outer surface 336x. The inner surface 336y is generally directed toward end cap 180 of cartridge 5, FIG. 9. Surface 336x is generally opposite surface 336y, and is directed away from end cap 180, FIG. 9.

End portion 336y, FIG. 7A, is contoured and includes peripheral outer ring portion 340, positioned radially inwardly, and surrounded by outer peripheral wall 335. Radially inwardly from peripheral ring portion 340 is provided inwardly projecting ring 341 defined by outer wall section 342, inner wall section 343 and end wall section 344. By "inwardly" in this context, it is meant that ring 341 generally projects into the media pack 185, in a direction toward end cap 180, FIG. 9. The projecting ring 341 is surrounded by peripheral ring portion 340.

In the example shown, FIG. 7A, section 336 includes, on end surface 336y, in peripheral ring 340, a recess 345 between outer wall 345i and wall 342. Recess 345 is generally directed away from end cap 180 and is sized to receive projecting therein a portion of projection 300 on support 7, during installation. Recess 345 is typically continuous in extension around a central axis 26.

Wall section 342 typically has a serpentine shape of alternating outwardly directed convex and outwardly directed concave (or inwardly directed convex) sections, which engage wall 300x. That is, serpentine surface 300x, FIG. 7, pushes around and engages serpentine surface 342, in surface-to-surface (or near surface-to-surface) engagement. As a result of the petal structure on surface 300x receiving outwardly projected petals on serpentine wall 342. When this engagement occurs, end cap 181, and thus cartridge 5, will not readily rotate relative to central cartridge support 7 when installed.

Alternately stated, once cartridge 5 is installed over support 7, rotational motion of cartridge 5 around support 7 is inhibited, as a result of a rotational interference interaction between the petal shape of serpentine wall 300s, and the petal shape of serpentine surface of 342. Together, these surfaces form an anti-rotational engagement between cartridge 5 and central cartridge support 7. This helps insure that the cartridge 5 can only be installed in one of selected rotational orientations relative to support 7. When eight (8) petals are present in each of walls 300s, 342, with 8-fold symmetry, eight rotational positions are possible.

In general terms, axially inwardly projecting projection 344, defined by outer 342 and inner wall 343, is a projection member of a projection/receiver arrangement, which projects into receiver 320, FIG. 21, of support 7 when installed. A radial interlock arrangement, due to a serpentine shape of wall 342 and 301s is provided.

Spaced radially inwardly of wall 342, FIG. 7A, surface 336y includes a central outer projection or recess 345r, defining projection 345x. The central recess 345r includes an outer end section 386 and side wall 347. For the example depicted, the side wall 347 is generally conical and surrounds central axis 26.

Referring to FIG. 7, central outer projection 345x (or recess 345r) is sized to receive projecting therein, central projection 301 on end 122 of central cartridge support 7, when the cartridge 5 is installed over the portion 7. Thus, recess 345r and projection 301 define another projection/receiver arrangement.

Central projection 345x is surrounded by projecting ring 344.

Attention is now directed to outer surface 336x, FIG. 7A. Outer surface 336x includes, defined therein, receiver groove 360, between walls 342, 343. Groove 360 is a receiver groove for a projection on access cover 15, as discussed below. In general terms, groove 360 is a member of another projection/receiver arrangement, in this instance providing engagement between the access cover 15 and cartridge 5.

The groove 366 is typically at least 6 mm deep, and its outer wall 342 is typically spaced at least 15 mm from the media 170.

Referring to FIG. 7A, side surface 360s, of groove 360, which is one of the surfaces of wall 342, is serpentine, with an alternating convex, and concave sections.

Attention is directed now to FIG. 9A, a schematic, outer, plan view of cartridge 7, in particular directed towards surface 336x. Central groove 360 is viewable.

In FIG. 9B an inside end view of cartridge 6 is depicted, i.e., toward surface 336y. Recess 345r is viewable.

In FIG. 9D, an enlarged fragmentary view of a portion of surface 336x is viewable. Groove 360, with inner wall 336 and outer, serpentine, wall 360s is viewable.

In FIG. 9E, an enlarged fragmentary view of a portion of FIG. 9B is viewable. Recess 345r is viewable.

Attention is directed again to FIG. 7. Access cover 15 includes a peripheral rim 370 and outer end surface 15x with central section 371.

Figure 10:
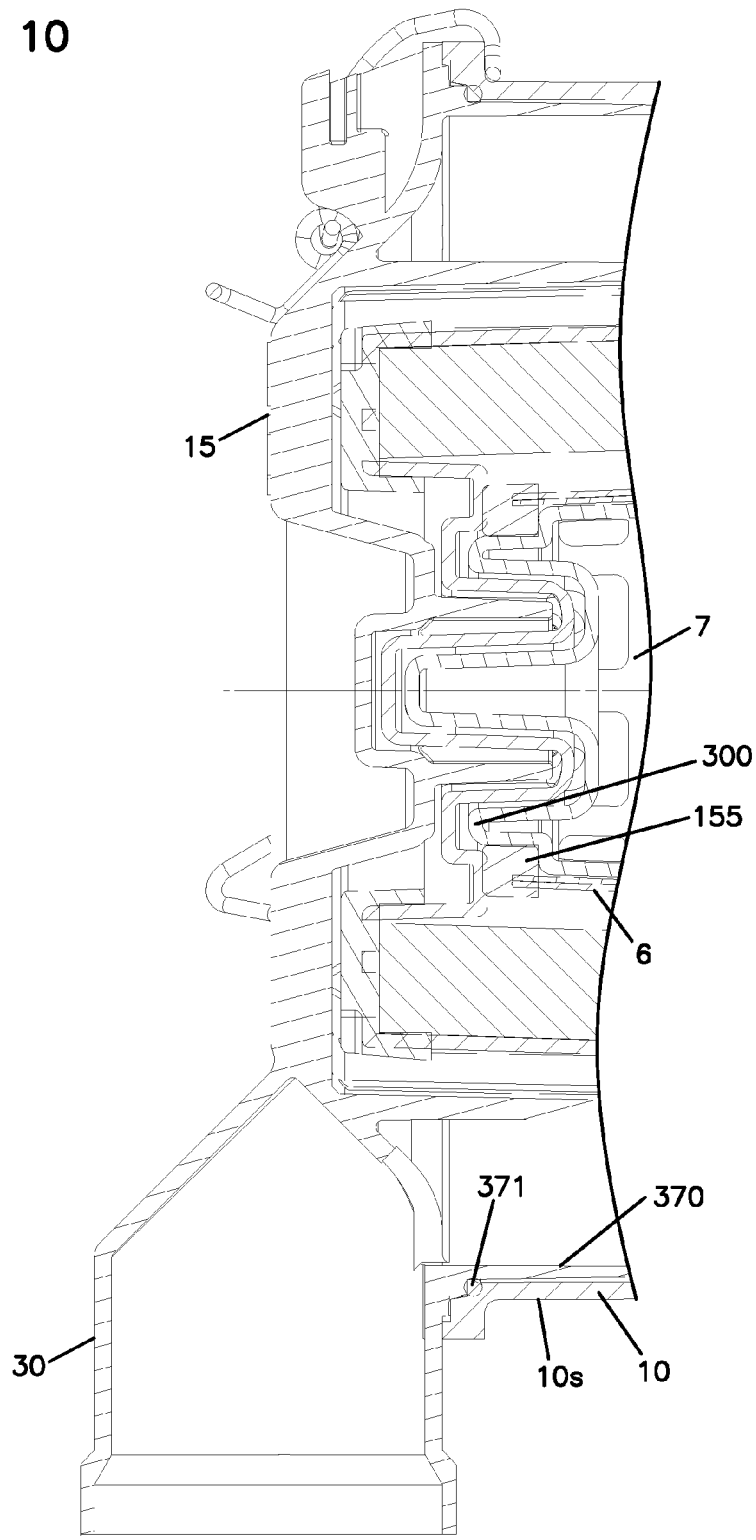
FIG. 10 is a schematic enlarged, fragmentary cross sectional view of a selected portion of FIG. 5.

In FIG. 7, access cover 15 is shown in cross-sectional view. Access cover 15 includes interior surface 15y, which faces in interior of housing 2. Peripheral rim 370, is sized and positioned to engage sidewall 10s, during installation, FIG. 5. In some instances, when access cover is installed, an o-ring or similar gasket will be positioned between the access cover 15, and housing sidewall 10s. An example o-ring is depicted in FIG. 10 at 371. Alternate locations for the o-ring 371, however, are possible. In general, the gasket or o-ring 371 provides water (weather) seal between access cover 15 and sidewall 10s.

Referring again to FIG. 7, inner surface 15y comprises a surface which engages cartridge 5, during installation. Inner surface 15y includes outer ring section 380, which overlaps an end of the media pack 170 during installation. Further, radially outwardly from region 380 is inwardly projecting flange or shield 382. Flange or shield 382 generally surrounds an end of media pack 170, and end cap 181, during installation.

Radially inwardly from wall 382, and on surface 15y, is provided projection 384. Projection 384 is sized and shaped to surround receiver 385r, and to project within receiving groove 360, during installation. The projection 384 is typically continuous in extension around axis 26, although alternatives are possible. Further, projection 384 is typically solid (non-hollow) and typically includes no apertures therethrough.

The projection 384 has a radial outer surface 385 and a radial inward surface 386. For the example shown, the outer surface 385 is generally serpentine, comprising alternating outwardly convex and inwardly concave sections; and, inner wall 386 is generally serpentine having corresponding inwardly projecting convex and outwardly projecting concave regions, which alternate with respect to one another. Outwardly projecting convex sections of surface 385 are aligned radially with outwardly projecting concave sections of surface 386; and, inwardly projecting concave sections of surface 385 are radially aligned with inwardly projecting convex sections of surface 386.

The projection 384 is sized and shaped to be received within receiving groove 360, FIG. 7; as a projection/receiver arrangement. For the particular assembly depicted, wall 385, when it has a serpentine characteristic, is configured to engage serpentine wall 360s and rotationally interlock therewith. Thus, cartridge 5 is supported against rotation by access cover 15, as well as support 7.

Figure 7B:
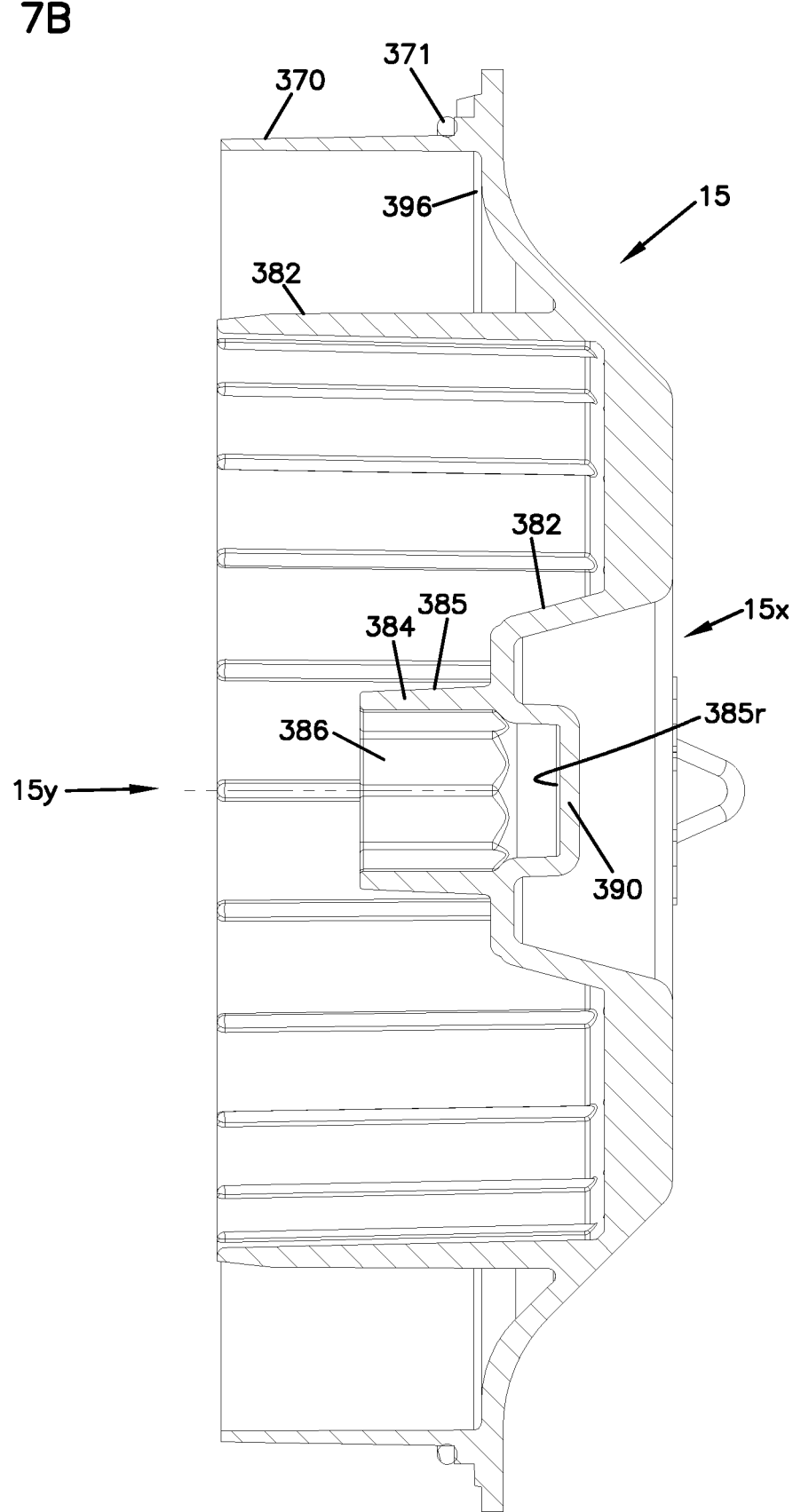
FIG. 7B is a schematic, enlarged, fragmentary, cross-sectional view of a access cover portion of FIG. 7.

It is noted that access cover 15 is also viewable in an enlarged, cross-sectional view in FIG. 7B.

Typically the dimension across projection 384, between opposite portions of inner surface 386 is at least 10 mm, usually at least 15 mm often at least 18 mm, for example 18-40 mm inclusive.

Still referring to FIG. 7, projection 384 surrounds central outer projection 390. Central outer projection 390, in surface 15y, generally and defines a receiving space 385r for projection 345x.

Still referring to FIG. 7B, surrounding region 380, and spaced inwardly from outer wall 370, again, is provided shield 382, a circular flange which surrounds and is normally spaced from cartridge 5. Between wall 370 and shield 382 is provided a space 396 for dust and air flow around shield 382 in overlap with entry 30e to dust drop tube 30, FIG. 5. This will facilitate dust and water separation.

From a review of the figures above, advantageous interaction among central cartridge support 7; main filter cartridge 5; and, the access cover 15 can be understood. In general: when the cartridge 5 is positioned over support 7, typically with safety cartridge 6 therebetween, cartridge 5 will be positioned with projection 344 received in receiver 320; and, with projection 301 projecting into receiver 345r. Serpentine engagement for wall 342 and wall 300s, will inhibit rotation of cartridge 5 relative to support 7. Thus, cartridge 5 is supported at end 181, by support 7. When end cap 155 on safety cartridge 6 is positioned therebetween, surface 340 pushes against end cap 155, and end cap 155 will be push against shoulder 121s, forming seals therebetween.

When access cover 15 is positioned in place, projection 384 will extend into receiver 360; and, the central conical projection of cartridge 5, forming recess 345r, will project into recess 385r. Outer serpentine surface 385 of projection 384 will rotationally lock with serpentine surface 360s receiver 360, again inhibiting rotational movement.

The total interlock arrangement resulting from access cover 15, in particular central portion 384 with its contoured outer surface, cartridge 5 and support 7, will: ensure that access cover 15 is not positioned on housing central section 10 with a cartridge 5 therein unless cartridge 5 is properly positioned; help support cartridge 5, at end cap 181, against cantilevered motion, and/or undesirable rotational motion; and, will help ensure that the cartridge 5 installed within housing 2, for use, is a proper and appropriate cartridge for the system.

I. Methods of Assembly

Figure 6:
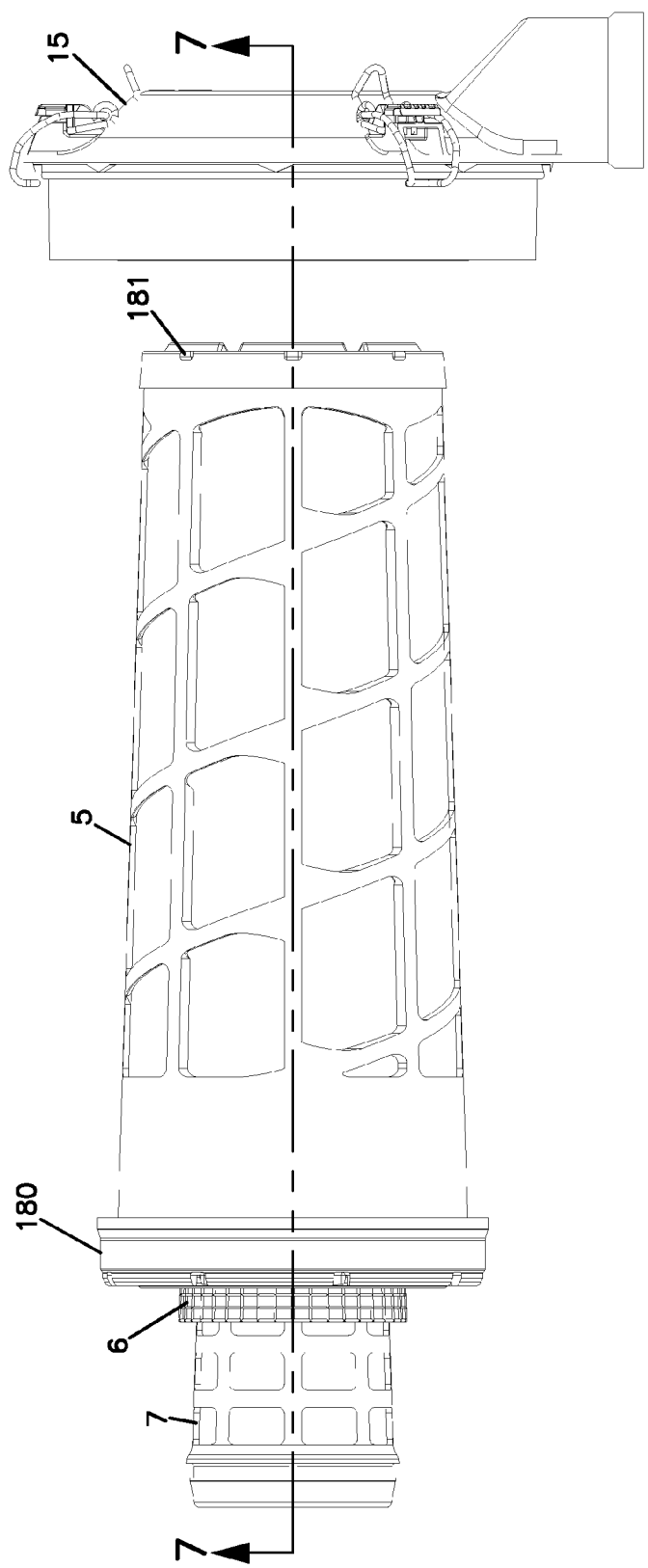
FIG. 6 is a schematic, exploded, side elevational view depicting selected componentry of the air cleaner assembly of FIG. 1.

Attention is now directed to FIG. 6. In FIG. 6, assembly involving selected components identified above is schematically indicated. In particular, cartridge 5 is shown positioned over secondary or safety cartridge 6, which is shown over support 7. Further, access cover 15 is shown aligned to interact with end cap 181 of cartridge 5.

In FIG. 7, as previously discussed, a fragmentary view of a portion of FIG. 6 is depicted.

Figure 27:
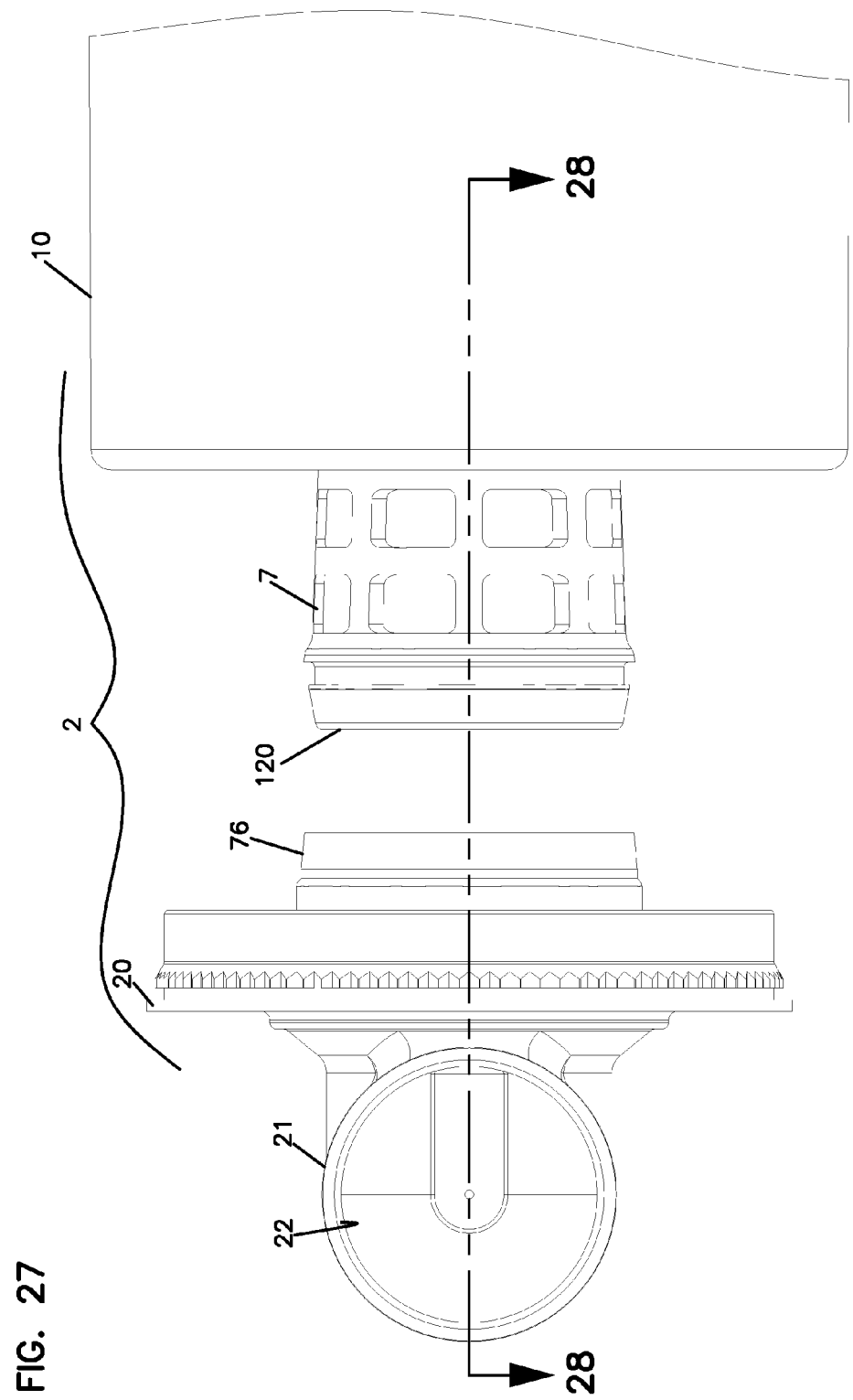
FIG. 27 is an enlarged, schematic, exploded side elevational view showing interaction among selected components of the assembly of FIG. 1.

In FIG. 27, an enlarged fragmentary view of selected portions of housing 2 is depicted. Here section 10 is shown with support 7 received therein, the support 7 having end 120 configured to engage end wall 20, in particular ring 76.

Figure 28:
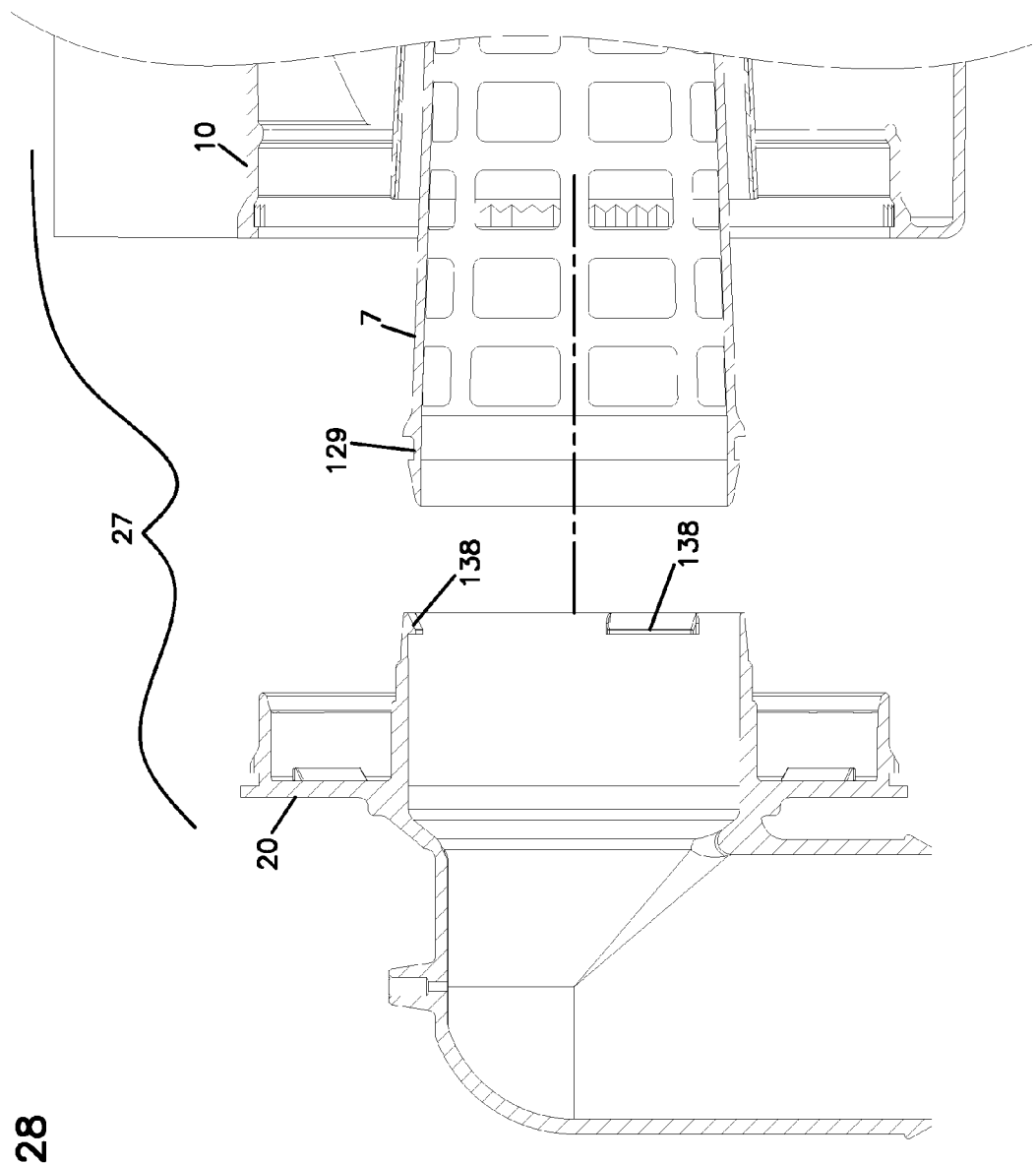
FIG. 28 is a schematic, cross-sectional view taken generally along line 29-29, FIG. 28.

In FIG. 28, a cross-sectional view of FIG. 27 is viewable. Here, assembly steps involving pushing end cover 20 into engagement with housing section 10 and support 7 are schematically depicted.

In general, steps of assembly of the housing 2, which can be conducted in alternate order of those recited are as follows: end piece 20 is snap fit into housing section 10; and support 7 is snap fit into end piece 20.

In general terms, installation of the cartridge 5, and safety cartridge 6, and securing in place, occurs as follows: safety cartridge 6 is pushed over support 7; main cartridge 5 is pushed over safety or secondary cartridge 6, with seal arrangement 200 sealing to the housing 2, including over joint 74 between housing section 2 and end piece 20. Installation involves pushing end cap 181 over cap 155 of safety cartridge 7, causing a seal therebetween; and, pushing projections 300, 301, into recesses 345, 345r, in end cap 181. Finally, access cover 15 is latched in place. Access cover 15 is rotationally indexed to a desired orientation, before latching. Further projection 384 is extended into groove 360.

Typically, support of the cartridge 5, by access cover 15, is not provided around cartridge 5, to advantage. In particular, if ring 382, FIG. 7B were sized to engage an outer portion of end cap 181, especially under conditions of temperature fluctuations, cartridge 5 could become stuck to or jammed against wall 382. Should this occur, as access cover 15 is removed, cartridge 5 may also be undesirably dislodged from its sealed location, an undesirable circumstance.

J. Seal Materials

As described previously, end cap 180, and in particular seal arrangement 200, can be molded-in-place from a material suitable for forming a seal arrangement. Typically, foamed polyurethane having as molded density of no greater than 28 lbs/cu. ft. (450 kg/cu. m) typically no greater than 22 lbs. cu. ft. (355 kg/cu. m); and, usually within in the range of 12 to 17 lbs/cu. ft (192-225 kg/cu. m) inclusive is usable. Also, typically the material will exhibit a hardness, shore A of no greater than 25, typically no greater than 20 an often within the range of 10 to 20, inclusive.

It is further noted that the end cap 159 for the safety element as characterized above, can be made from similar materials, in some instances. However alternatives are possible. In addition, a similar polyurethane can be used to form a molded-in-place portion 400 of end cap 181; molded-in-place portion 400 securing and potting support 175 in place, on media 170. Referring to FIG. 7A, molded-in-place portion 400, when formed from such a compressible polyurethane, can be provided with compressible, axially outwardly directed, ribs or ridges 401 which can press against a portion of access cover 15, to provide vibration dampening.

K. Reference to Other Patent Filings and Publications

Selected features described herein are variations of features characterized in previous patent filings of Donaldson Company, Inc, the assignee of the present disclosure. For example, a conical filter element with a end having an outwardly directed radial seal thereon, including a groove in the end cap is described in PCT WO 2006/119414, published Nov. 9, 2006, incorporated herein by reference. In U.S. provisional application 60/921,536 filed Apr. 3, 2007, incorporated herein by reference, projects on a housing engaging a groove on an end cap are provided. In U.S. 60/961,522, filed Jul. 20, 2007, incorporated herein by reference, interlock features between a housing access cover and a filter cartridge are described. These features also are included in an improvement provisional application, U.S. 61/072,162 filed Mar. 27, 2008, incorporated herein by reference.

A system including an interior cartridge support, a filter cartridge, housing access cover interaction, is described in U.S. Provisional application 60/961,521, filed Jul. 20, 2007, the complete of disclosure of which is incorporated herein by reference.

II. Some Alternate Embodiments

Herein, some alternate embodiments are described. These alternate embodiments are depicted in FIGS. 29-31.

Figure 29:
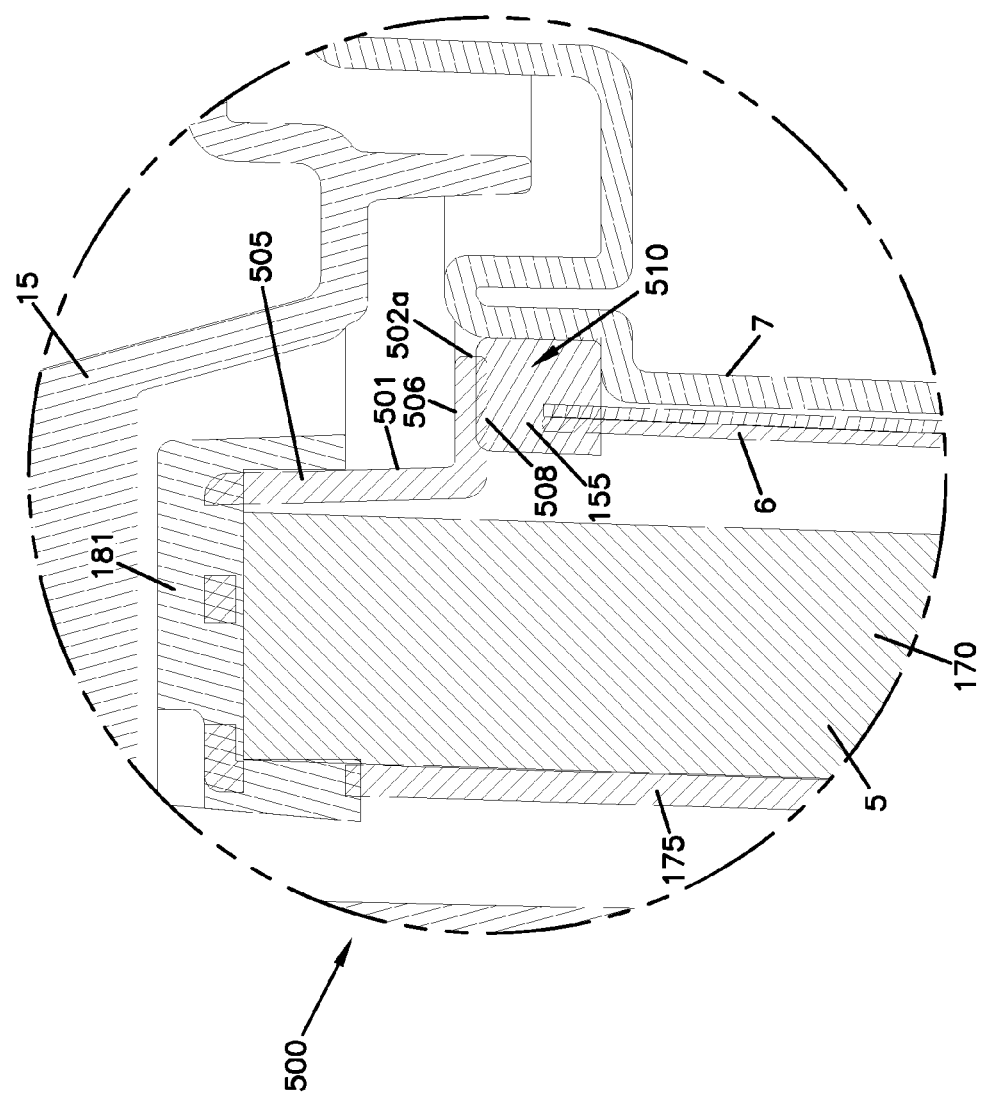
FIG. 29 is a schematic, fragmentary, enlarged cross-sectional view of a first alternate main filter cartridge component shown installed in the housing, with a safety cartridge generally otherwise according the assembly of FIG. 1.

Referring first to FIG. 29, a fragmentary, schematic, cross-sectional view of an alternate embodiment 500 is depicted. The alternate embodiment 500 includes the access cover 15 analogous to the previously described access cover; and, includes a support 7 and safety cartridge 6, analogous to those previously described. The main filter cartridge 5 is analogous to previously main described filter cartridge, with respect to media 170 and outer support 175. End cap 181, however, is different. In particular, end cap 181 includes a central inner portion 501 defining a peripheral wall 501p directed toward the first end cap, and a radially inwardly projecting ring 506 defining a central aperture 502a. The member 501, then, includes outer peripheral wall 501p and base ring 506 surrounding aperture 502. The base ring 506 includes a inner axial surface 508, configured to engage end cap 155 of cartridge 6 to provide a seal at the location of interaction. Thus, in general terms, for the example arrangement 500 depicted in FIG. 29, end cap 181 is not a closed end cap, but rather includes a central aperture 502a therethrough. The aperture 502a would typically have an internal cross-section size of at least, 45%, often 50 to 70%, inclusive, of a dimension across an interior of media 170, adjacent the aperture 502.

As a result of end cap 181 being open, a seal is needed to prevent leakage of air therethrough. A seal is provided at 510, by engagement of portion of end cap 181 with seal 159, in particular radial inner projection 506 on axial inner wall 501p.

Figure 30:
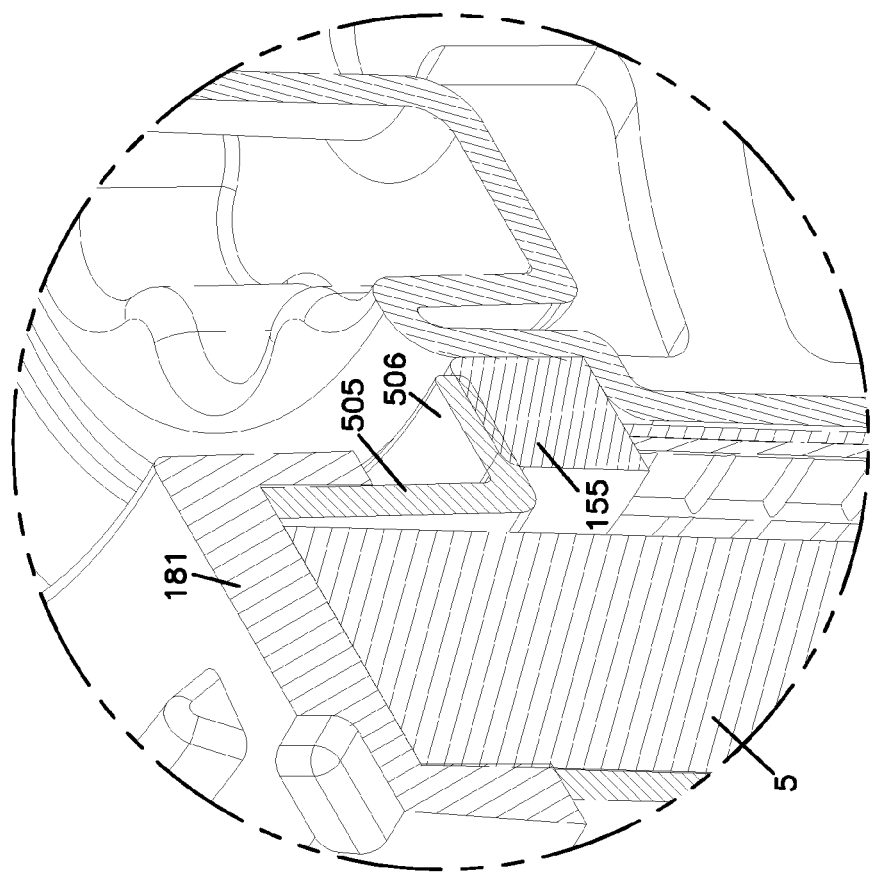
FIG. 30 is an enlarged, schematic, fragmentary, perspective cross-sectional view taken of the first alternate main filter cartridge of FIG. 29, installed in the air cleaner assembly including a housing the safety cartridge otherwise in general accord the assembly of FIG. 1.
Figure 31:
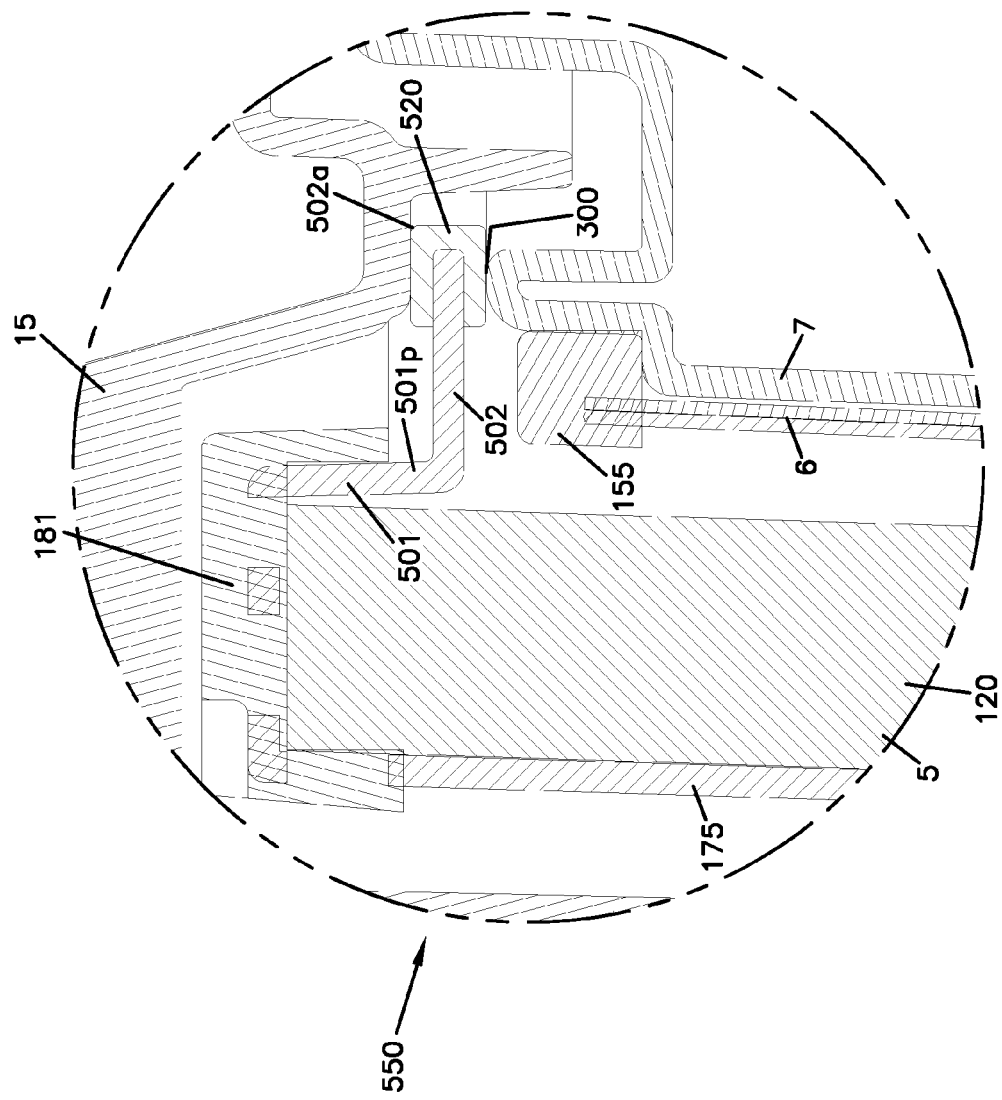
FIG. 31 is a schematic, fragmentary, cross-sectional view of a second alternate main filter cartridge, installed in the air cleaner assembly including a housing and safety cartridge otherwise in general accord the assembly of FIG. 1.

In FIG. 30, a perspective view of the assembly of FIG. 29 is depicted.

For FIG. 31, a further alternate arrangement is depicted at 550. Here, the same access cover 15, the same support 7 and the same safety element 6 are used. The main cartridge 5 still includes media 170 surrounded by support 175, with end cap 181. End cap 181 is still open, analogously to the arrangement of FIGS. 30 and 31, with end cap 181 including a central piece 501 having peripheral wall 501p and radially inwardly directed wall 502, defining aperture 502a. On the radially inwardly directed wall 502 is positioned a seal member 520 positioned to be engaged between portion of access cover 15 and projection 300 on support 7. Here, aperture 502a may be somewhat smaller than the aperture 502a, FIGS. 29 and 30, for example 25-50%, typically 30-50%, of a distance across the cartridge interior adjacent aperture 502e.

In the embodiments of FIGS. 29-31, a projection on the access cover 15, and projection(s) on the support 7, project through an aperture 502a in the end cap 181.

Further alternate embodiments are possible. For example, if a safety cartridge is not desired, a seal ring configured analogously to ring 155, but without media thereon, can be positioned between portions of the cartridge 5 and support 7 in various one of the described embodiments.

III. Some General Observations

According to certain aspects of the present disclosure, an air filter cartridge is provided, usable as a serviceable air filter cartridge in an air cleaner assembly, as the main filter cartridge. The air filter cartridge includes a media pack comprising media surrounding an open interior. The media can be pleated, although alternatives are possible. The media has first and second ends. In some applications, the media is provided in a conical form, in extension between the first and second ends.

The air filter cartridge includes a first end cap positioned on the media pack first end. The first end cap has a central aperture therethrough. When the media is conical, the first end cap is typically positioned at the larger end of the conical configuration.

A seal member is positioned on the first end cap. This seal member, in examples depicted, is configured to form an outwardly directed radial seal around an outer periphery of the first end cap. This outer peripheral seal is typically also positioned around an outer portion of the first end of the media pack. In a typical arrangement, the seal member is molded integral with a remainder of the first end cap. An example material usable for this is a foamed polyurethane, as described.

A second end cap is positioned in the air filter cartridge on the media pack second end. In an example embodiment described herein, the second end cap is a closed end cap. In examples in which the second end cap is closed, the second end cap includes a central closure portion extending across the open interior of the media pack adjacent the media pack second end. The central closure portion, in an example embodiment, includes opposite inner and outer surfaces, the inner surface being contoured with: an outer peripheral sidewall portion, projecting toward the first end cap; a peripheral ring portion positioned radially inwardly from the peripheral sidewall portion; a projecting ring extending inwardly of the media pack interior, toward the first end cap, from the peripheral ring portion; and, a central recess projecting in a direction away from the first end cap.

In an example embodiment, the central recess is surrounded by the projecting ring; the projecting ring is surrounded by the peripheral ring portion; and, the peripheral ring portion is surrounded by the outer peripheral sidewall portion.

In an example arrangement described herein, the peripheral ring portion includes a ring recess therein, projecting away from the first end cap.

The contoured surface portion of the central closure portion is configured to be positioned between: various projections or recesses on a filter support, within a housing during use; and a portion of an access cover, positioned on an air cleaner assembly in use.

In an example arrangement described, the outer surface of the central closure portion includes a central, outwardly, projecting, conical portion surrounding, and defining, an outer surface of the central recess in the inner surface. Further, in an example arrangement, the outer surface of the central closure portion includes a serpentine surface surrounding, and spaced from, the central outwardly projecting conical portion, to define a receiving groove therebetween having an outer, serpentine surface.

According to an aspect of the present disclosure, the filter cartridge is provided with an inner surface of the central closure portion including a serpentine wall defining a radially outer surface of the projecting ring that extends toward the first end cap from the peripheral ring portion.

In an example arrangement, the air filter cartridge includes an outer liner surrounding the media pack; and in an example described, the outer liner comprises a portion of pre-form and is integral (molded integrally with) with the central closure portion of the second end cap.

In a particular seal arrangement described, a peripheral seal surface includes: a tapered tip portion; and, a sidewall portion extending in at least 5 mm from the tip portion toward the second end cap. Typically the sidewall portion has a length within the range of 5 to 15 mm and is flat, i.e. does not include steps or ribs therein. In an example arrangement depicted, the seal member includes a radially, outwardly projecting shoulder arrangement thereon, on an opposite end of the sidewall portion from the tip portion.

Also in accord with the general descriptions herein, an air filter cartridge is provided that includes a media pack, comprising media surrounding an open filter interior; the media having first and second ends. A first end cap is positioned on the media pack first end, with a central aperture therethrough. A seal member is positioned on the first end cap, to form an outwardly directed radial seal on an outer periphery of the first end cap, that outer periphery also being positioned around end of the media. A second end cap is positioned on the media second end, and is typically closed. The second end cap includes a central closure portion extending across the open interior of the media pack adjacent the media pack second end. The central closure portion has opposite inner and outer surfaces, with the outer surface having a receiving groove at least 6 mm deep therein, and having an outer wall spaced radially, inwardly a distance of at least 15 mm from the media. Further, the inner surface of the closure portion is configured with a central receiver projection therein, extending away from the first end cap; the central receiver being surrounded by the receiving groove. This embodiment can include additional features characterized above.

In an example arrangement, the central closure portion inner surface includes a serpentine wall surrounding the receiving groove of the outer surface, the receiving groove also having a serpentine outer wall. This receiving groove serpentine outer wall can comprise an opposite side of the central closure portion, from the inner surface defining a serpentine wall.

According to another aspect of the present disclosure, an air filter cartridge is provided comprising a media pack, and first end cap with a seal thereon, the seal member including a tapered tip portion, a sidewall portion at least 5 mm long extending toward the second end cap from adjacent the tapered tip portion, and a radially, outwardly projecting shoulder arrangement at an opposite end of the sidewall portion from the tip portion. A second end cap is positioned on the media pack second end.

This characterized filter cartridge can include additional features, characterized generally above.

Also according to the present disclosure, an air cleaner assembly is provided. The air cleaner assembly includes a housing defining an interior and having an air flow inlet and air flow outlet. The housing defines a service access end with a removable access cover positioned thereover. The access cover includes a central (serpentine) projection thereon, surrounding a receiver interior, and extending into the housing interior from the access cover. A central cartridge support is positioned projecting toward the access cover from an end of the housing opposite the access cover. The central cartridge support has a first end, remote from the end of the housing opposite the access cover. The first end has a receiving groove surrounding a central projection; the central projection extending toward the access cover.

A main filter cartridge is removably positioned in the housing interior. The main filter cartridge comprises a media pack including media surrounding an open interior, the media pack (and media) having first and second ends. The cartridge includes a first end cap positioned on the media pack first end, the first end cap having a central aperture therethrough. A seal member is positioned on the first end cap oriented around the outer perimeter of the first end cap of the media pack, and removably sealed to the housing. By the term "removably sealed" in this context, it is meant that the cartridge can be separated from the housing, breaking the seal, as the cartridge is removed from the housing, without damage to either the housing or the filter cartridge. The filter cartridge includes an end cap positioned on the media second end. The end cap, in an example described, is a closed end cap that includes a portion projecting into the receiving groove on the end of the central cartridge support; and, a portion extending over the central projection of the central cartridge support. Further, the second end cap includes an outer surface with a receiving groove therein, which has projecting therein the central serpentine projection on the access cover.

A variety of specific features usable in the filter cartridge, are previously described.

In an example assembly, the housing includes a sidewall with an end wall (or end piece) snap fit to the sidewall. A snap fit connection around an outer periphery of the end wall is described. The snap fit projection can include a rotational indexing arrangement thereon. In an example air cleaner described, filter cartridge is positioned with a seal member sealing over a joint between the sidewall and end wall of the housing, to provide a weather or water seal.

In an example arrangement described, the central cartridge support is snap fit to the housing.

Also in a example arrangement described, a secondary filter cartridge is described, positioned over the central support between the central support and the main filter cartridge. An example secondary filter cartridge is described that includes an end cap having a central aperture therethrough, the end cap of the secondary filter cartridge being positioned on the first end of the cartridge support, with the central projection on the cartridge support projecting through the aperture on the end cap of the secondary filter and with a second end cap of the main filter cartridge abutting the end cap of the secondary filter cartridge.

An example secondary filter cartridge is provided having a conical shape with only one end cap thereon, the end cap being positioned on the smaller end of the conical shape. The secondary filter cartridge described includes a sidewall with an outer peripheral porous configuration surrounding an interiorly positioned filter media. An end of the media pack remote from the end cap includes no end cap thereon, and is designed to snuggly fit around a base portion of the cartridge support, adjacent a location when cartridge support engages the housing end wall.

In an example described, the access cover includes a dust drop tube thereon, and in a particular embodiment, the access cover includes a shield surrounding, and spaced from, a second end of the main filter cartridge when installed, the dust drop tube being positioned to engage the access cover at a location spaced from the filter cartridge by the shield.

According to an alternate aspect of the present disclosure, an air filter cartridge is provided which includes a media pack comprising media surrounding an open interior having first and second ends. The media pack and media typically has a conical shape tapering downwardly from the first end to second end.

A first end cap is positioned on the media first end, the first end cap having a central aperture therethrough.

A seal member is positioned on the first end cap, the seal member being positioned to form an outwardly radial seal around an outer periphery of the first end cap. The seal member can be formed integral with the first end cap.

The second end cap is positioned on the media second end. The second end cap includes an inner portion with a peripheral wall projecting toward the first end cap. The upper portion also includes a ring section projecting radially inwardly from the peripheral wall, and surrounding and defining a central aperture therethrough.

A second end cap is generally sized and configured to form a seal with either the end cap of a safety cartridge positioned inside of the main cartridge, in use, or a portion of a cartridge support within in an air cleaner housing, in use. In an example arrangement to effect to latter, the ring section includes a seal member thereon.

Also in accord with the present disclosure, an air cleaner assembly is provided which includes a main filter cartridge having an end cap of the type described in the previous two paragraphs. Typically, the main filter cartridge is positioned with the inner portion of the second end cap sealed either to the support or to a safety cartridge. In general terms, however, the housing is configured with an access cover including a central projection that extends through the aperture of the main filter cartridge, and the housing includes a central support with a portion projecting through the aperture of the main cartridge second end cap.

Various features and techniques for accomplishing this, including sealing the second end cap of the main filter are described.

Methods of assembly and use are also described.

It is again noted that there is no requirement that an assembly include all of the features and characteristics herein, to obtain some benefit according to the present disclosure.

What is claimed:

1. An air filter cartridge for removable installation in a housing; the air filter cartridge comprising:
   (a) a media pack comprising media surrounding an open interior; the media having first and second ends;
   (b) a first end cap positioned on the media first end;
      (i) the first end cap having a central aperture therethrough;
      (ii) the first end cap having a first seal portion oriented to form a first, radially outwardly directed, releasable radial seal with the housing;
      (iii) the first end cap having a second radial seal portion oriented to form a second, radially outwardly directed, seal with the housing at an opposite side of a housing joint from the first releasable radial seal; and,
      (iv) the first and second, radially outwardly directed, seal portions being configured to form seals that differ from one another, in largest cross-dimension, by at least 2 mm; the first seal portion having a larger cross-dimension than any portion of the second seal portion;
      (v) the first seal portion being at a perimeter of the first end cap;
      (vi) the filter cartridge having no structure thereon that is both: located adjacent the first end cap; and, that has a larger cross-dimension than the cross-dimension of the first seal portion; and,
   (c) a second end cap positioned on the media second end;
   (d) a portion of one of the first and second end caps comprising a radially directed surface having alternating radially facing convex and concave portions.

2. An air filter cartridge according to claim 1 wherein:
   (a) the media pack has a conical shape with a larger end adjacent the first end cap and a smaller end adjacent the second end cap.

3. An air filter cartridge according to claim 1 wherein:
(a) the second radial seal portion has a surface portion that is flat and uninterrupted over a length of at least 5 mm; the flat and uninterrupted surface portion being oriented to releaseably, radially, seal to a surrounding structure.

4. An air filter cartridge according to claim 1 wherein:
(a) the second radial seal portion has a surface portion that is flat and uninterrupted over a length of at least 7 mm; the flat and uninterrupted surface portion being oriented to releaseably, radially, seal to a surrounding structure.

5. An air filter cartridge according to claim 1 wherein:
(a) the radial seal portion comprises a portion of the first end cap that is molded-in-place.

6. An air filter cartridge according to claim 1 wherein:
(a) the portion of one of the first and second end caps comprising a radially directed surface having alternating radially facing convex and concave portions has an outer dimension that is smaller than the media.

7. An air filter cartridge according to claim 6 wherein:
(a) the portion of one of the first and second end caps comprising a radially directed surface having alternating radially facing convex and concave portions has at least five, alternating, radially facing convex and radially facing concave portions.

8. An air filter cartridge according to claim 7 wherein:
(a) the portion of one of the first and second end caps comprising a radially directed surface having alternating radially facing convex and concave portions has 6-10, alternating, radially facing convex and radially facing concave portions.

9. An air filter cartridge according to claim 1 wherein:
(a) the portion of one of the first and second end caps comprising a radially directed surface having alternating radially facing convex and concave portions has at least five, alternating, radially facing convex and radially facing concave portions.

10. An air filter cartridge according to claim 9 wherein:
(a) the portion of one of the first and second end caps comprising a radially directed surface having alternating radially facing convex and concave portions has at least 6-10, alternating, radially facing convex and radially facing concave portions.

11. An air filter cartridge according to claim 1 wherein:
(a) second end cap has an outer surface with a central projection extending in a direction away from the first end cap; the outer surface of the second end cap including a receiving groove surrounding the central projection.

12. An air cleaner assembly comprising:
(a) a housing defining an interior and having an air flow inlet and an air flow outlet;
    (i) the housing including a joint between a section thereof and another housing piece; and,
    (ii) the housing including a removable access cover; and,
(b) an air filter cartridge removably positioned in the housing interior; the filter cartridge comprising:
    (i) a media pack comprising media surrounding an open interior; the media having first and second ends;
    (ii) a first end cap positioned on the media first end;
        (A) the first end cap having a central aperture therethrough;
        (B) the first end cap having a first seal portion oriented to form a first releasable radially outwardly directed seal with a surrounding portion of the housing; and,
        (C) the first end cap having a second seal portion oriented to form a second releasable radially outwardly directed seal with a surrounding portion of the housing at an opposite side of the joint from the first releasable seal;
        (D) the first and second, radially outwardly directed, seals having largest outer cross-dimensions that differ from one another by at least 2 mm; the first seal portion having a larger cross-dimension than any portion of the second seal portion; and,
        (E) no portion of the first end cap being pinched at the joint to form an axial seal; and,
    (iii) the access cover being removable from the housing without separating each of the first releasable seal and the second releasable seal from sealing to the housing.

13. An air cleaner assembly according to claim 12 wherein:
(a) the housing comprises a cartridge receiving section and an end cover; and,
(b) the joint is positioned between the cartridge receiving section and the end cover.

14. An air cleaner assembly according to claim 13 wherein:
(a) the end cover includes an air flow outlet therein.

15. An air cleaner assembly according to claim 12 wherein:
(a) the media pack has a conical shape with a larger end adjacent the first end cap and a smaller end adjacent the second end cap.

16. An cleaner assembly according to claim 12 wherein:
(a) the first seal portion is a perimeter portion of the first end cap.

17. An air cleaner assembly according to claim 12 wherein:
(a) the first seal portion includes at least a portion oriented closer to the second end cap than does the second seal portion oriented to seal to the housing at an opposite side of the joint from the first releasable seal portion.

18. An air cleaner assembly according to claim 12 wherein:
(a) the housing includes a radially directed surface having a serpentine shape comprising at least five, alternating, radially facing convex portions and radially facing concave portions; and,
(b) one of the first and second end caps includes a radially directed surface having a serpentine shape with at least five, alternating, radially facing convex and radially facing concave portions;
(c) the radially directed surface, of the housing, that has a serpentine shape being in engagement with the radially directed surface of one of the first and second end caps that has a serpentine shape.

19. An air cleaner assembly according to claim 12 wherein:
(a) the cartridge includes a second end cap opposite the first end cap;
    (i) the second end cap having an outer surface with a central projection extending in a direction away from the first end cap; the outer surface of the second end cap including a receiving groove surrounding the central projection.

* * * * *